US009664875B2

(12) United States Patent
Uno

(10) Patent No.: US 9,664,875 B2
(45) Date of Patent: May 30, 2017

(54) LENS BARREL

(71) Applicant: Panasonic Corporation, Osaka (JP)

(72) Inventor: Tetsuya Uno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/448,112

(22) Filed: Jul. 31, 2014

(65) Prior Publication Data

US 2014/0340774 A1    Nov. 20, 2014

Related U.S. Application Data

(63) Continuation of application No. PCT/JP2013/000594, filed on Feb. 1, 2013.

(30) Foreign Application Priority Data

Feb. 2, 2012 (JP) ................ 2012-021375

(51) Int. Cl.
   *G02B 7/02* (2006.01)
   *G02B 15/15* (2006.01)
   (Continued)

(52) U.S. Cl.
   CPC .............. *G02B 7/04* (2013.01); *G02B 7/102* (2013.01); *G03B 5/00* (2013.01); *G03B 11/043* (2013.01);
   (Continued)

(58) Field of Classification Search
   CPC .......... G02B 7/04; G02B 3/00; G02B 15/177; G02B 15/161; G02B 15/173; G02B 15/14;
   (Continued)

(56) References Cited

U.S. PATENT DOCUMENTS 5,486,889 A * 1/1996 Shintani ................. 396/448
5,614,973 A * 3/1997 Azegami ................ G03B 17/04
                                                              396/448
(Continued)

FOREIGN PATENT DOCUMENTS

JP    63-138320 A    6/1986
JP    63-138320 A    6/1988
(Continued)

OTHER PUBLICATIONS

International Search Report for corresponding International Application No. PCT/JP2013/000594 mailed Mar. 12, 2013.
(Continued)

*Primary Examiner* — Dawayne A Pinkney
(74) *Attorney, Agent, or Firm* — Renner, Otto, Boisselle & Sklar, LLP

(57) ABSTRACT

The lens barrel includes a first planar portion, a barrier front cover, a vane portion, and a lens group frame. The first planar portion is configured to be substantially perpendicular to an optical axis and includes a first opening portion. The barrier front cover includes a second opening portion. The vane portion is configured to move between a first position and a second position. The vane portion is configured to cover the first opening portion and the second opening portion at the first position, and allow the first opening portion and the second opening portion to open at the second position. The lens group frame is configured to support rotatably the vane portion and includes at least one lens. The first planar portion is disposed closer to a subject than the barrier front cover. The first opening portion is formed smaller than the second opening portion.

11 Claims, 40 Drawing Sheets

(51) Int. Cl.
  *G02B 15/14* (2006.01)
  *G03B 9/08* (2006.01)
  *G03B 9/02* (2006.01)
  *G02B 7/04* (2006.01)
  *G02B 7/10* (2006.01)
  *G03B 5/00* (2006.01)
  *G03B 17/04* (2006.01)
  *H04N 5/238* (2006.01)
  *G03B 11/04* (2006.01)

(52) U.S. Cl.
  CPC ............. *G03B 17/04* (2013.01); *H04N 5/238* (2013.01); *G03B 2205/0092* (2013.01)

(58) Field of Classification Search
  CPC ...... G02B 5/205; G02B 26/007; G02B 5/223; G02B 7/102; G02B 7/10; G02B 7/021; G02B 25/002; G02B 23/125; G02B 7/02; G02B 7/028; G11B 7/0932; G11B 7/0935; G02C 7/08; H04N 5/2254; G03B 9/22; G03B 9/42; G03B 9/02
  USPC ........ 359/722–723, 691–692, 676, 677, 885, 359/888–889, 694, 704, 811–830, 359/739–740; 348/342, 360–361; 396/449, 450, 505
  See application file for complete search history.

(56) References Cited

U.S. PATENT DOCUMENTS

| | | |
|---|---|---|
| 5,668,670 A | 9/1997 | Nakayama |
| 6,008,954 A | 12/1999 | Shintani |
| 6,018,426 A | 1/2000 | Funahashi |
| 6,959,148 B2 | 10/2005 | Nomura |
| 7,088,523 B2 | 8/2006 | Hamasaki et al. |
| 7,102,831 B2 | 9/2006 | Omiya et al. |
| 7,194,203 B2 | 3/2007 | Omiya et al. |
| 7,265,913 B2 | 9/2007 | Nagai et al. |
| 7,338,219 B2 | 3/2008 | Ishizuka et al. |
| 7,372,638 B2 | 5/2008 | Yoshii |
| 7,454,129 B2 | 11/2008 | Fukai |
| 7,455,465 B2 | 11/2008 | Nuno et al. |
| 7,477,308 B2 | 1/2009 | Omiya et al. |
| 7,492,536 B2 | 2/2009 | Nagai et al. |
| 7,507,040 B2 | 3/2009 | Nomura et al. |
| 7,515,182 B2 | 4/2009 | Omiya et al. |
| 7,515,195 B2 | 4/2009 | Endo et al. |
| 7,527,438 B2 | 5/2009 | Nomura et al. |
| 7,536,091 B2 | 5/2009 | Nomura |
| 7,551,376 B2 | 6/2009 | Koyama |
| 7,689,110 B2 | 3/2010 | Yumiki et al. |
| 7,744,294 B2 | 6/2010 | Tsurukawa |
| 7,746,584 B2 | 6/2010 | Honsho et al. |
| 7,753,598 B2 | 7/2010 | Ishizuka et al. |
| 7,755,855 B2 | 7/2010 | Shimazaki et al. |
| 7,773,871 B2 | 8/2010 | Ishizuka |
| 7,777,976 B2 | 8/2010 | Nomura et al. |
| 7,780,362 B2 | 8/2010 | Nomura et al. |
| 7,860,383 B2 | 12/2010 | Nomura et al. |
| 7,864,241 B2 | 1/2011 | Iwasaki |
| 7,872,683 B2 | 1/2011 | Iwasaki |
| 7,920,345 B2 | 4/2011 | Honsho et al. |
| 8,041,204 B2 | 10/2011 | Nomura |
| 8,090,249 B2 | 1/2012 | Suzuka |
| 8,218,255 B2 | 7/2012 | Katano |
| 8,228,619 B2 | 7/2012 | Koyama |
| 8,351,775 B2 | 1/2013 | Nagae |
| 8,396,358 B2 | 3/2013 | Suzuka |
| 8,422,152 B2 | 4/2013 | Onishi |
| 8,432,477 B2 | 4/2013 | Honsho et al. |
| 8,441,742 B2 | 5/2013 | Koyama |
| 8,451,544 B2 | 5/2013 | Suzuki |
| 8,472,127 B2 | 6/2013 | Onishi |
| 8,498,528 B2 | 7/2013 | Suzuka |
| 8,665,535 B2 | 3/2014 | Shinano et al. |
| 8,730,600 B2 | 5/2014 | Iwasaki et al. |
| 8,773,762 B2 | 7/2014 | Suzuka |
| 8,776,615 B2 | 7/2014 | Kempainen et al. |
| 9,116,283 B2 | 8/2015 | Konishi |
| 9,411,125 B2 | 8/2016 | Shinano |
| 2005/0207748 A1 | 9/2005 | Ishizuka et al. |
| 2006/0034001 A1 | 2/2006 | Nagai et al. |
| 2006/0034604 A1 | 2/2006 | Nomura et al. |
| 2006/0092526 A1 | 5/2006 | Hamasaki et al. |
| 2007/0253689 A1 | 11/2007 | Nagai et al. |
| 2008/0180812 A1 | 7/2008 | Honsho et al. |
| 2009/0207509 A1 | 8/2009 | Nomura et al. |
| 2009/0231709 A1 | 9/2009 | Nomura et al. |
| 2010/0067896 A1* | 3/2010 | Murakami .................... 396/448 |
| 2010/0142939 A1 | 6/2010 | Honsho et al. |
| 2011/0001872 A1 | 1/2011 | Honsho et al. |
| 2011/0013897 A1 | 1/2011 | Nagae |
| 2011/0019290 A1 | 1/2011 | Shinano et al. |
| 2011/0026143 A1 | 2/2011 | Katano |
| 2011/0032627 A1 | 2/2011 | Koyama |
| 2011/0141566 A1 | 6/2011 | Suzuka |
| 2012/0045198 A1* | 2/2012 | Miyoshi et al. ............. 396/448 |
| 2012/0070138 A1 | 3/2012 | Onishi |
| 2012/0257286 A1 | 10/2012 | Koyama |
| 2013/0215316 A1 | 8/2013 | Honsho et al. |
| 2014/0340751 A1 | 11/2014 | Konishi et al. |
| 2014/0340754 A1 | 11/2014 | Uno et al. |
| 2014/0340772 A1 | 11/2014 | Shinano |

FOREIGN PATENT DOCUMENTS

| | | |
|---|---|---|
| JP | 05-090416 | 12/1993 |
| JP | 06-034865 A | 2/1994 |
| JP | 06-051178 | 2/1994 |
| JP | 08-152659 A | 6/1996 |
| JP | 10-003103 A | 1/1998 |
| JP | 11-160606 A | 6/1999 |
| JP | 2000-292848 | 10/2000 |
| JP | 2001-042189 | 2/2001 |
| JP | 2001-235670 | 8/2001 |
| JP | 2003-315861 A | 11/2003 |
| JP | 2004-233916 A | 8/2004 |
| JP | 2005-172953 A | 6/2005 |
| JP | 2005-227597 A | 8/2005 |
| JP | 2005-266345 A | 9/2005 |
| JP | 2006-053444 | 2/2006 |
| JP | 2006-053445 A | 2/2006 |
| JP | 2006-058455 A | 3/2006 |
| JP | 2006-126537 A | 5/2006 |
| JP | 2006-330657 A | 12/2006 |
| JP | 2007-163961 A | 6/2007 |
| JP | 2007-178751 | 7/2007 |
| JP | 2007-199320 | 8/2007 |
| JP | 2007-206210 A | 8/2007 |
| JP | 2008-015387 A | 1/2008 |
| JP | 2008-046504 A | 2/2008 |
| JP | 2008-139802 | 6/2008 |
| JP | 2008-158288 A | 7/2008 |
| JP | 2008-185786 A | 8/2008 |
| JP | 2009-157245 A | 7/2009 |
| JP | 2009-216881 A | 9/2009 |
| JP | 2009-217243 A | 9/2009 |
| JP | 2009-244874 A | 10/2009 |
| JP | 2009-251063 | 10/2009 |
| JP | 2009-251064 A | 10/2009 |
| JP | 2010-026163 A | 2/2010 |
| JP | 2010-164695 A | 7/2010 |
| JP | 2010-217511 A | 9/2010 |
| JP | 2011-013613 B | 1/2011 |
| JP | 2011-022234 A | 2/2011 |
| JP | 2011-033667 A | 2/2011 |
| JP | 2011-039090 A | 2/2011 |
| JP | 2011-039527 A | 2/2011 |
| JP | 2011-048346 A | 3/2011 |
| JP | 2011-150132 A | 8/2011 |
| JP | 2011-154204 | 8/2011 |
| JP | 2011-158592 A | 8/2011 |

(56) References Cited

FOREIGN PATENT DOCUMENTS

| | | |
|---|---|---|
| JP | 2011-170262 A | 9/2011 |
| JP | 2011-209348 A | 10/2011 |
| JP | 2011-209652 A | 10/2011 |
| JP | 2011-215389 | 10/2011 |
| JP | 2012-018325 A | 1/2012 |

OTHER PUBLICATIONS

International Search Report for related International Application No. PCT/JP2013/000592 mailed Mar. 5, 2013.
International Search Report for related International Application No. PCT/JP2013/000586 mailed May 7, 2013.
International Search Report for related International Application No. PCT/JP2013/000588 mailed May 7, 2013.
International Search Report for related International Application No. PCT/JP2013/000589 mailed May 7, 2013.
International Search Report for related International Application No. PCT/JP2013/000595 mailed May 7, 2013.
International Search Report for related International Application No. PCT/JP2012/008448 mailed Feb. 12, 2013.
Co-pending U.S. Appl. No. 14/447,744, filed Jul. 31, 2014.
Co-pending U.S. Appl. No. 14/447,791, filed Jul. 31, 2014.
Co-pending U.S. Appl. No. 14/447,871, filed Jul. 31, 2014.
Co-pending U.S. Appl. No. 14/447,843, filed Jul. 31, 2014.
Co-pending U.S. Appl. No. 14/448,907, filed Jul. 31, 2014.
Co-pending U.S. Appl. No. 14/448,069, filed Jul. 31, 2014.
Co-pending U.S. Appl. No. 14/447,907, filed Jul. 31, 2014 (previously submitted in IDS filed on Aug. 4, 2014).
Notice of Allowance issued on Jan. 21, 2015 for U.S. Appl. No. 14/447,843.
Notice of Allowance issued on Jan. 26, 2015 for U.S. Appl. No. 14/447,791.
Office Action issued on Feb. 20, 2015 for U.S. Appl. No. 14/447,907.
Office Action mailed May 9, 2016 for co-pending U.S. Appl. No. 14/447,871.
Office Action issued on Apr. 7, 2016 for Co-Pending U.S. Appl. No. 14/696,419.
Notice of Allowance issued on Mar. 30, 2016 for Co-pending U.S. Appl. No. 14/688,250.
Office Action mailed May 26, 2016 for co-pending U.S. Appl. No. 14/448,069.
Notice of Allowance dated Aug. 16, 2016 for co-pending U.S. Appl. No. 14/696,419.
Office Action mailed Feb. 9, 2017 for co-pending U.S. Appl. No. 14/447,871.
Office Action mailed Sep. 22, 2016 for co-pending U.S. Appl. No. 14/447,871.

\* cited by examiner

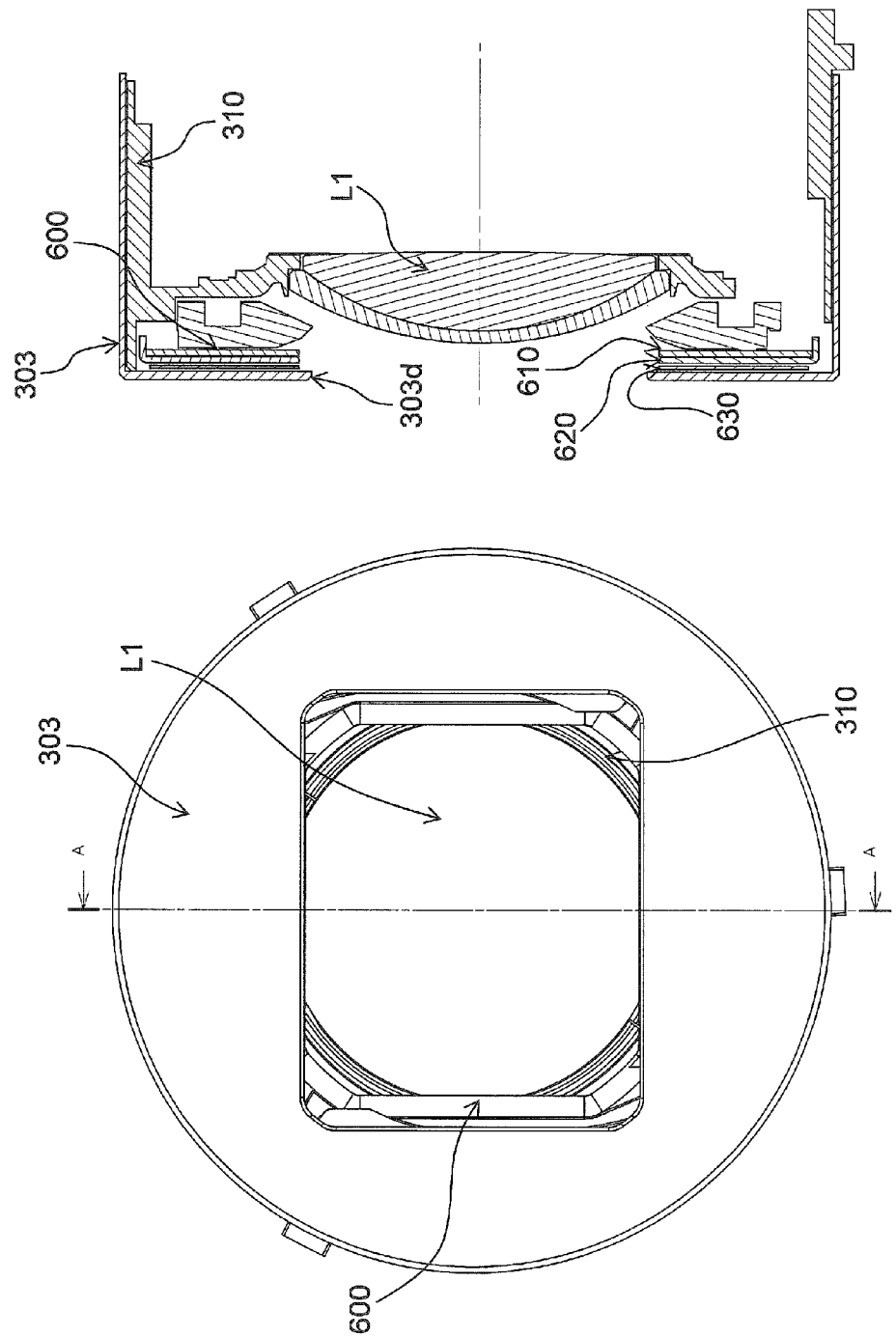

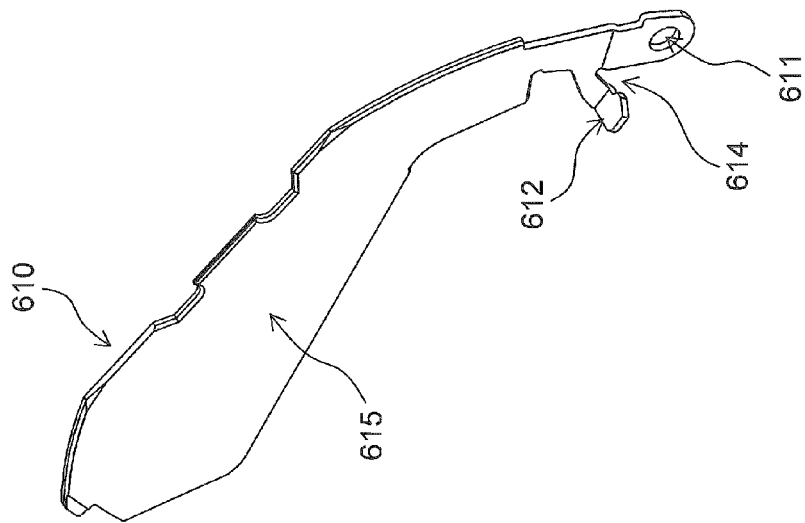
FIG. 38A
FIG. 38B
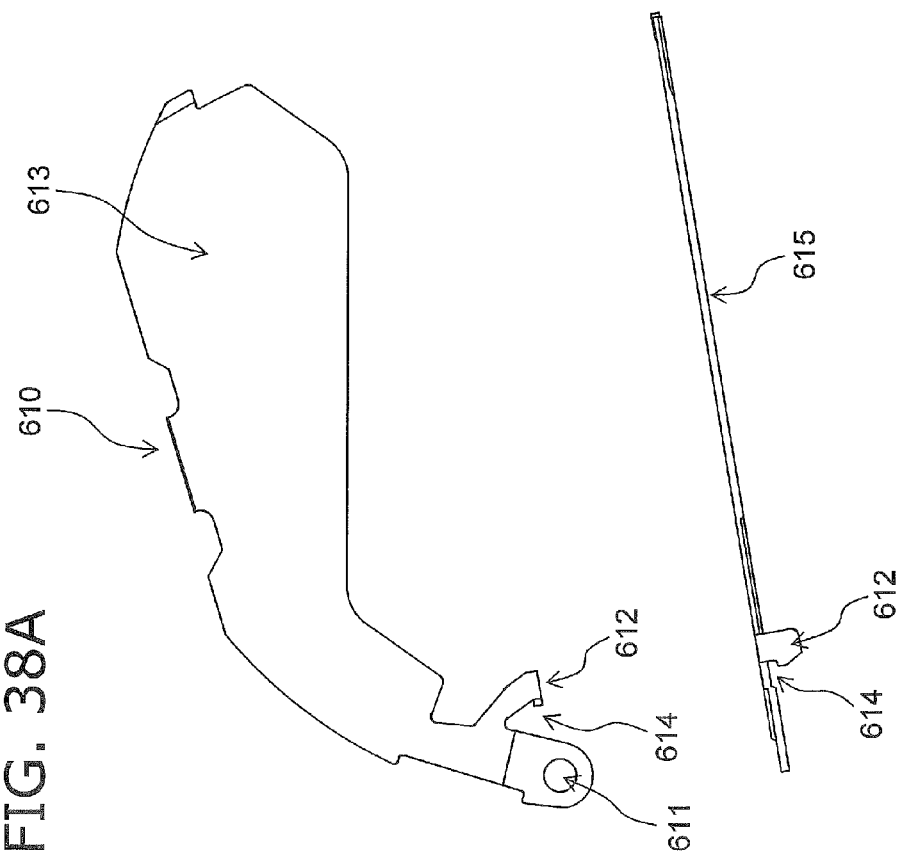
FIG. 38C

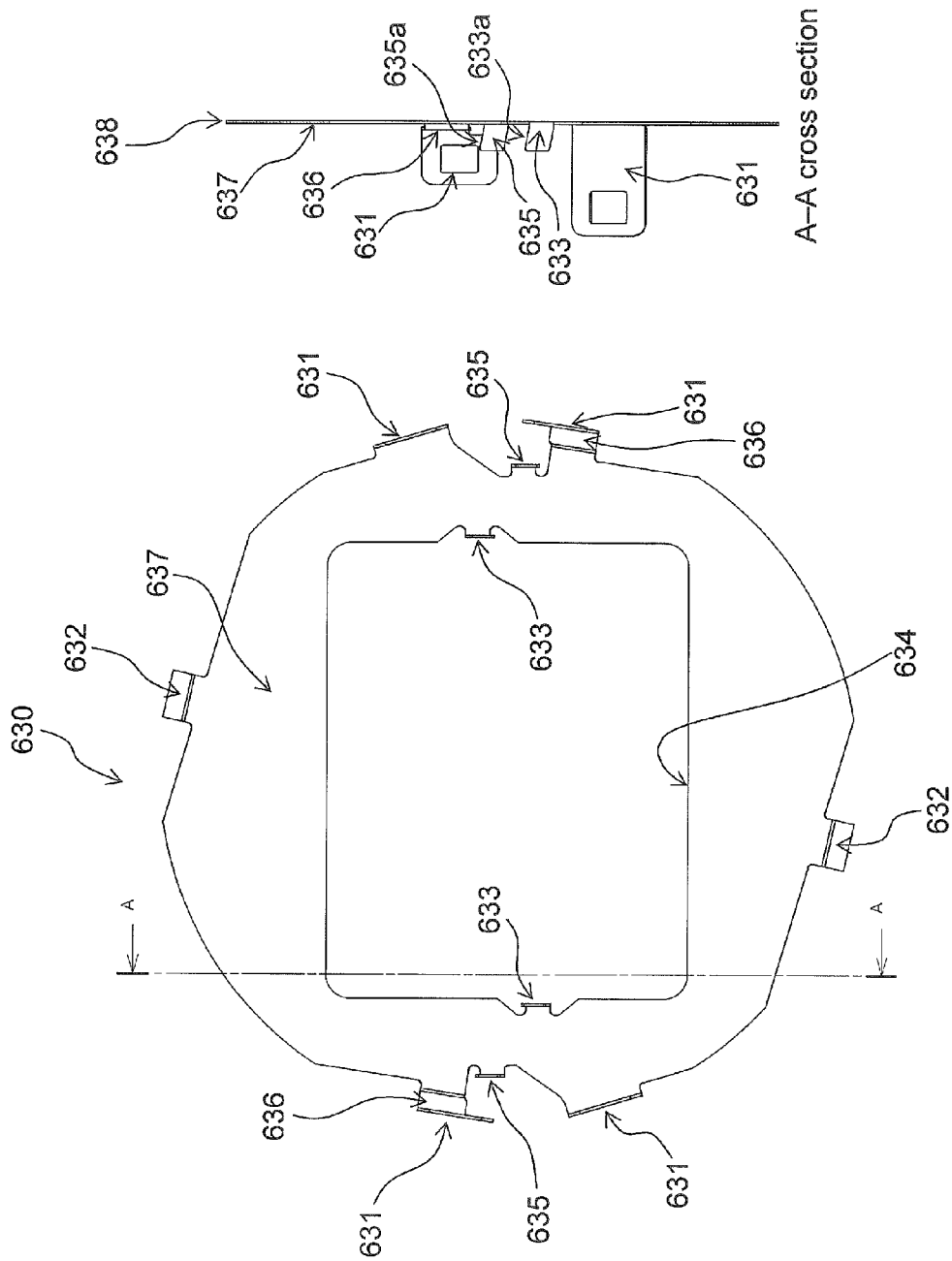

LENS BARREL

CROSS-REFERENCE TO RELATED APPLICATIONS

This is a continuation application of International Application PCT/JP2013/000594, with an international filing date of Feb. 1, 2013 which claims priority to Japanese Patent Application No. 2012-021375 filed on Feb. 2, 2012. The entire disclosures of International Application PCT/JP2013/000594 and Japanese Patent Application No. 2012-021375 are hereby incorporated herein by reference.

BACKGROUND

Technical Field

The technology disclosed herein relates to a lens barrel equipped with an optical system.

With a conventional lens barrel, a bayonet mechanism made up of a bayonet groove and a bayonet protrusion is widely used for the purpose of rotatably engaging two frames. This bayonet mechanism is made up of a bayonet groove and a bayonet protrusion that is engaged with the bayonet groove (see Japanese Laid-Open Patent Application 2011-33667, for example).

However, when there is a rectilinear groove that intersects the bayonet groove, if the length of the rectilinear protrusion that is engaged with the rectilinear groove is shortened in the optical axis direction to reduce the size, then the rectilinear protrusion ends up coming loose at the point of intersection with the bayonet groove. If the bayonet groove is made thinner, then strength against external force ends up decreasing. Furthermore, if the rectilinear groove is made deeper than the bayonet groove, the size of the lens barrel in the radial direction will end up being larger.

The technology disclosed herein was conceived in light of the above situation, and it is an object thereof to provide a lens barrel that can be made more compact while maintaining the engagement strength of a bayonet mechanism.

SUMMARY

The lens barrel disclosed herein comprises a first planar portion, a barrier front cover, a vane portion, and a lens group frame. The first planar portion is configured to be substantially perpendicular to an optical axis and includes a first opening portion. The barrier front cover is formed using a metal member and includes a second opening portion. The vane portion is configured to move between a first position and a second position. The vane portion is configured to cover the first opening portion and the second opening portion at the first position. The vane portion is configured to allow the first opening portion and the second opening portion to open at the second position. The lens group frame is configured to support rotatably the vane portion and includes at least one lens. The first planar portion is disposed closer to a subject than the barrier front cover. The first opening portion is formed smaller than the second opening portion.

BRIEF DESCRIPTION OF DRAWINGS

Referring now to the attached drawings, which form a part of this original disclosure:

FIGS. 37A and 37B are, respectively, a front view and a cross section of a third movable lens barrel portion in its imaging enabled state;
FIGS. 38A, 38B, and 38C are, respectively, a front view, a side view, and an oblique view of inner vanes;
FIGS. 40A and 40B are, respectively, a front view and a cross section of a barrier front cover.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

An embodiment of the present technology will be described through reference to the drawings. In the description of the drawings that follows, portions that are the same or similar will be numbered the same or similarly. The drawings are merely schematic representations, however, and the proportions of the various dimensions and so forth may be different from those in actuality. Therefore, the specific dimensions and so forth should be determined by referring to the following description. Also, the mutual dimensional relations and proportions among the drawings may, of course, vary in some portions.

In the following embodiment, a digital camera will be described as an example of an imaging device. In the following description, assuming that the digital camera is in its landscape orientation, the subject side will be referred to as the "front," the opposite side from the subject as the "rear," vertically upward as "upward," vertically downward as "downward," the right side when facing the subject as "right," and the left side when facing the subject as "left." "Landscape orientation" is a kind of orientation of a digital camera, and when an image is captured in landscape orientation, the long-side direction of a rectangular image that is wider than it is tall substantially coincides with the horizontal direction within the image.

Configuration of Digital Camera 1

Figure 1:
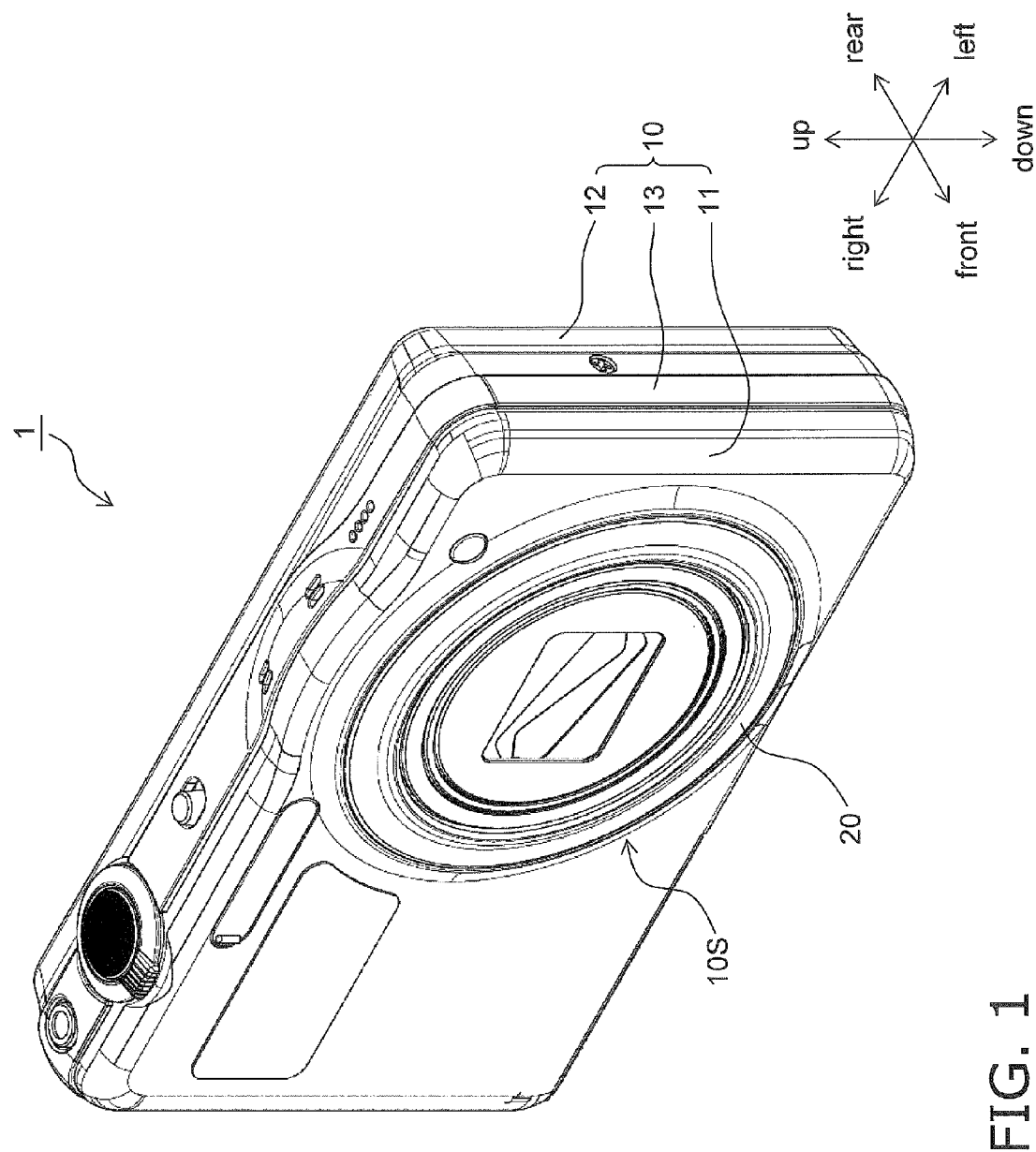
FIG. 1 is an oblique view of a digital camera.
Figure 2:
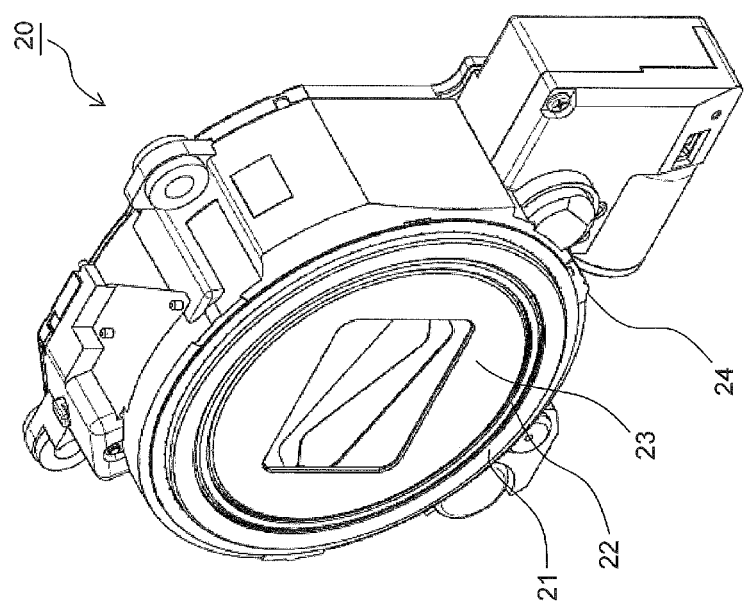
FIG. 2 is an oblique view of a lens barrel.

The configuration of a digital camera 1 will be described through reference to the drawings. FIG. 1 is an oblique view of the digital camera 1. FIG. 2 is an oblique view of a lens barrel 20.

As shown in FIG. 1, the digital camera 1 comprises a housing 10 and the lens barrel 20.

The housing 10 is made up of a front panel 11, a rear panel 12, and side panels 13. An opening 10S is formed in the front panel 11.

The lens barrel 20 comprises a three-stage retractable zoom mechanism. The lens barrel 20 is housed in the housing 10 when not being used for imaging, and is deployed forward from the opening 10S during imaging. More specifically, as shown in FIG. 2, the lens barrel 20 has a first movable lens barrel portion 21, a second movable lens barrel portion 22, a third movable lens barrel portion 23, and a stationary lens barrel 24.

The first movable lens barrel portion 21 can be deployed with respect to the stationary lens barrel 24. The second movable lens barrel portion 22 can be deployed with respect to the first movable lens barrel 21. The third movable lens barrel portion 23 can be deployed with respect to the second movable lens barrel 22. The stationary lens barrel 24 is fixed inside the housing 10. When the lens barrel 20 is deployed, the third movable lens barrel portion 23 is located the farthest forward of the first to third movable lens barrel portions 21 to 23.

Detailed Configuration of Lens Barrel 20

Figure 3:
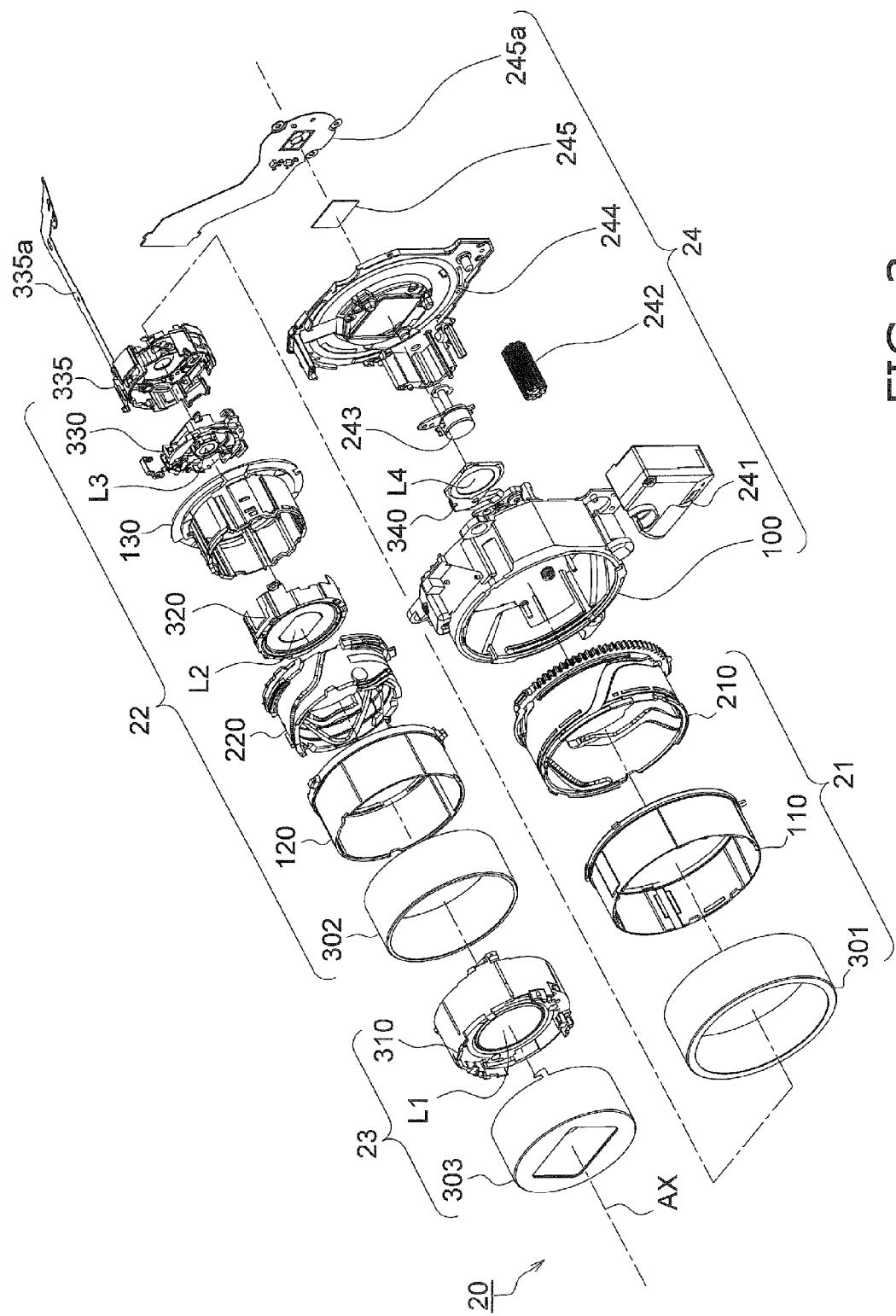
FIG. 3 is an exploded oblique view of a lens barrel.

Next, the detailed configuration of the lens barrel 20 will be described through reference to the drawings. FIG. 3 is an exploded oblique view of the lens barrel 20.

The first to third movable lens barrel portions 21 to 23 of the lens barrel 20 are deployed from the stationary lens barrel 24 along the optical axis AX of the optical system. The optical system includes first to fourth lens groups L1 to L4. In the following description, a direction parallel to the optical axis AX shall be referred to as the "optical axis direction," a direction perpendicular to the optical axis direction as the "radial direction," and a direction that goes in a circle around the optical axis AX as the "peripheral direction." The optical axis AX substantially coincides with the axis of the frames that make up the lens barrel 20.

In this embodiment, the term "rectilinear frame" means a frame that moves in the optical axis direction, without rotating in the peripheral direction. A "rotary frame" means a frame that rotates in the peripheral direction. The term "rotary frame" encompasses the meaning of both a frame that moves in the optical axis direction and a frame that does not move in the optical axis direction. The term "rectilinear groove" means a groove provided along the optical axis direction. A "rectilinear groove" is provided to both rectilinear and rotary frames.

The term "rectilinear" means moving in the optical axis direction, and not rotating in the peripheral direction. The term "rotary" means rotating in the peripheral direction. The term "rotary" is used in the meaning of both moving in the optical axis direction and not moving in the optical axis direction. The term "move" is a concept that also encompasses moving in the optical axis direction while rotating in the peripheral direction.

The term "bayonet" or "bayonet mechanism" means a mechanism in which frames including a "bayonet protrusion" and a "bayonet groove" provided in the peripheral direction are rotatably engaged, and a mechanism in which these frames are integrally engaged in the optical axis direction.

1. First Movable Lens Barrel Component 21

The first movable lens barrel portion 21 has a first rectilinear frame 110, a first rotary frame 210, and a first cosmetic frame 301. The first rectilinear frame 110 is a cylindrical plastic member disposed on the inside in the radial direction of a stationary frame 100 (discussed below). The first rotary frame 210 is a cylindrical plastic member disposed on the inside in the radial direction of the first rectilinear frame 110. The first cosmetic frame 301 is a cylindrical sheet metal member that covers the outer periphery of the first rectilinear frame 110.

2. Second Movable Lens Barrel Component 22

The second movable lens barrel portion 22 has a second rectilinear frame 120, a second rotary frame 220, a third rectilinear frame 130, a second lens group frame 320, a second lens group L2, a third lens group frame 330, a third lens group L3, a shutter frame 335, and a second cosmetic frame 302.

The second rectilinear frame 120 is a cylindrical plastic member disposed on the inside in the radial direction of the first rotary frame 210. The second rotary frame 220 is a cylindrical plastic member disposed on the inside in the radial direction of the second rectilinear frame 120. The third rectilinear frame 130 is a cylindrical plastic member disposed on the inside in the radial direction of the second rotary frame 220. The second lens group frame 320 is disposed on the inside in the radial direction of the third rectilinear frame 130, and supports the second lens group L2 used for zooming. The third lens group frame 330 is housed in the shutter frame 335, and supports the third lens group L3 used for image blur correction. The third lens group frame 330 is supported rotatably in the radial direction by the shutter frame 335, and constitutes an image blur correction mechanism along with the third lens group L3. The shutter frame 335 is disposed on the inside in the radial direction of the third rectilinear frame 130, and has a built-in shutter mechanism. The shutter frame 335 supports the third lens group frame 330 pivotably in the radial direction. A control-use flexible wire 335a is connected to the shutter frame 335. The control-use flexible wire 335 extends toward the stationary frame 100 or a master flange 244, and is connected to a control device (not shown) which is disposed outside of the lens barrel 20. The control-use flexible wire 335a transmits control signals to the shutter mechanism and the image blur correction mechanism (discussed below). The second cosmetic frame 302 is a cylindrical sheet metal member that covers the outer periphery of the second rectilinear frame 120.

3. Third Movable Lens Barrel Component 23

The third movable lens barrel portion 23 has a first lens group frame 310 (an example of a lens group frame), a first lens group L1, and a third cosmetic frame 303 (an example of a cosmetic portion).

The first lens group frame 310 is disposed between the second rectilinear frame 120 and the second rotary frame 220. The first lens group frame 310 supports the first lens group L1, which is used to bring light into the lens barrel 20. The third cosmetic frame 303 is a cylindrical sheet metal member that covers the outer periphery of the first lens group frame 310.

4. Stationary Lens Barrel 24

The stationary lens barrel 24 has the stationary frame 100, a fourth lens group frame 340, a fourth lens group L4, a zoom motor 241, a zoom gear 242, a focus motor 243, a master flange 244, an imaging element 245, and an imaging element flexible wire 245a.

The stationary frame 100 is a cylindrical plastic member disposed on the outside in the radial direction of the first rotary frame 210 and the first rectilinear frame 110. The fourth lens group frame 340 is attached to the master flange 244, and is driven in the optical axis direction by the focus motor 243. The fourth lens group frame 340 supports the fourth lens group L4, which is used for focal adjustment.

The zoom motor 241 is a drive source that is used to deploy the first to third movable lens barrel portions 21 to 23, and is attached to the side face of the stationary frame 100. The zoom gear 242 transmits the drive force of the zoom motor 241 to the first rotary frame 210. The front end of the zoom gear 242 is supported by the stationary frame 100, and the rear end of the zoom gear 242 is supported by the master flange 244. The focus motor 243 is a drive source that is used to drive the fourth lens group frame 340 in the optical axis direction, and is attached to the master flange 244. The master flange 244 is a flat plastic member that covers the rear of the stationary frame 100. The imaging element 245 is fitted into the center of the master flange 244. The imaging element flexible wire 245a is affixed to the rear face of the master flange 244. The imaging element flexible wire 245a is connected to a control device (not shown), and transmits signals from the imaging element 245.

Configuration of Frames

The frames that make up the lens barrel 20 will now be described through reference to the drawings. More specifically, the configurations of the stationary frame 100, the first rectilinear frame 110, the first rotary frame 210, the second rectilinear frame 120, the second rotary frame 220, the third rectilinear frame 130, the first lens group frame 310, the second lens group frame 320, the third lens group frame 330, and the shutter frame 335 will be described in order, after which we will describe how the frames are engaged with each other.

1. Configuration of Stationary Frame 100

Figure 4:
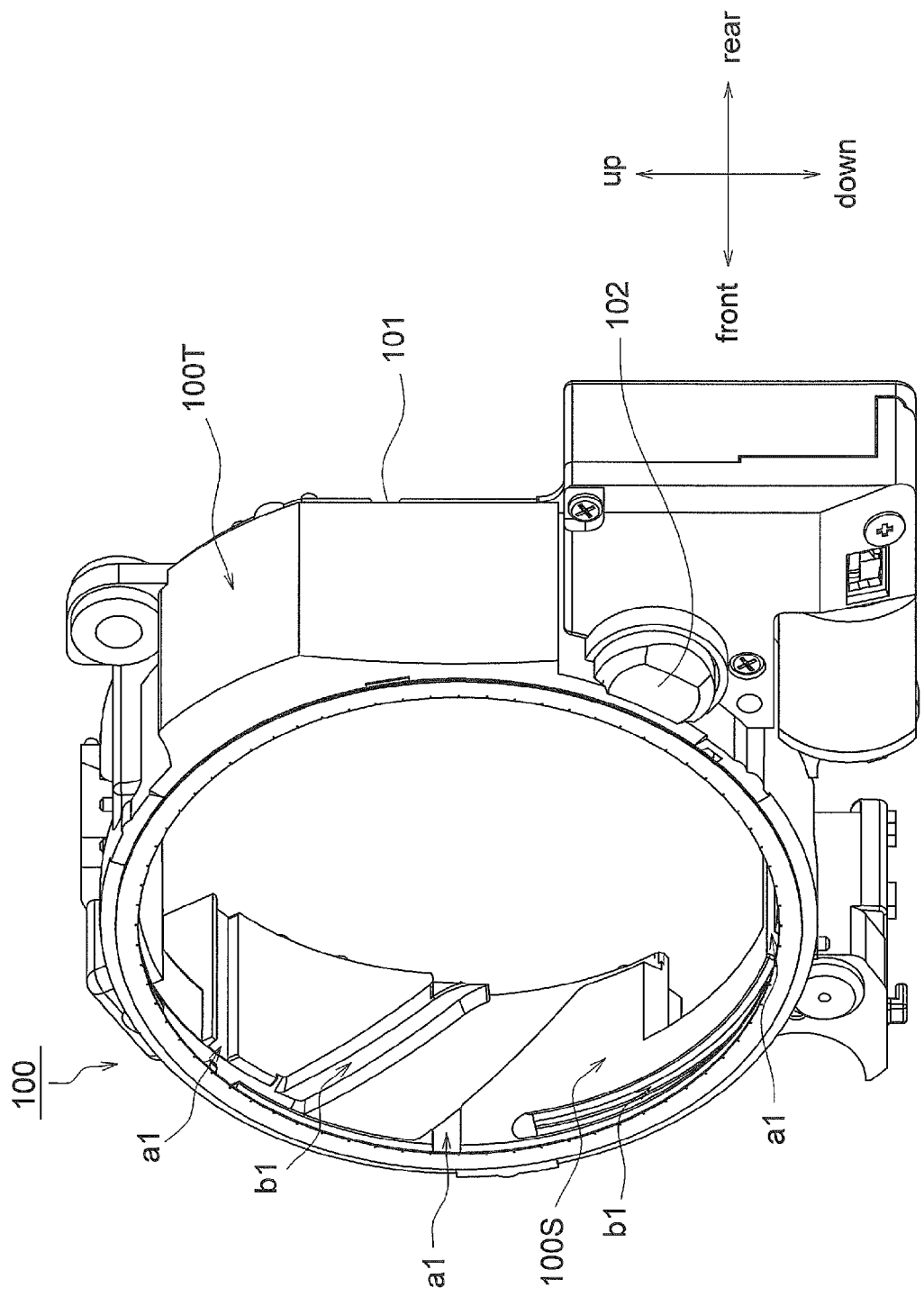
FIG. 4 is an oblique view of a stationary frame.

FIG. 4 is an oblique view of the stationary frame 100. The stationary frame 100 has a stationary frame main body 101 and a zoom gear support 102.

The stationary frame main body 101 is formed in a cylindrical shape, and has an inner peripheral face 100S and an outer peripheral face 100T.

The zoom gear support 102 is provided so as to protrude from the outer peripheral face 100T. The zoom gear support 102 rotatably supports the front end of the zoom gear 242. In this embodiment, the zoom gear support 102 is covered by the front panel 11, so it is not exposed on the outside of the housing 10 (see FIG. 1). The teeth of the zoom gear 242 protrude on the inside of the stationary frame main body 101.

The stationary frame 100 has five rectilinear grooves a1 and three cam grooves b1. In FIG. 4, however, only three rectilinear grooves a1 and two cam grooves b1 are shown.

The five rectilinear grooves a1 are formed in the inner peripheral face 100S in the optical axis direction, and are suitably spaced apart in the peripheral direction.

The three cam grooves b1 are formed in the inner peripheral face 100S so as to intersect the optical axis direction.

2. Configuration of First Rectilinear Frame 110

Figure 5:
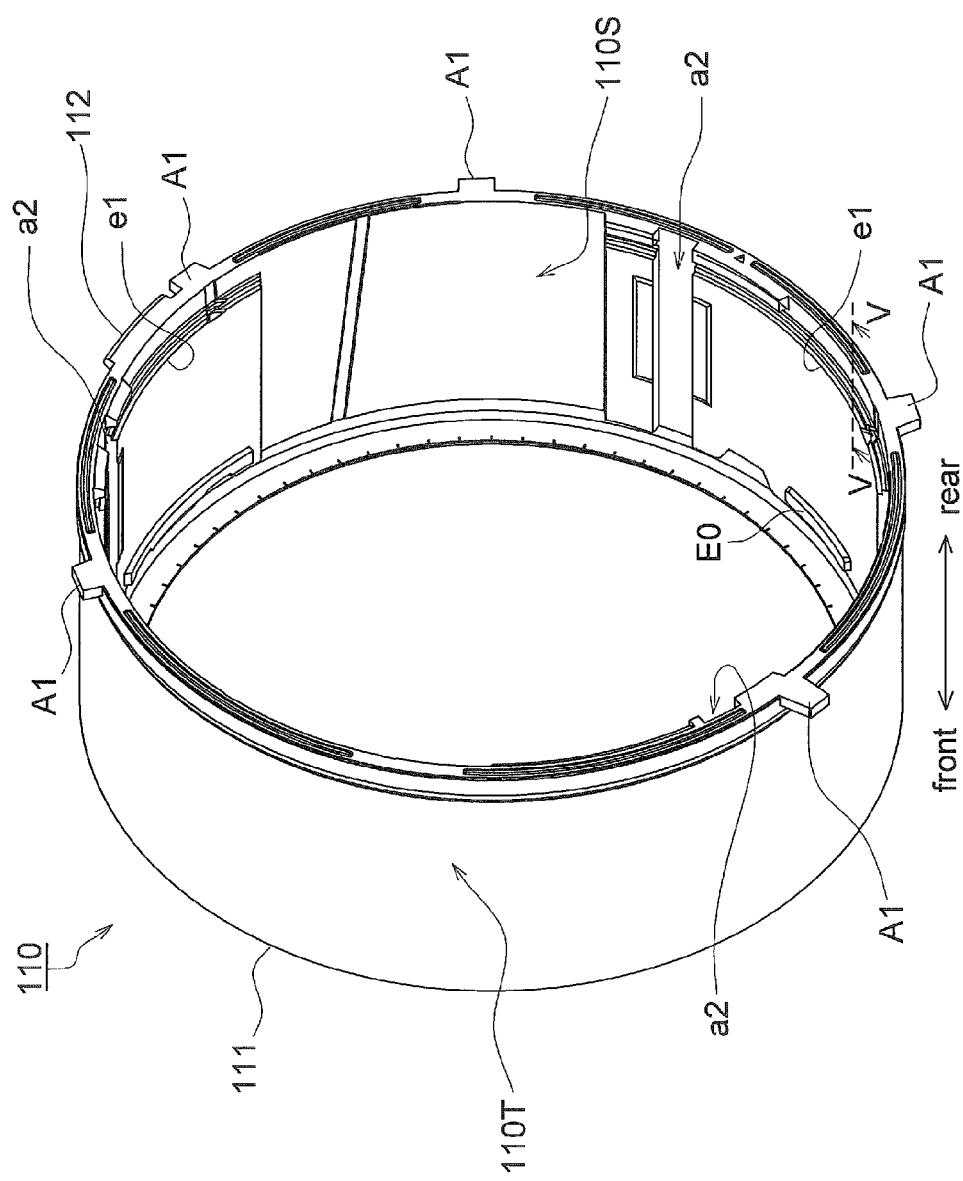
FIG. 5 is an oblique view of a first rectilinear frame.

FIG. 5 is an oblique view of the first rectilinear frame 110. The first rectilinear frame 110 has a first rectilinear frame main body 111, a wiring protrusion 112, five rectilinear protrusions A1, three rectilinear grooves a2, a bayonet groove e1, and a bayonet protrusion E0.

The rectilinear frame main body 111 is formed in a cylindrical shape, and has an inner peripheral face 110S and an outer peripheral face 110T.

The wiring protrusion 112 is provided to the rear end of the outer peripheral face 110T. The wiring protrusion 112 is disposed adjacent to the rectilinear protrusions A1. The wiring protrusion 112 may have about the same width as a control-use flexible wire 335a that is connected to the shutter frame 335.

Here, when the first rotary frame 210 moves closest to the master flange 244, the wiring protrusion 112 biases the control-use flexible wire 335a toward the outside in the radial direction by coming into contact with the control-use flexible wire 335a. Specifically, when the lens barrel 20 is in its retracted state, the wiring protrusion 112 pushes up the control-use flexible wire 335a toward the outside in the radial direction. Therefore, damage to the control-use flexible wire 335a can be suppressed by isolating the control-use flexible wire 335a from the first rectilinear frame 110 and the first rotary frame 210.

Also, the distal end of the wiring protrusion 112 in the radial direction is formed as a curve face. Consequently, even when the control-use flexible wire 335a comes into contact with the wiring protrusion 112, the control-use flexible wire 335a can still be guided smoothly. Specifically, damage to the control-use flexible wire 335a can be prevented.

The five rectilinear protrusions A1 are provided at the rear end of the outer peripheral face 110T. The five rectilinear protrusions A1 are engaged with the five rectilinear grooves a1 of the stationary frame 100.

The three rectilinear grooves a2 are formed in the inner peripheral face 110S in the optical axis direction.

The bayonet groove e1 is formed in an arc shape in the peripheral direction at the rear end of the inner peripheral face 110S. The bayonet groove e1 intersects the three rectilinear grooves a2.

Figure 6:
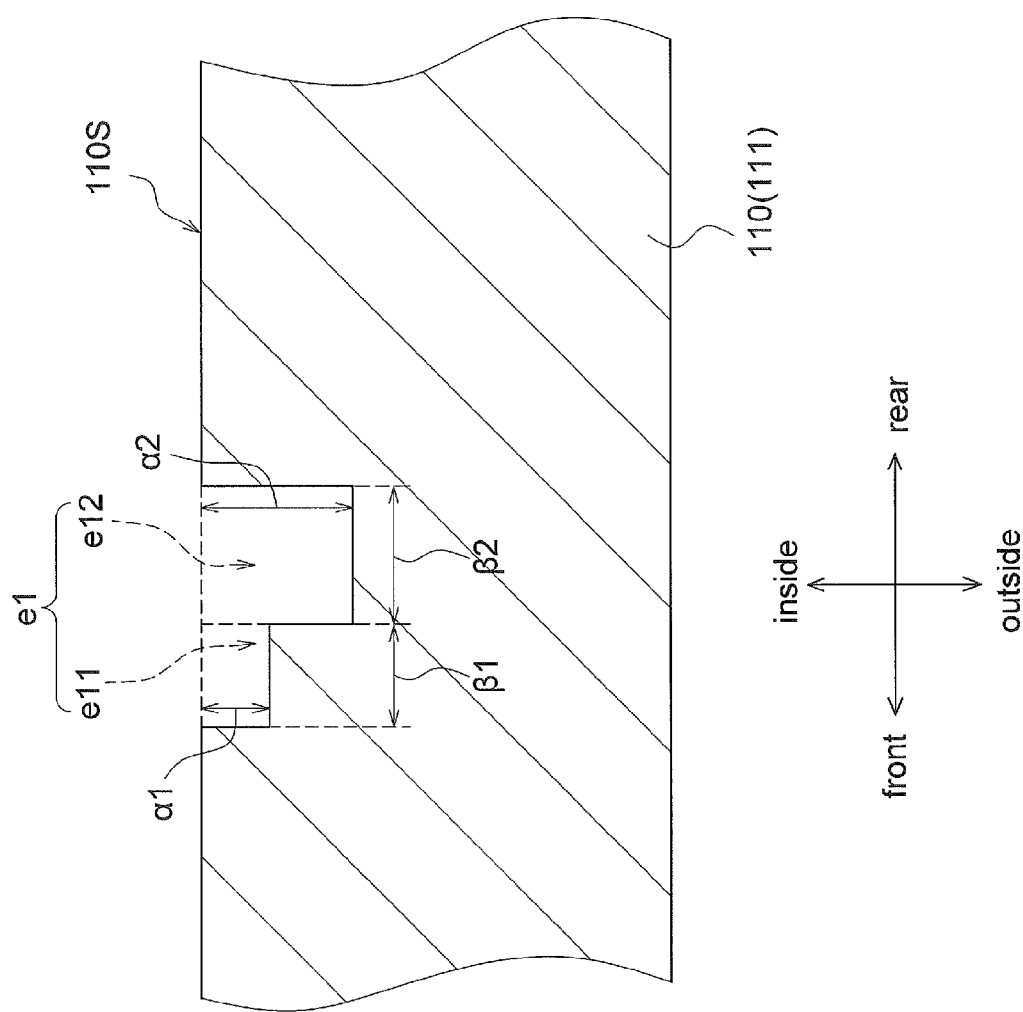
FIG. 6 is a V-V cross section of FIG. 5.

FIG. 6 here is a V-V cross section of FIG. 5, and shows a cross sectional view of the first rectilinear frame 110 that passes through the center of the first rectilinear frame 110. As shown in FIG. 6, the radial direction depth of the bayonet groove e1 varies in steps along the axial direction of the first rectilinear frame 110 (that is, the optical axis direction).

More specifically, the bayonet groove e1 is made up of a first groove e11 and a second groove e12. The first groove e11 is a concave portion formed in the inner peripheral face 110S of the first rectilinear frame 110. The first groove e11 has a radial direction depth of $\alpha 1$ and an axial direction width of $\beta 1$. The cross sectional shape of the first groove e11 is rectangular. The second groove e12 is a concave portion formed in the inner peripheral face 110S of the first rectilinear frame 110. The second groove e12 is formed so as to be contiguous with the rear of the first groove e11. The second groove e12 has a radial direction depth of $\alpha 2$ and an axial direction width of $\beta 32$. The cross sectional shape of the second groove e12 is rectangular. The radial direction depth $\alpha 2$ of the second groove e12 is greater than the radial direction depth $\alpha 1$ of the first groove e11. Accordingly, the cross sectional shape of the bayonet groove e1 is a stepped shape, and the depth of the bayonet groove e1 is greater on the rear side.

The bayonet protrusion E0 is disposed at the front end of the inner peripheral face 110S. The bayonet protrusion E0 is formed in an arc shape in the peripheral direction. In this embodiment, a plurality of bayonet protrusions E0 are provided in the peripheral direction.

3. Configuration of First Rotary Frame 210

Figure 7:
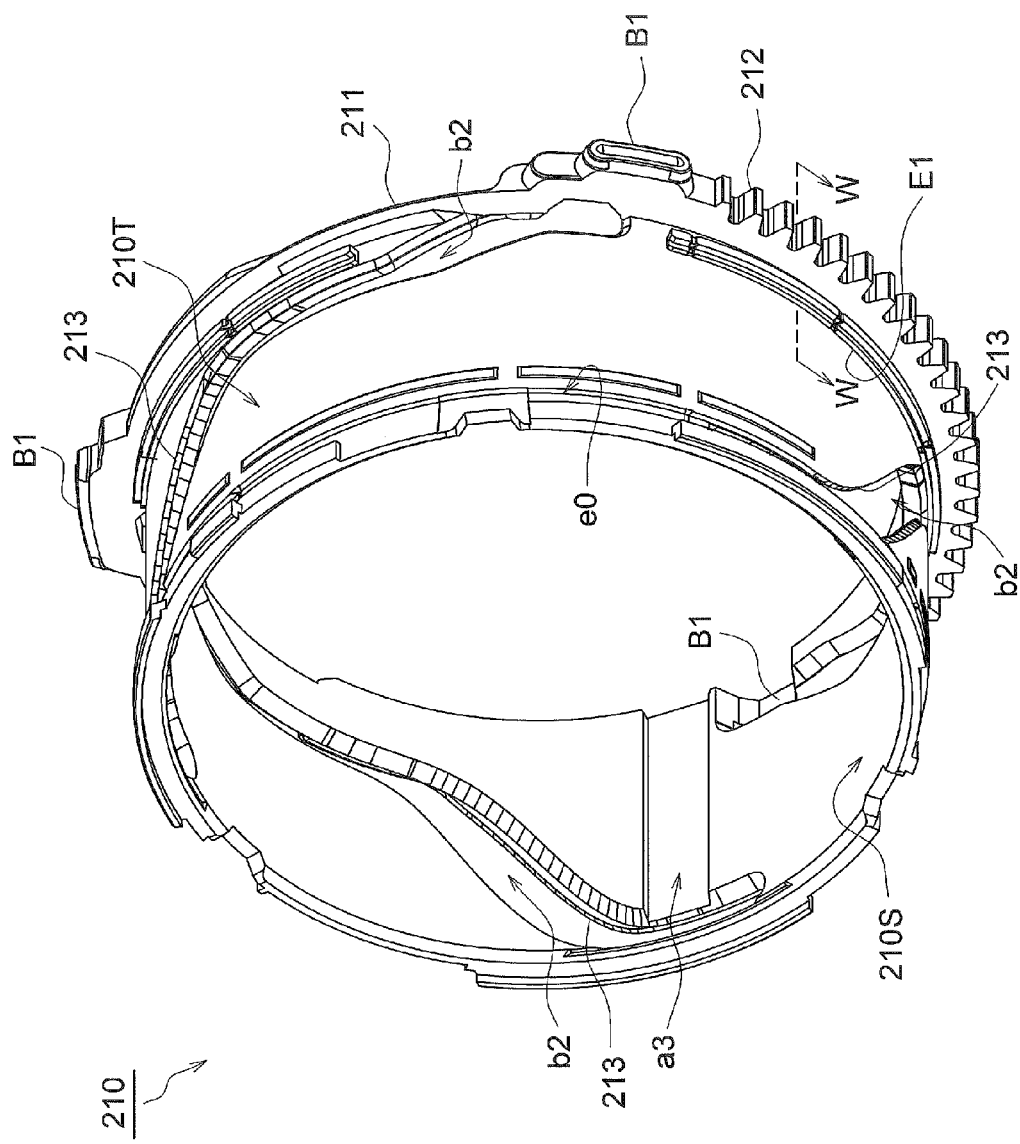
FIG. 7 is a front oblique view of a first rotary frame.
Figure 8:
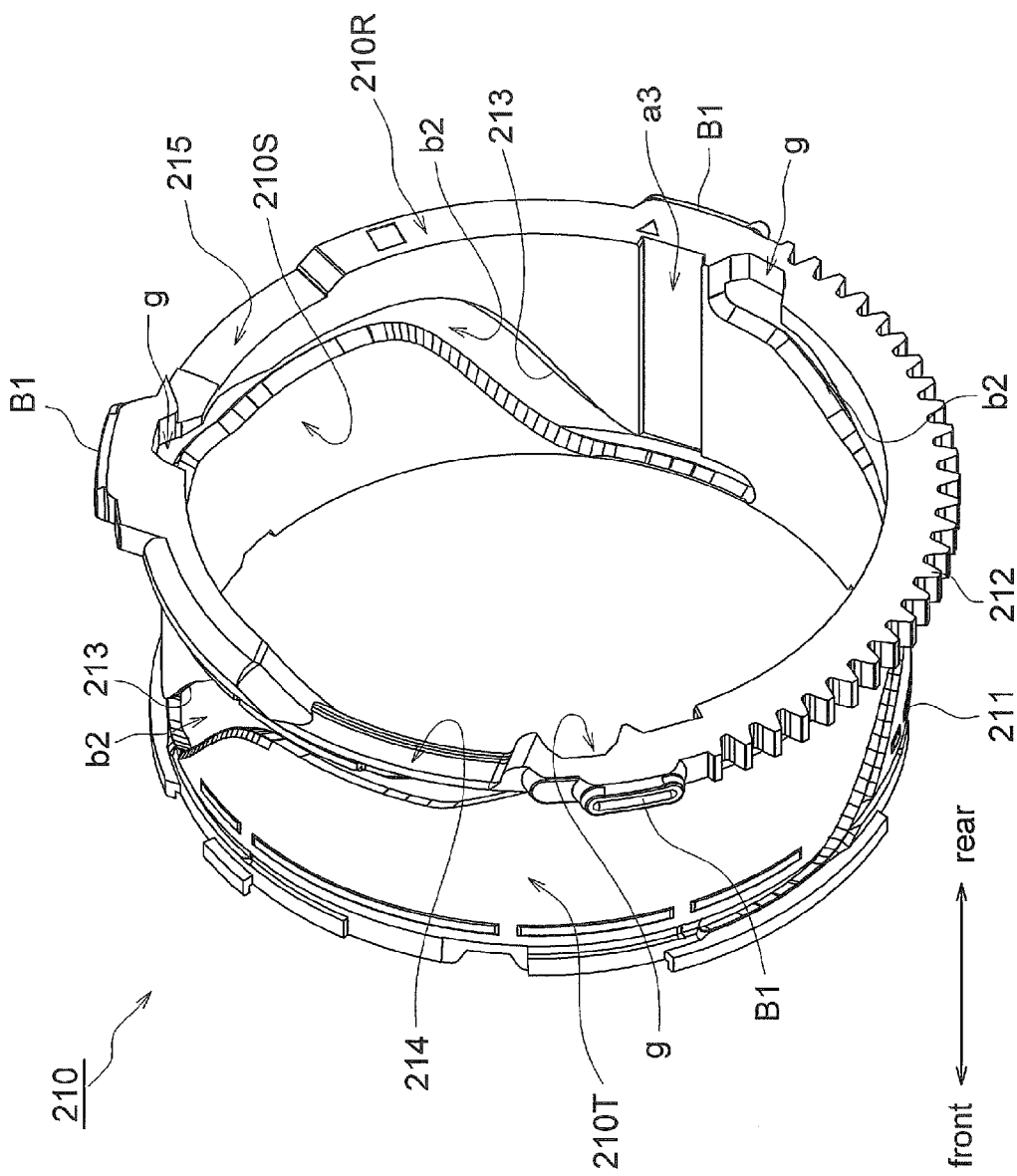
FIG. 8 is a rear oblique view of a first rotary frame.
Figure 9:
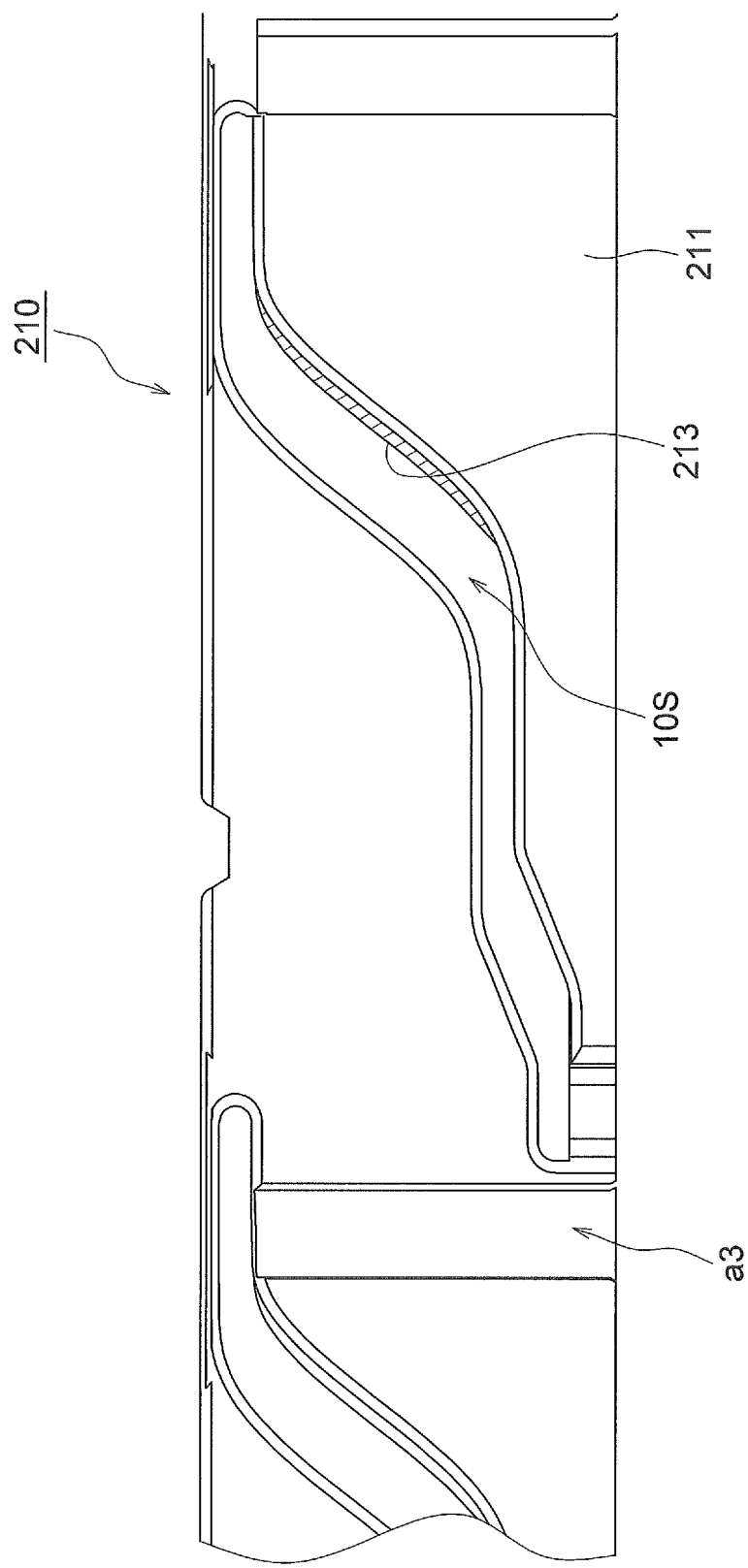
FIG. 9 is a developed view of the inner face of a first rotary frame.

FIG. 7 is a front oblique view of the first rotary frame 210. FIG. 8 is a rear oblique view of the first rotary frame 210. FIG. 9 is a developed view of the inner face of the first rotary frame 210.

The first rotary frame 210 has a first rotary frame main body 211, a gear portion 212, a contact band 213, a wiring recess 214, and a frame recess 215.

The first rotary frame main body 211 is formed in a cylindrical shape, and has an inner peripheral face 210S, an outer peripheral face 210T, and a rear end face 210R.

The gear portion 212 is provided to the rear end of the outer peripheral face 210T, and is formed in the peripheral direction. When the gear portion 212 meshes with the zoom gear 242, the first rotary frame 210 is rotated in the peripheral direction by the drive force of the zoom motor 241. Although not depicted, the gear portion 212 is disposed further to the rear than the rectilinear protrusions A1 of the first rectilinear frame 110.

Here, when the first rotary frame 210 moves closest to the master flange 244, the rotational position of the gear portion 212 in the peripheral direction is different from the rotational position in the peripheral direction of the control-use flexible wire 335a connected to the shutter frame 335. Specifically, in the refracted state of the lens barrel 20, the gear portion 212 is not opposite the control-use flexible wire 335a (see FIG. 28). Accordingly, this avoids damage to the control-use flexible wire 335a caused by snagging of the gear portion 212 of the first rotary frame 210 approaching the master flange 244.

The contact band 213 protrudes into the interior of the cam grooves b2 (discussed below). The contact band 213 is provided to the portion of the cam grooves b2 that intersects the peripheral direction. In this embodiment, the contact band 213 is formed so as to cover the outer peripheral side on the rear of the cam grooves b2.

Two opposing sloped faces are formed in the cam grooves b2 on the inside of the first rotary frame 210 in the radial direction. The two opposing sloped faces are able to come into contact with a first end face 31S1 and a second end face 31S2 (see FIG. 12) of the cam protrusions 31.

The contact band 213 is formed so as to protrude to the inside (the opposing sloped face side) of the sloped face that can come into contact with the first end face 31S1. As a result, the contact band 213 is configured so as to cover part of the cam protrusions 31 on the outside of the cam grooves b2 in the radial direction. Consequently, the above-mentioned contact portions 33 (31a in FIG. 14) come into contact with the contact band 213. Specifically, the rectilinear cam followers AB2 have the first end faces 31S1 that come into contact with the cam grooves b2, and the contact portions 33 that come into contact with the contact band 213.

The contact portions 33 should come into contact with the gear portion 212 when force is exerted on the second rectilinear frame 120. Consequently, the rectilinear cam followers AB2 come into contact with the contact band 213 (see FIGS. 13 and 14) when the force of a drop, an impact, or the like is exerted from the outside in the optical axis direction on the rectilinear cam followers AB2 of the second rectilinear frame 120 (discussed below). This makes it less likely that the cam protrusions 31 come loose from the cam grooves b2 when the camera is dropped, etc.

The wiring recess 214 is a cut-out formed in the peripheral direction of the rear end face 210R. As shown in FIG. 8, the wiring recess 214 is formed between two cam followers B1 (discussed below) in the peripheral direction. Specifically, the wiring recess 214 does not overlap the cam followers B1 when viewed in the optical axis direction. Also, the wiring recess 214 does not overlap the gear portion 212 when viewed in the optical axis direction. The wiring recess 214 is opposite the control-use flexible wire 335a connected to the shutter frame 335 when the first rotary frame 210 moves closest to the master flange 244.

Because the wiring recess 214 is thus formed in the first rotary frame 210, in the refracted state of the lens barrel 20, the first rotary frame 210 and the control-use flexible wire 335a can be sufficiently isolated from each other. Accordingly, this avoids damage to the control-use flexible wire 335a through contact with the rear end face 210R of the first rotary frame 210 that approaches the master flange 244 while rotating touches.

Also, since the wiring recess 214 does not overlap the gear portion 212 or the cam followers B1 in the optical axis direction, there is no need to reduce the size of the gear portion 212 and the cam followers B1. Therefore, the strength of the gear portion 212 and the cam followers B1 can be maintained.

The wiring recess 214 has a sloped face linked to the rear end face 210R, at least one end in the peripheral direction. Consequently, the control-use flexible wire 335a is less likely to snag on a step between the wiring recess 214 and the rear end face 210R.

The frame recess 215 is a cut-out formed in the rear end face 210R along the peripheral direction. As shown in FIG. 8, the frame recess 215 is formed between two cam followers B1 (discussed below) in the peripheral direction. Specifically, the frame recess 215 does not overlap the cam followers B1 when viewed in the optical axis direction. Nor does the frame recess 215 overlap the gear portion 212 when viewed in the optical axis direction. The frame recess 215 is opposite the fourth lens group frame 340 when the first rotary frame 210 moves closest to the master flange 244.

Thus forming the frame recess 215 in the first rotary frame 210 allows the first rotary frame 210 and the fourth lens group frame 340 to be sufficiently isolated in the refracted state of the lens barrel 20. Accordingly, this avoids damage to the fourth lens group frame 340 through contact with the rear end face 210R of the first rotary frame 210 that approaches the master flange 244 while rotating.

Also, since the frame recess 215 does not overlap the cam followers B1 or the gear portion 212 in the optical axis direction, there is no need to reduce the size of the cam followers B1 or the gear portion 212. Therefore, the strength of the cam followers B1 and the gear portion 212 can be maintained.

The frame recess 215 has a sloped face that is linked to the rear end face 210R, at at least one end in the peripheral direction. Consequently, the fourth lens group frame 340 is less likely to snag on a step between the frame recess 215 and the rear end face 210R.

The first rotary frame 210 has three cam followers B1, three bayonet protrusions E1, three cam grooves b2, the bayonet groove e0, and three rectilinear grooves a3. In FIG. 7, however, only one rectilinear groove a3 is shown.

The three cam followers B1 are provided to the rear end of the outer peripheral face 210T. Two of the three cam followers B1 are disposed at the two ends of the gear portion 212. The three cam followers B1 are engaged with the cam grooves b1 of the stationary frame 100.

When the first rotary frame 210 has moved closest to the master flange 244, the rotational position of the cam followers B1 in the peripheral direction is different from the rotational position in the peripheral direction of the control-use flexible wire 335a connected to the shutter frame 335. Specifically, in the refracted state of the lens barrel 20, the cam followers B1 are not opposite the control-use flexible wire 335a (see FIG. 28). Accordingly, this avoids damage to the control-use flexible wire 335a through snagging on the cam followers B1 by the first rotary frame 210 approaching the master flange 244 while rotating.

The bayonet protrusions E1 are formed in the peripheral direction at the rear end of the outer peripheral face 210T. The bayonet protrusions E1 are disposed in front of the gear portion 212. The bayonet protrusions E1 are engaged with the bayonet groove e1 of the first rectilinear frame 110. In this embodiment, the bayonet protrusions E1 and the bayonet groove e1 constitute a bayonet mechanism for rotatably engaging the first rotary frame 210 in the first rectilinear frame 110, and integrally engaging these in the optical axis direction.

Figure 10:
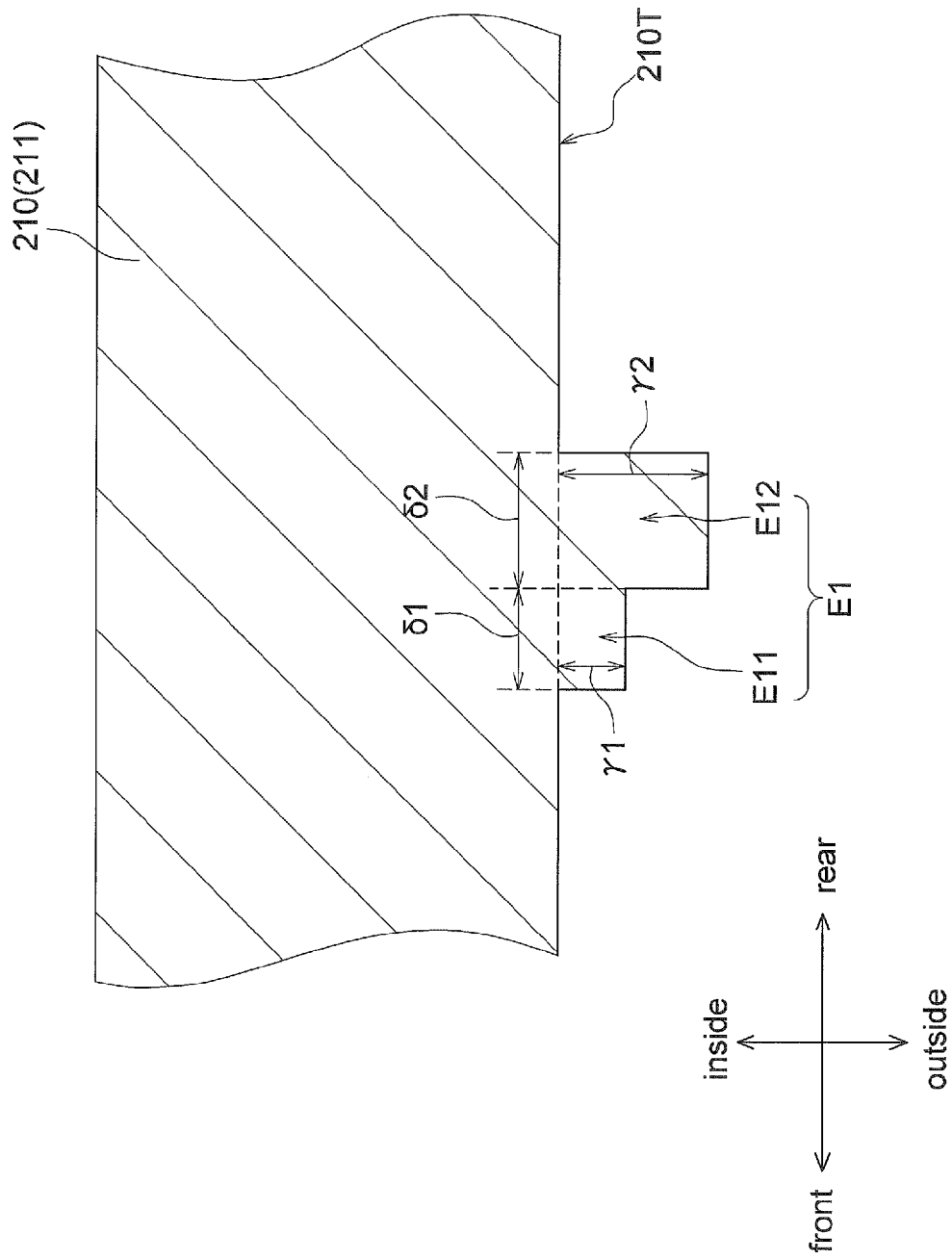
FIG. 10 is a W-W cross section of FIG. 7.

FIG. 10 is a W-W cross section of FIG. 7, and shows a cross section of the first rotary frame 210 through the axis of the first rotary frame 210. As shown in FIG. 10, the radial direction height of the bayonet protrusions E1 varies in steps along the axial direction of the first rotary frame 210 (that is, the optical axis direction) according to the shape of the bayonet groove e1 shown in FIG. 6.

More specifically, the bayonet protrusions E1 are each constituted by a first protrusion E11 and a second protrusion E12. The first protrusions E11 are convex portions formed on the outer peripheral face 210T of the first rotary frame 210. The first protrusions E11 have a radial direction height $\gamma 1$ and an axial direction width $\delta 1$. The cross sectional shape of the first protrusions E11 is rectangular. The second protrusions E12 are convex portions formed on the outer peripheral face 210T of the first rotary frame 210. The second protrusions E12 are formed so as to be contiguous with the rear of the first protrusions E11. The second protrusions E12 have a radial direction height $\gamma 2$ and an axial direction width $\delta 2$. The cross sectional shape of the second protrusions E12 is rectangular. The radial direction height $\gamma 2$ of the second protrusions E12 is greater than the radial direction height $\gamma 1$ of the first protrusions E11. Therefore, the cross sectional shape of the bayonet protrusions E1 is a stepped shape, and the height of the bayonet protrusions E1 is greater at the rear.

The three cam grooves b2 pass through the first rotary frame main body 211 from the inner peripheral face 210S to the outer peripheral face 210T.

The bayonet groove e0 is formed at the front end of the outer peripheral face 210T. The bayonet groove e0 is formed in an arc shape along the peripheral direction. The bayonet groove e0 intersects the three cam grooves b2. The bayonet protrusion E0 is engaged with the bayonet groove e0.

The three rectilinear grooves a3 are formed along the optical axis direction in the inner peripheral face 210S. Two of the three rectilinear grooves a3 are close together, and the other one is separated by 120° to 180°.

4. Configuration of Second Rectilinear Frame 120

Figure 11:
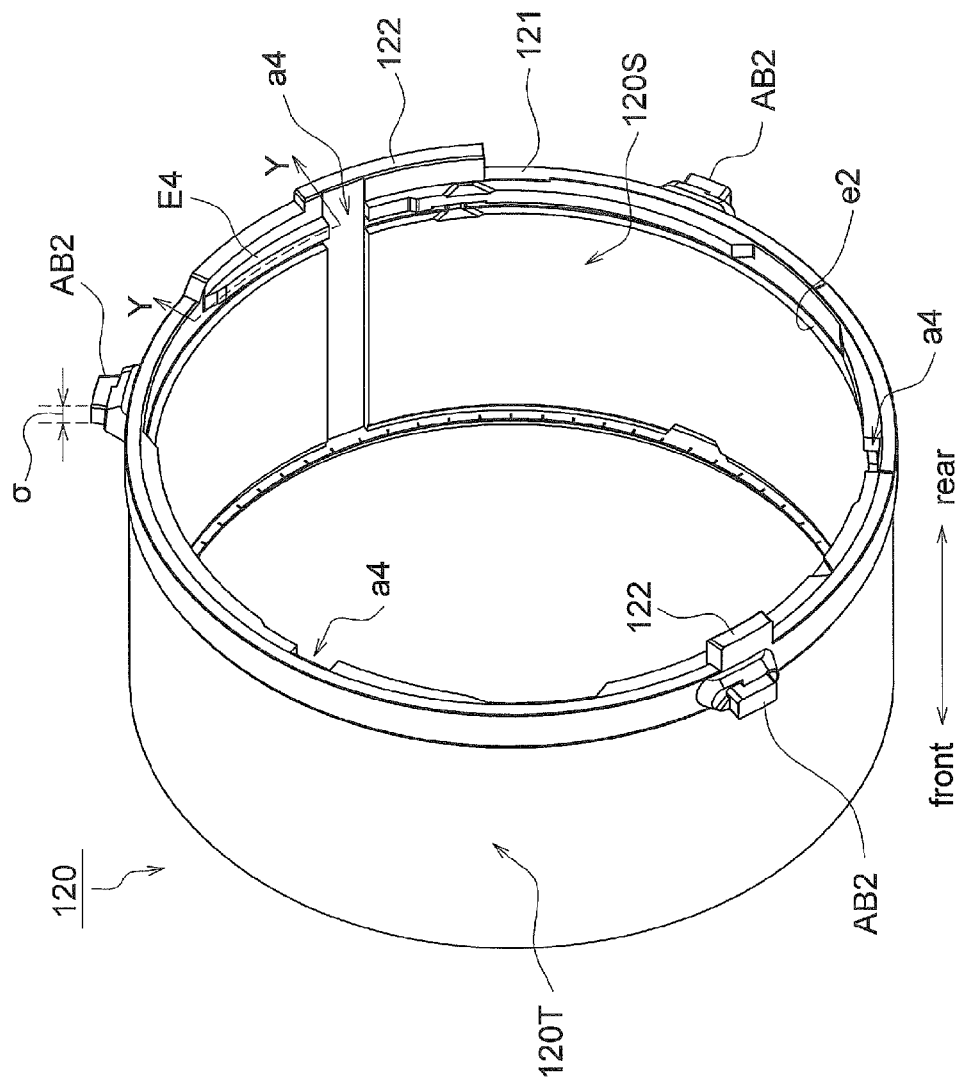
FIG. 11 is an oblique view of a second rectilinear frame.

FIG. 11 is an oblique view of the second rectilinear frame 120. The second rectilinear frame 120 has a second rectilinear frame main body 121 and two latching portions 122.

The second rectilinear frame main body 121 is formed in a cylindrical shape, and has an inner peripheral face 120S and an outer peripheral face 120T.

The two latching portions 122 are provided on the rear end face of the second rectilinear frame main body 121, and protrude toward the rear. The two latching portions 122 are formed at substantially symmetrical positions around the optical axis AX (see FIG. 3), that is, at positions that are separated by 120° to 180°. As will be discussed below, when the two latching portions 122 are latched to the third rectilinear frame 130, the relative rotation of the third rectilinear frame 130 with respect to the second rectilinear frame 120 is checked. In this embodiment, one of the two latching portions 122 is formed longer in the peripheral direction than the other one.

The second rectilinear frame 120 has three rectilinear cam followers AB2, three rectilinear grooves a4, a bayonet groove e2, and three bayonet protrusions E4.

The three rectilinear cam followers AB2 are provided at the rear end of the outer peripheral face 120T, and are disposed at a substantially constant pitch in the peripheral direction. The three rectilinear cam followers AB2 are engaged with the three cam grooves b2 of the first rotary frame 210. Also, the three rectilinear cam followers AB2 pass through the three cam grooves b2 and are engaged with the three rectilinear grooves a2 of the first rectilinear frame 110. As shown in FIG. 11, the rectilinear cam followers AB2 have an optical axis direction width $\sigma$. The optical axis direction width $\sigma$ of the rectilinear cam followers AB2 is greater than the optical axis direction width $\beta 2$ of the second groove e12 of the bayonet groove e1. Consequently, the rectilinear cam followers AB2 are less likely to snag on the bayonet groove e1. Also, the optical axis direction width $\sigma$ of the rectilinear cam followers AB2 is less than the sum of the optical axis direction width $\beta 1$ of the first groove e11 and the optical axis direction width $\beta 2$ of the second groove e12. This reduces the optical axis direction width $\sigma$, and shortens the refraction length of the lens barrel 20.

Figure 12:
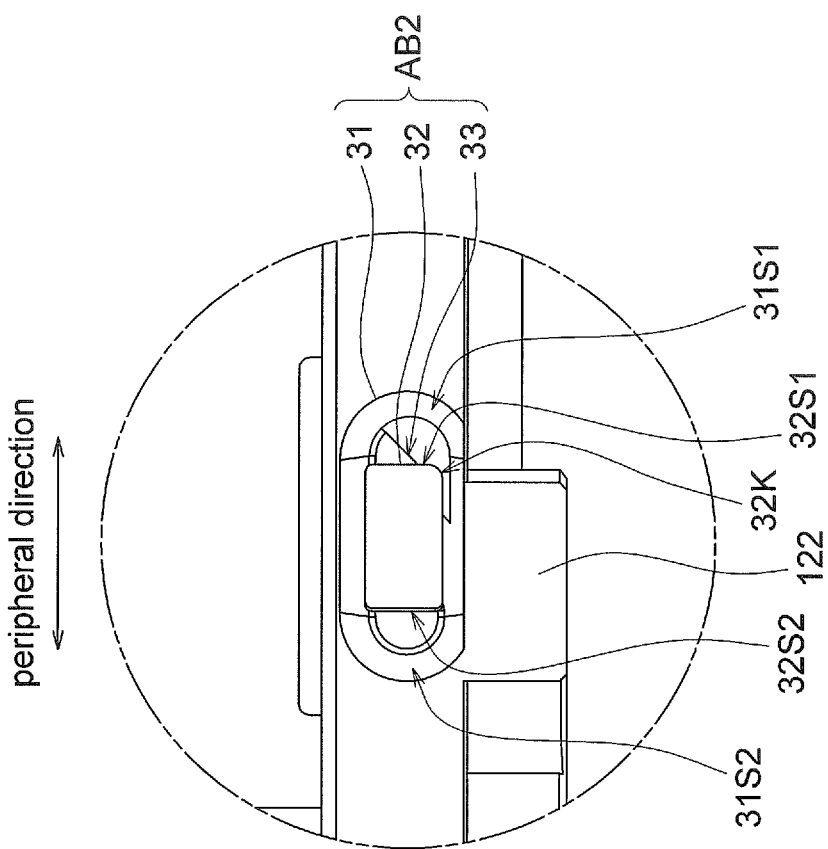
FIG. 12 is a detail plan view of a rectilinear cam follower.
Figure 13:
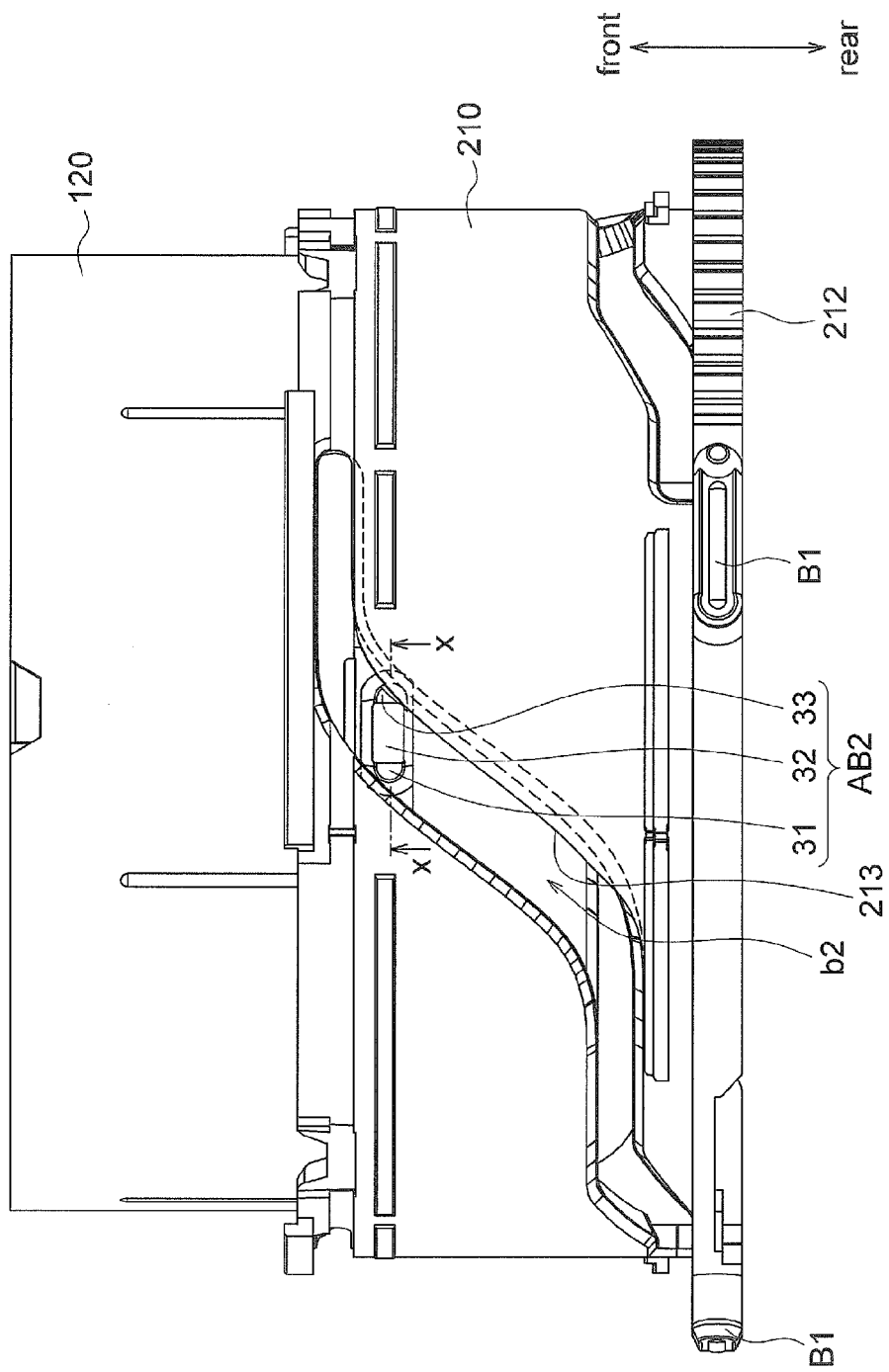
FIG. 13 is a side view of a second rectilinear frame engaged with a first rotary frame.
Figure 14:
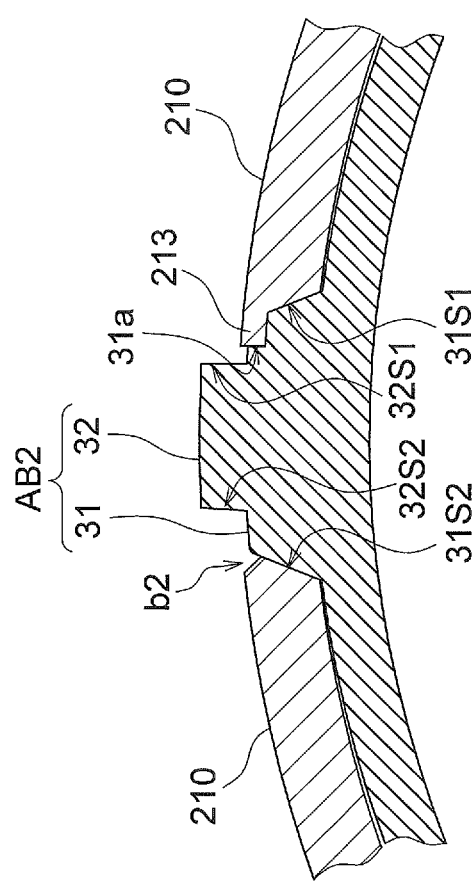
FIG. 14 is an X-X cross section of FIG. 13.

FIG. 12 is a detail plan view of a rectilinear cam follower AB2. FIG. 13 is a side view of the second rectilinear frame 120 engaged with the first rotary frame 210. FIG. 14 is an X-X cross section of FIG. 13.

As shown in FIG. 12, the rectilinear cam followers AB2 each have a cam protrusion 31, a rectilinear protrusion 32, and a contact portion 33. The cam protrusions 31 are disposed on the outer peripheral face 120T of the second rectilinear frame 120. The cam protrusions 31 are the portions of the rectilinear cam followers AB2 that are engaged with the cam grooves b2 of the first rotary frame 210. The rectilinear protrusions 32 are disposed on the cam protrusions 31. The rectilinear protrusions 32 are the portions of the rectilinear cam followers AB2 that are engaged with the rectilinear grooves a2 of the first rectilinear frame 110. The contact portions 33 are disposed on the cam protrusions 31.

As shown in FIG. 12, the cam protrusions 31 and the rectilinear protrusions 32 are each formed so as to extend in the peripheral direction. More specifically, the cam protrusions 31 are formed so that the length of the cam protrusions 31 in the peripheral direction is greater than the length of the cam protrusions 31 in the optical axis direction. Also, the rectilinear protrusions 32 are formed so that the length of the rectilinear protrusions 32 in the peripheral direction is greater than the length of the rectilinear protrusions 32 in the optical axis direction. Furthermore, the rectilinear protrusions 32 are formed so that the length of the rectilinear protrusions 32 in the peripheral direction is less than the length of the cam protrusions 31 in the peripheral direction.

This allows the cross sectional area of the two to be increased without increasing the size of the rectilinear cam followers AB2 in the optical axis direction. Therefore, the strength of the cam protrusions 31 and the rectilinear protrusions 32 can be increased.

Also, as shown in FIG. 12, the cam protrusions 31 each have a first end face 31S1 and a second end face 31S2. The first and second end faces 31S1 and 31S2 are the two end faces of the cam protrusions 31 in the peripheral direction. The first and second end faces 31S1 and 31S2 are each a part of a conical face whose center is the radial direction of the second rectilinear frame 120. Also, the rectilinear protrusions 32 are formed in a cuboid shape, and each have a first end face 32S1 and a second end face 32S2. The first and second end faces 32S1 and 32S2 are the two ends faces of the rectilinear protrusions 32 in the peripheral direction, and are planes that are perpendicular to the peripheral direction. Since the first and second end faces 31S1 and 31S2 of the cam protrusions 31 are thus part of a conical face, when the cam grooves b2 of the first rotary frame 210 are formed by injection molding, a gradient shape results that allows the mold to be smoothly removed. Also, since the first and second end faces 31S1 and 31S2 of the cam protrusions 31 are part of a conical face, the cam protrusions 31 can follow the entire length of the cam grooves b2 even though the cam grooves b2 of the first rotary frame 210 have a cam path with a nonlinear amount of movement in the optical axis direction with respect to the rotational angle. Furthermore, if the length of the first and second end faces 32S1 and 32S2 of the rectilinear protrusions 32 in the optical axis direction is greater than the length in the optical axis direction of the bayonet groove e1 that intersects the rectilinear grooves a2 of the first rectilinear frame 110, the rectilinear protrusions 32 is smoothly movable through the rectilinear grooves a2, without snagging on the bayonet groove e1.

As shown in FIG. 13, the rectilinear cam followers AB2 are disposed in front in the optical axis direction of the cam followers B1 of the first rotary frame 210. Accordingly, the wall formed more on the optical axis direction front side than the cam grooves b1 of the stationary frame 100 engaged with the cam followers B1 of the first rotary frame 210 can be made thicker without increasing the length of the stationary frame 100 in the optical axis direction. Therefore, the strength of the stationary frame 100 against external force can be increased.

As shown in FIG. 13, the rectilinear cam followers AB2 are disposed more on the optical axis direction front side than the gear portion 212 of the first rotary frame 210. Accordingly, the length in the optical axis direction of the zoom gear 242 that meshes with the gear portion 212 of the first rotary frame 210 can be shortened. Therefore, the lens barrel 20 can be made more compact in the optical axis direction.

As shown in FIGS. 12 to 14, the cam protrusions 31 have the contact portions 33 that come into contact with the contact band 213 of the first rotary frame 210. The contact portions 33 are formed by cutting out the upper ends of the first end faces 31S1 of the cam protrusions 31. These contact portions 33 may also be formed by building up the upper part of the cam protrusions 31 on the first end face 31S1 side. Providing the contact band 213 in this way makes it less likely that the cam protrusions 31 come loose from the cam grooves b2.

The rectilinear protrusions 32 have rectilinear protrusion corner 32K. The rectilinear protrusion corner 32K is corner that is opposite the contact band 213 on the rear side of the rectilinear protrusions 32. The rectilinear protrusion corner 32K is R-shaped so as not to be deformed by contact with the contact band 213.

When the rectilinear protrusion corner 32K contacts with the contact band 213, causing an external force to be exerted on the second rectilinear frame 120 from the front, the first end faces 31S1 are less likely to slide along the inner faces of the cam grooves b2. Therefore, it is less likely that the rectilinear cam followers AB2 come loose from the cam grooves b2 and dig into the inside of the first rotary frame 210.

The rectilinear cam followers AB2 are such that the first end faces 31S1 of the cam protrusions 31 come into contact with the inside faces of the cam grooves b2 at the inner face of the contact band 213. Accordingly, if an external force is exerted on the second rectilinear frame 120 from the front, stress is not concentrated on just one part of the cam protrusions 31, so the rectilinear cam followers AB2 are less likely to be damaged.

The three rectilinear grooves a4 are formed in the inner peripheral face 120S along the optical axis direction. The three rectilinear grooves a4 are disposed at a substantially constant pitch in the peripheral direction.

The bayonet groove e2 is formed at the rear end of the inner peripheral face 120S in the peripheral direction. The bayonet groove e2 intersects the three rectilinear grooves a4.

The three bayonet protrusions E4 are formed in the peripheral direction at the rear end of the inner peripheral face 120S. The three bayonet protrusions E4 are engaged with three bayonet grooves e4 of the second rotary frame 220.

Figure 15:
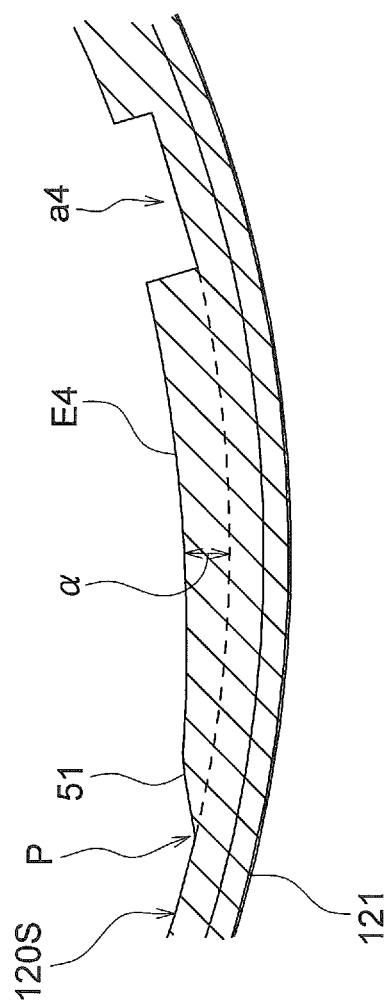
FIG. 15 is a Y-Y cross section of FIG. 11.

FIG. 15 is a Y-Y cross section of FIG. 11. As shown in FIG. 15, the height $\alpha$ of the bayonet protrusions E4 in the peripheral direction decreases moving toward the end point p of the bayonet protrusions E4. Specifically, no corners are formed at the ends 51 of the bayonet protrusions E4. The height $\alpha$ is relative to the inner peripheral face 120S.

Since the height $\alpha$ of the bayonet protrusions E4 thus decreases gradually, if an external force is exerted on the second rectilinear frame 120 from the front, the bending moment force exerted on the ends 51 can be reduced. Therefore, the ends 51 are less likely to be damaged.

5. Configuration of Second Rotary Frame 220

Figure 16:
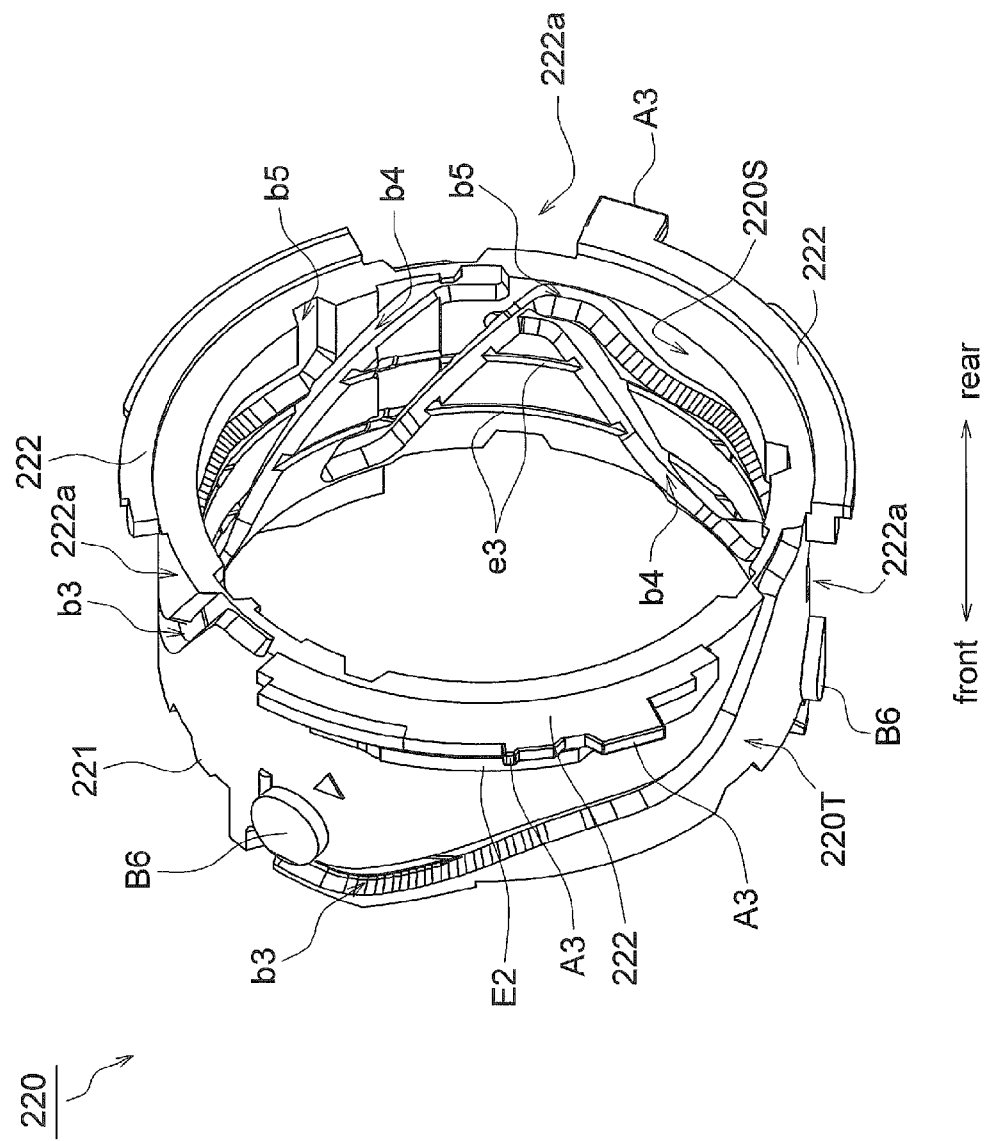
FIG. 16 is a rear oblique view of a second rotary frame.
Figure 17:
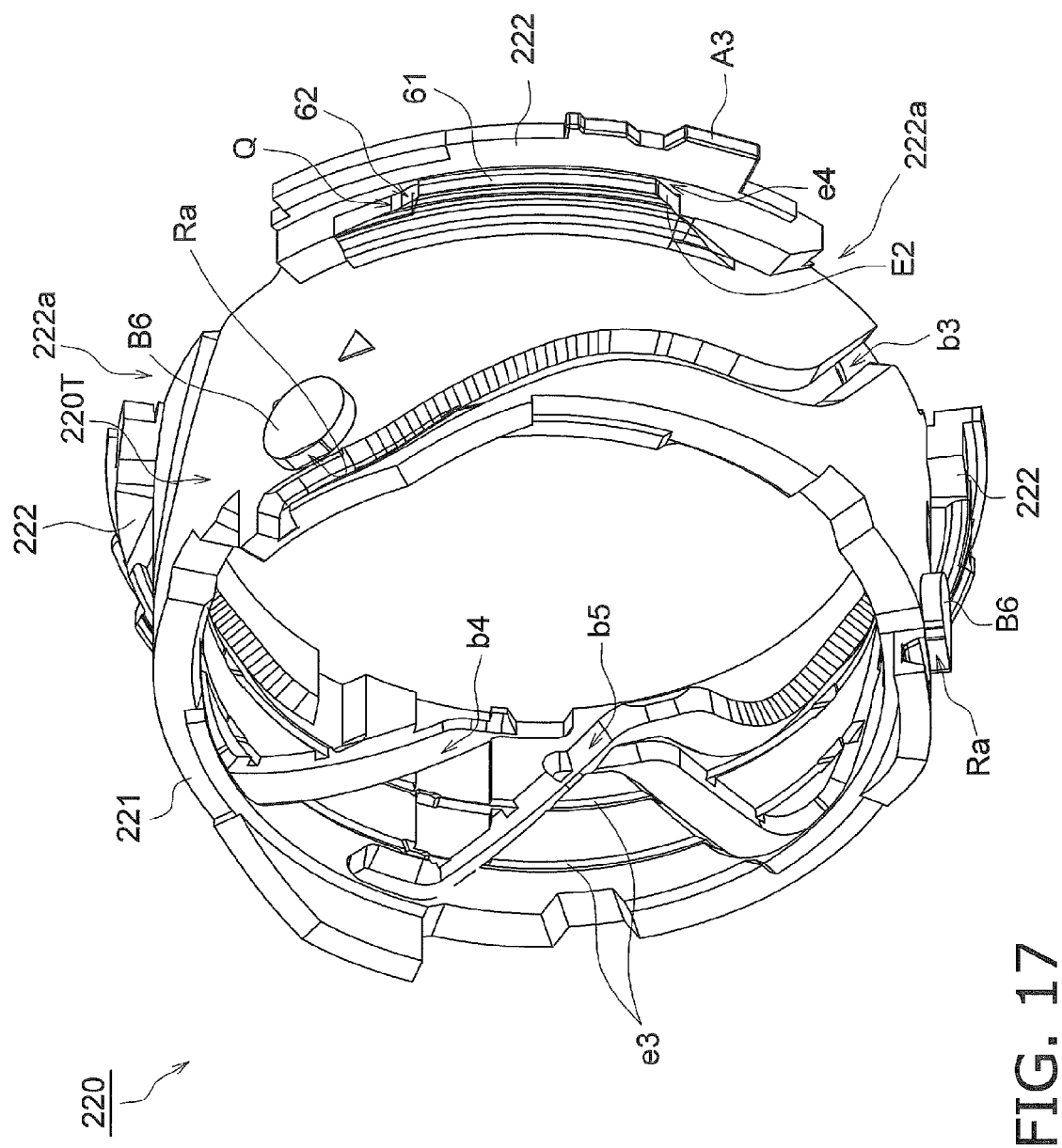
FIG. 17 is a front oblique view of a second rotary frame.

FIG. 16 is a rear oblique view of the second rotary frame 220. FIG. 17 is a front oblique view of the second rotary frame 220.

The second rotary frame 220 has a second rotary frame main body 221, three flanges 222, three rectilinear protrusions A3, three bayonet protrusions E2, two bayonet grooves e3, three cam grooves b3, three cam grooves b4, three cam grooves b5, three bayonet grooves e4, and three cam protrusions B6. In FIG. 16, however, only two each of the cam grooves e3, the cam grooves b4, and the cam grooves b5 are shown.

The second rotary frame main body 221 is formed in a cylindrical shape, and has an inner peripheral face 220S and an outer peripheral face 220T.

The three flanges 222 are provided at the rear end of the outer peripheral face 220T, and extend in the peripheral direction. The three flanges 222 are separated from one another in the peripheral direction, and flange recesses 222a are formed in between them. The protrusions 311a of the first lens group frame 310 (discussed below) are housed in the flange recesses 222a in the refracted state of the lens barrel 20.

The three rectilinear protrusions A3 are provided on two of the flanges 222, two of the three rectilinear protrusions A3 are close together in the peripheral direction, and the other one is separated by about 120° or more from the two rectilinear protrusions A3 that are close together. The three rectilinear protrusions A3 are engaged with the three rectilinear grooves a3 of the first rotary frame 210.

The three bayonet protrusions E2 are formed in the peripheral direction at the rear end of the outer peripheral face 220T. The three bayonet protrusions E2 are disposed in front of the three rectilinear protrusions A3. The bayonet protrusions E2 are engaged with the bayonet groove e2 of the second rectilinear frame 120. In this embodiment, the bayonet protrusions E2 and the bayonet groove e2 constitute a bayonet mechanism for rotatably engaging the second rotary frame 220 with the second rectilinear frame 120.

The two bayonet grooves e3 are formed in the approximate center of the inner peripheral face 220S in the peripheral direction. The two bayonet grooves e3 are formed parallel to each other. The two bayonet grooves e3 intersect with the cam grooves b4 and the cam grooves b5.

The three cam grooves b3 are formed in the outer peripheral face 220T so as to intersect with the optical axis direction, and are disposed at a substantially constant pitch in the peripheral direction.

The cam grooves b4 and the cam grooves b5 are formed in the inner peripheral face 220S. The cam grooves b4 and the cam grooves b5 intersect each other.

The three bayonet grooves e4 are formed in front of the three rectilinear protrusions A3 at the rear end of the outer peripheral face 220T. The three bayonet grooves e4 are formed in an arc shape along the peripheral direction. The three bayonet grooves e4 are engaged with the three bayonet protrusions E4 of the second rectilinear frame 120.

As shown in FIG. 17, the bayonet grooves e4 are constituted by a peripheral direction wall 61 disposed in the peripheral direction on the outer peripheral face 220T. Cut-outs 62 into which the bayonet protrusions E4 are fitted are formed in the peripheral direction walls 61. When viewed in the optical axis direction, the shape of the cut-outs 62 corresponds to the shape of the ends 51 of the bayonet protrusions E4 (see FIG. 15). Specifically, the radial direction depth of the cut-outs 62 increases moving toward the end point Q of the peripheral direction wall 61.

Since the shape of the cut-outs 62 thus corresponds to the shape of the ends 51 of the bayonet protrusions E4, adequate engagement width can be ensured merely by rotating the bayonet protrusions E4 a small amount after being fitted into the cut-outs 62. Therefore, the bayonet protrusions E4 can be securely engaged with the bayonet grooves e4, so if an external force is exerted on the second rectilinear frame 120 from the front, the second rectilinear frame 120 and the second rotary frame 220 are less likely to become disengaged.

The three cam protrusions B6 are disposed on the front end side of the outer peripheral face 220T. The three cam protrusions B6 are engaged with the three cams b6 had by the first lens group frame 310 (discussed below). The cam protrusions b6 each have a front face Ra. The front faces Ra slide over cam faces Ta of the cams b6 shown in FIG. 21 (including the rear end faces Sa). When the front faces Ra and the cam faces Ta (including the rear end faces Sa) come into contact, the front faces Ra are preferably inclined in the direction in which the front faces Ra and the cam faces Ta dig into each other (that is, rearward in the inside radial direction from the outer periphery).

6. Configuration of Third Rectilinear Frame 130

Figure 18:
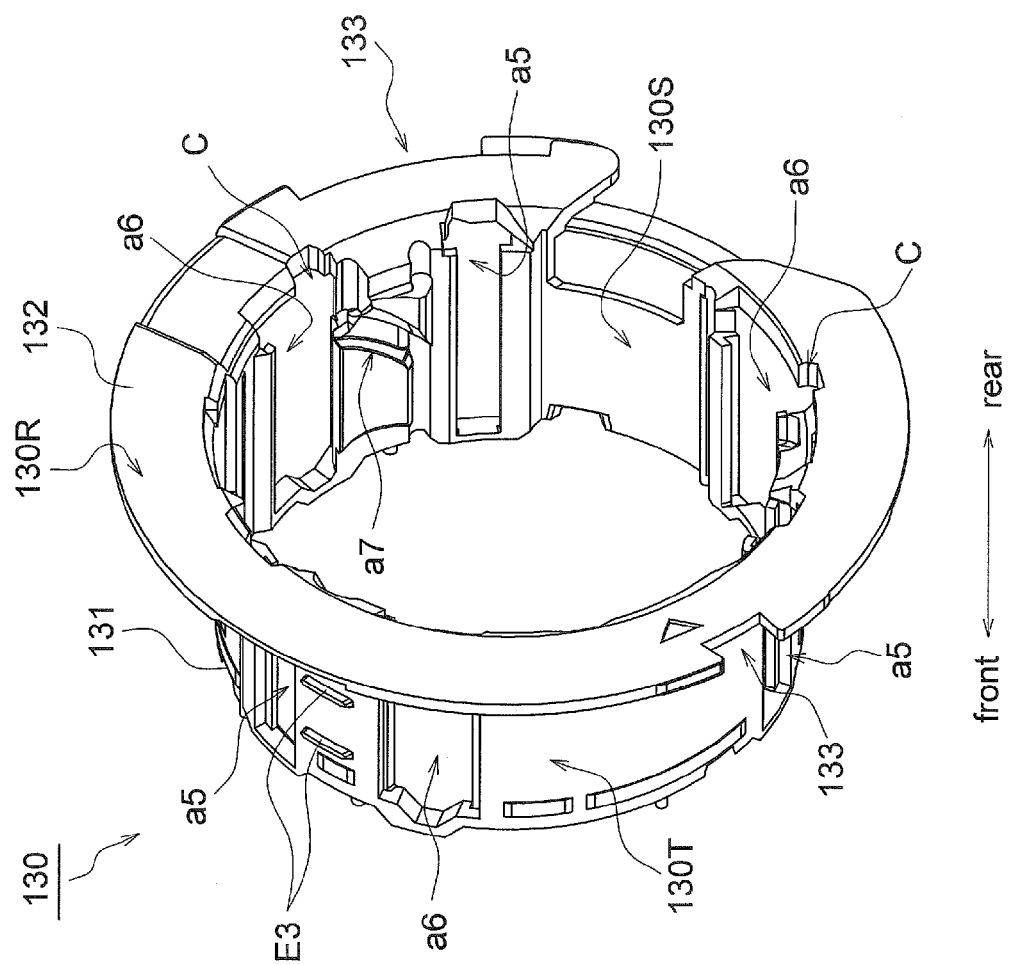
FIG. 18 is a rear oblique view of a third rectilinear frame.
Figure 19:
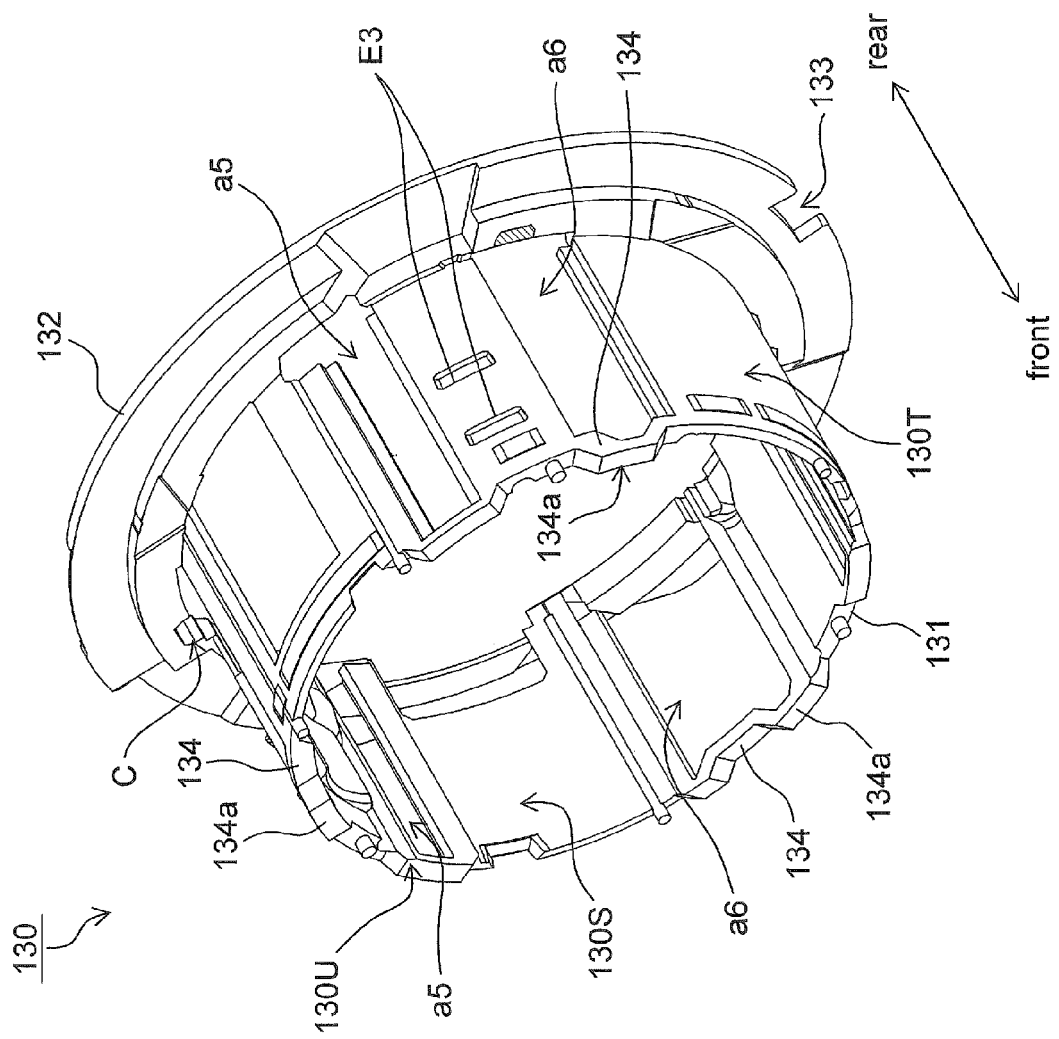
FIG. 19 is a front oblique view of a third rectilinear frame.

FIG. 18 is a rear oblique view of the third rectilinear frame 130. FIG. 19 is a front oblique view of the third rectilinear frame 130. The third rectilinear frame 130 has a third rectilinear frame main body 131, a flange 132, and two latching recesses 133.

The third rectilinear frame main body 131 is formed in a cylindrical shape, and has an inner peripheral face 130S, an outer peripheral face 130T, a rear end face 130R, and a front end face 130U.

The flange 132 is formed in an annular shape, and is provided on the rear end of the outer peripheral face 130T.

Figure 20:
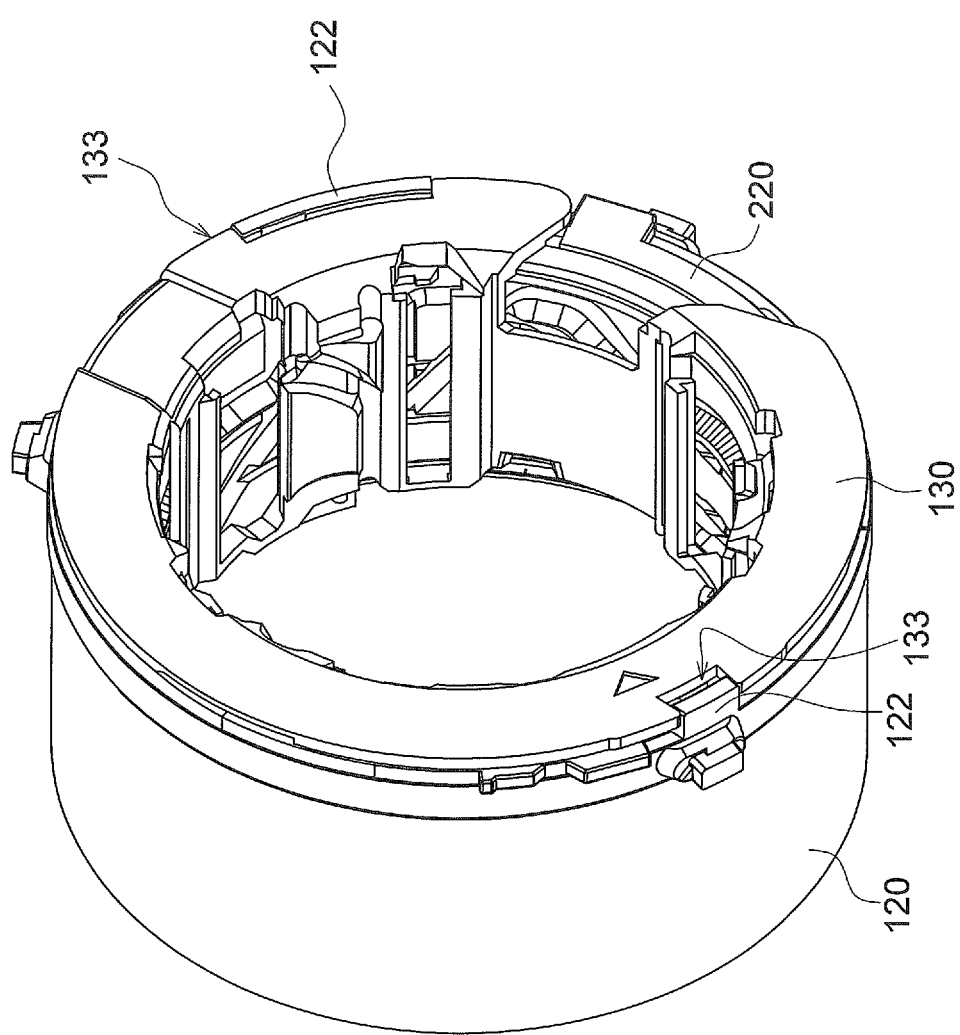
FIG. 20 is a schematic in which a second rectilinear frame, a second rotary frame, and a third rectilinear frame have been combined.

The two latching recesses 133 are cut-outs formed in the outer edge of the flange 132. The two latching recesses 133 are formed in substantially symmetrical positions around the optical axis AX (see FIG. 3). FIG. 20 is a schematic diagram in which the second rectilinear frame 120, the second rotary frame 220, and the third rectilinear frame 130 have been put together. As shown in FIG. 20, when the two latching portions 122 of the second rectilinear frame 120 are latched to the two latching recesses 133 of the third rectilinear frame 130, relative rotation of the third rectilinear frame 130 with respect to the second rectilinear frame 120 is checked.

One of the two latching recesses 133 is formed longer in the peripheral direction than the other one, corresponding to the fact that one of the two latching portions 122 is formed longer in the peripheral direction than the other one. This increases the strength of the two latching recesses 133.

The third rectilinear frame 130 has two bayonet protrusions E3, three rectilinear grooves a5, and three rectilinear grooves a6. In FIG. 18, however, only two of the bayonet protrusions E3 are shown.

The two bayonet protrusions E3 are formed in the peripheral direction in the approximate center of the outer peripheral face 130T. The two bayonet protrusions E3 are formed parallel to each other. The two bayonet protrusions E3 are engaged with the two bayonet grooves e3 of the second rotary frame 220. In this embodiment, the bayonet protrusions E3 and the bayonet grooves e3 constitute a bayonet mechanism for rotatably engaging the third rectilinear frame 130 with the second rotary frame 220.

The three rectilinear grooves a5 pass through the third rectilinear frame main body 131 from the inner peripheral face 130S to the outer peripheral face 130T. The three rectilinear grooves a5 extend in the optical axis direction, and are disposed at a substantially constant pitch in the peripheral direction.

The three rectilinear grooves a6 pass through the third rectilinear frame main body 131 from the inner peripheral face 130S to the outer peripheral face 130T. The three rectilinear grooves a6 extend in the optical axis direction, and are disposed at a substantially constant pitch in the peripheral direction. The three rectilinear protrusions A6 had by the shutter frame 335 are engaged with three rectilinear grooves a6.

Here, just two of the three rectilinear grooves a6 have an opening c formed in the rear end face 130R. The openings c are provided to guide the cam protrusions B5 into the interior of the rectilinear grooves a6. The other rectilinear groove a6 does not have an opening in the rear end face 130R (see the hatched portion in FIG. 19). This increases the strength of the third rectilinear frame 130.

If the shutter frame 335 should be subjected to a force due to impact, dropping, etc., the cam protrusions B5 come into contact with the rear walls of the cam grooves b5 and try to come loose to the rear, but since the one rectilinear groove a6 has no opening in the rear end face 130R, it is less likely that the cam protrusions B5 comes loose.

Instead of the portion where the opening is blocked off as indicated by the hatching in FIG. 19, an opening C provided to the rear of guide groove a7 (FIG. 18) for retracting the retracting lens frame 401 may be blocked off. In this case, a driven portion 411 (see FIG. 27) of the retracting lens frame 401 can be prevented from coming loose from the shutter frame 335.

Also, when the shutter frame 335 is fitted to the third rectilinear frame 130, in a state in which one cam protrusion B5 has been engaged with the one rectilinear groove a6 with no opening in the rear end face 130R, the other two cam protrusions B5 can be introduced through the two openings c into the two rectilinear grooves a6. Therefore, the strength of the third rectilinear frame 130, and ease of assembly of the shutter frame 335 can be maintained at the same time.

Also, three retainers 134 are disposed ahead of the three rectilinear grooves a6. The front of the three rectilinear grooves a6 is closed off by the three retainers 134. Each of the three retainers 134 has a protrusion 134a that protrudes forward. The front ends of the rectilinear grooves a6 extend forward so as to go into the inside of the protrusions 134a.

The front end face 130U here has an uneven shape that matches the shape of the protrusions 134a of the retainers 134. This uneven shape of the front end face 130U corresponds to the uneven shape of the inner face of the first lens group frame 310. Therefore, when the lens barrel 20 is in its retracted state, the front end face 130U of the third rectilinear frame 130 is disposed on the inner face of the first lens group frame 310. Accordingly, the size in the forward and backward direction can be reduced when the third rectilinear frame 130 is fitted to the first lens group frame 310.

Part of the first lens group frame 310 can be housed in the concave part of the front end face 130U. Specifically, the first lens group frame 310 can be made locally thicker. This increases the strength of the first lens group frame 310.

In this embodiment, the three rectilinear grooves a5 and the three rectilinear grooves a6 are disposed alternately in the peripheral direction.

7. Configuration of First Lens Group Frame 310 and the Third Cosmetic Frame 303

Figure 21:
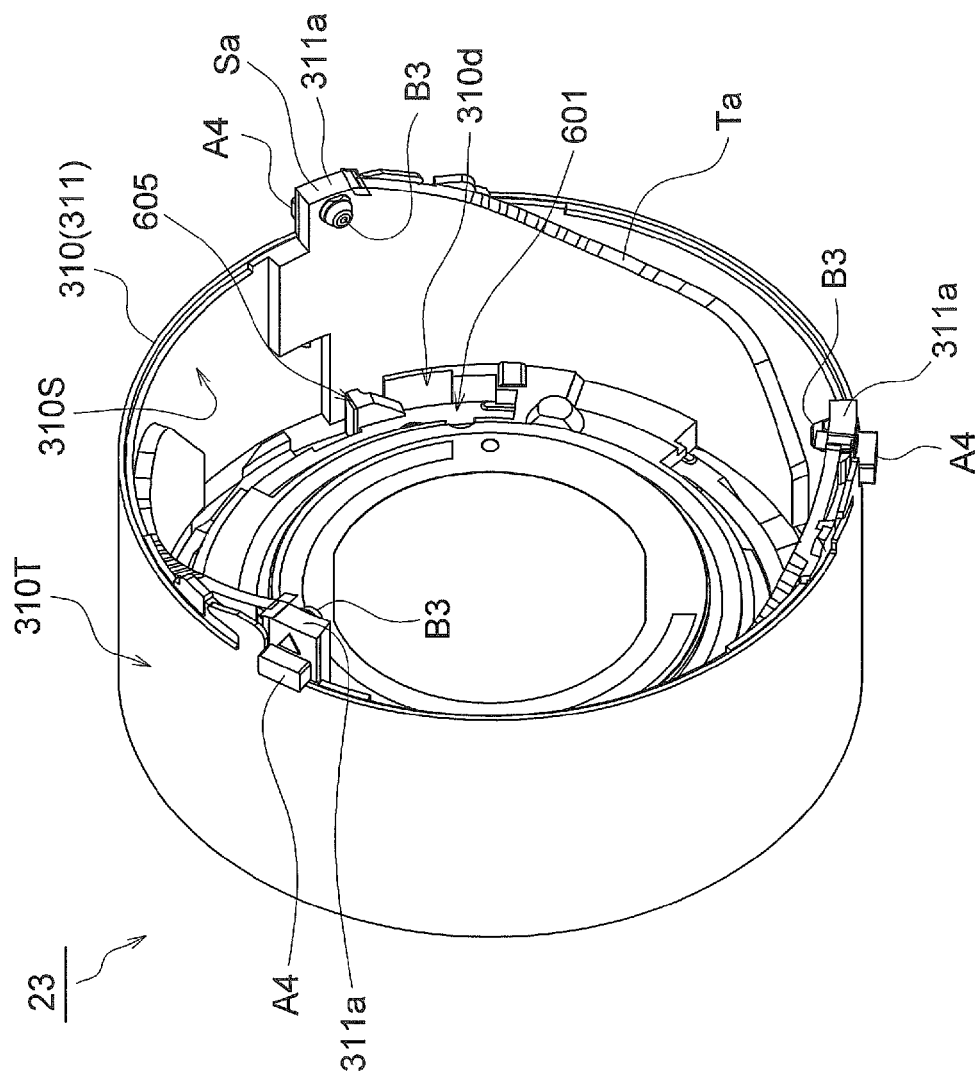
FIG. 21 is an oblique view of a first lens group frame and a third cosmetic frame.
Figure 22:
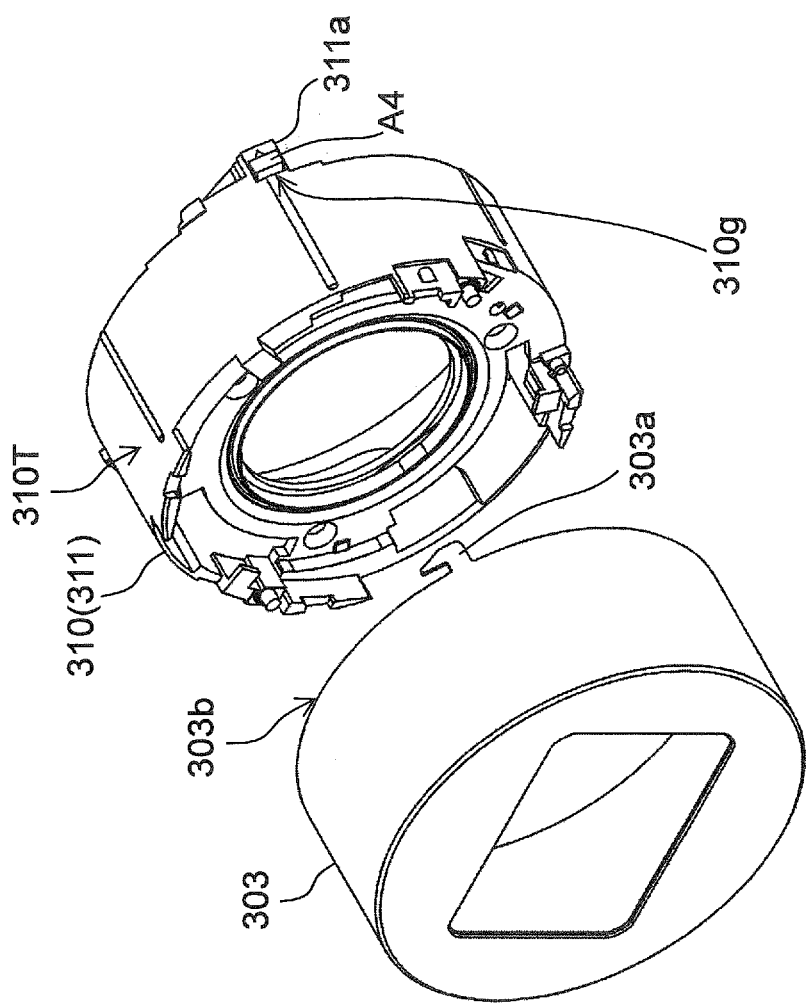
FIG. 22 is an exploded oblique view of a first lens group frame and a third cosmetic frame.

FIG. 21 is an oblique view of the first lens group frame 310 and the third cosmetic frame 303. FIG. 22 is an exploded oblique view of the first lens group frame 310 and the third cosmetic frame 303. In FIG. 22, however, a barrier mechanism 600 (see FIG. 35) disposed between the first lens group frame 310 and the third cosmetic frame 303 is not depicted.

The first lens group frame 310 has a first lens group frame main body 311, three rectilinear protrusions A4, three cam protrusions B3, and three cams b6.

The first lens group frame main body 311 is formed in a cylindrical shape, and has an inner peripheral face 310S and an outer peripheral face 310T. Three protrusions 311a that protrude toward the rear are formed on the first lens group frame main body 311. The rear end faces Sa of the protrusions 311a constitute the rear ends of the cam faces Ta (see FIG. 21). In the telephoto state of the lens barrel 20 (see FIG. 31), the cam protrusions B6 of the second rotary frame 220 are located on the rear end faces Sa.

The cam faces Ta are formed so that when the cam faces Ta (including the rear end faces Sa) and the front faces Ra of the cam protrusions B6 are pushed together, the cam faces Ta and the front faces Ra tilt in the direction of digging into each other (that is, rearward in the inside radial direction from the outer periphery). Specifically, the outside in the radial direction of the cam faces Ta is located ahead of the inside in the radial direction of the cam faces Ta. Accordingly, when the cam protrusions B6 are located on the cam faces Ta, even if an external force is exerted, the cam faces Ta push the cam protrusions B6 to the inside in the radial direction. Therefore, it is less likely that the cam protrusions B6 come loose from the cams b6 in the event that the first lens group frame 310 is subjected to an external force from the front.

If the front faces Ra tilt rearward to the inside in the radial direction from the outside, the cam faces Ta (including the rear end faces Sa) do not necessarily have to be tilted. However, if an external force is inputted to the frames, the front faces Ra and the cam faces Ta (including the rear end faces Sa) are preferably tilted in the direction of pushing the frames together in the radial direction.

The three rectilinear protrusions A4 are provided to the outer peripheral face 310T of the protrusions 311a, and are disposed at a substantially constant pitch in the peripheral direction. The three rectilinear protrusions A4 are engaged with the three rectilinear grooves a4 of the second rectilinear frame 120.

The three cam protrusions B3 are provided to the inner peripheral face 310S of the protrusions 311a, and are disposed at a substantially constant pitch in the peripheral direction. The three cam protrusions B3 are engaged with the three cam grooves b3 of the second rotary frame 220.

In this embodiment, the three rectilinear protrusions A4 and the three cam protrusions B3 are disposed substantially opposite each other, with the protrusions 311a in between.

The three cams b6 are formed on the inner peripheral face 310S. The cam protrusions B6 of the second rotary frame 220 are engaged with the three cams b6. More specifically, sliding occurs in a state in which the front faces Ra of the cam protrusions B6 are in contact with the cam faces Ta of the cams b6, or a state in which a small gap is between the cam protrusions B6. As discussed above, the rear ends of the cam faces Ta are constituted by the rear end faces Sa of the protrusions 311a.

The third cosmetic frame 303 covers the outer periphery of the first lens group frame 310, that is, the front and sides of the first lens group frame 310. The third cosmetic frame 303 has three crimped portions 303a, one optical axis direction positioning portion 303b, and a peripheral direction positioning portion 303c. The three crimped portions 303a are formed in an L shape, and protrude rearward from the rear end of the third cosmetic frame 303. The three crimped portions 303a are latched by the protrusions 311a of the first lens group frame 310.

The one optical axis direction positioning portion 303b is the rear end face of a cylindrical part. More precisely, the optical axis direction positioning portion 303b is the portion of the third cosmetic frame 303 excluding the three crimped portions 303a at the rear end face of the cylindrical part. The peripheral direction positioning portion 303c is formed near one of the three crimped portions 303a. The one optical axis direction positioning portion 303b comes into contact with three optical axis direction contact portions 310g of the first lens group frame 310.

Figure 23:
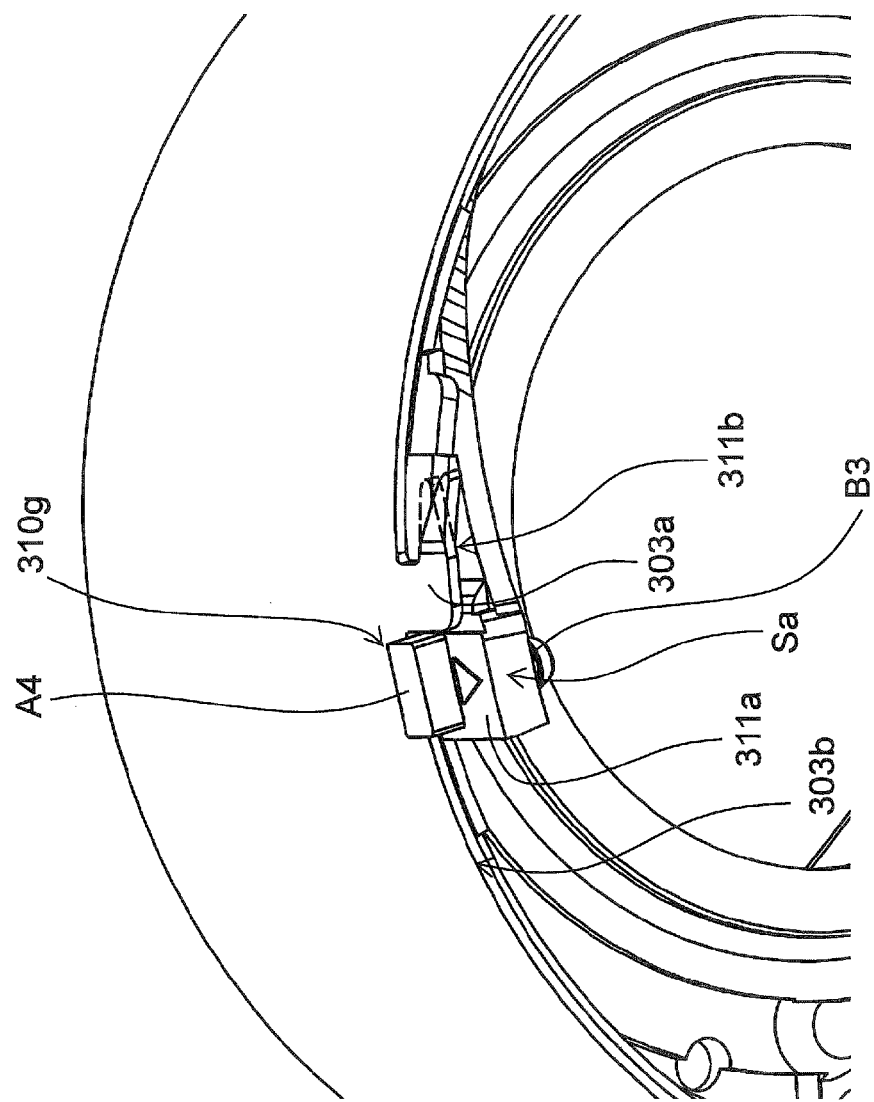
FIG. 23 is a detail view of a first lens group frame and a third cosmetic frame.

FIG. 23 is a detail view of the first lens group frame 310 and the third cosmetic frame 303. The crimped portions 303a are latched to concave portions 311b formed on the outer peripheral faces of the protrusions 311a. More specifically, as indicated by the broken line in FIG. 23, the crimped portions 303a are crimped to the concave portions 311b by folding the distal ends of the crimped portions 303a toward the inside of the concave portions 311b.

Thus positioning the third cosmetic frame 303 in the optical axis direction on the first lens group frame 310, and crimping part of the third cosmetic frame 303 to the outer peripheral face 310T of the first lens group frame 310 allows the third cosmetic frame 303 and the first lens group frame 310 to be easily, removably, and precisely linked Therefore, the third cosmetic frame 303 can be easily removed from the first lens group frame 310 during maintenance of the barrier mechanism (not shown) disposed between the first lens group frame 310 and the third cosmetic frame 303.

The three rectilinear protrusions A4, the three cam protrusions B3, and the three concave portions 311b are each disposed at the three protrusions 311a. Accordingly, in a housed state, the three first lens group frame main body 311 can be disposed within the flange recesses 222a of the second rotary frame 220, and the rear end faces other than the protrusions 331a can be disposed opposite the flanges 222 of the second rotary frame 220. Therefore, the cam grooves b3 can have a longer stroke, and the lens barrel 20 can be more compact in the optical axis direction.

Figure 24:
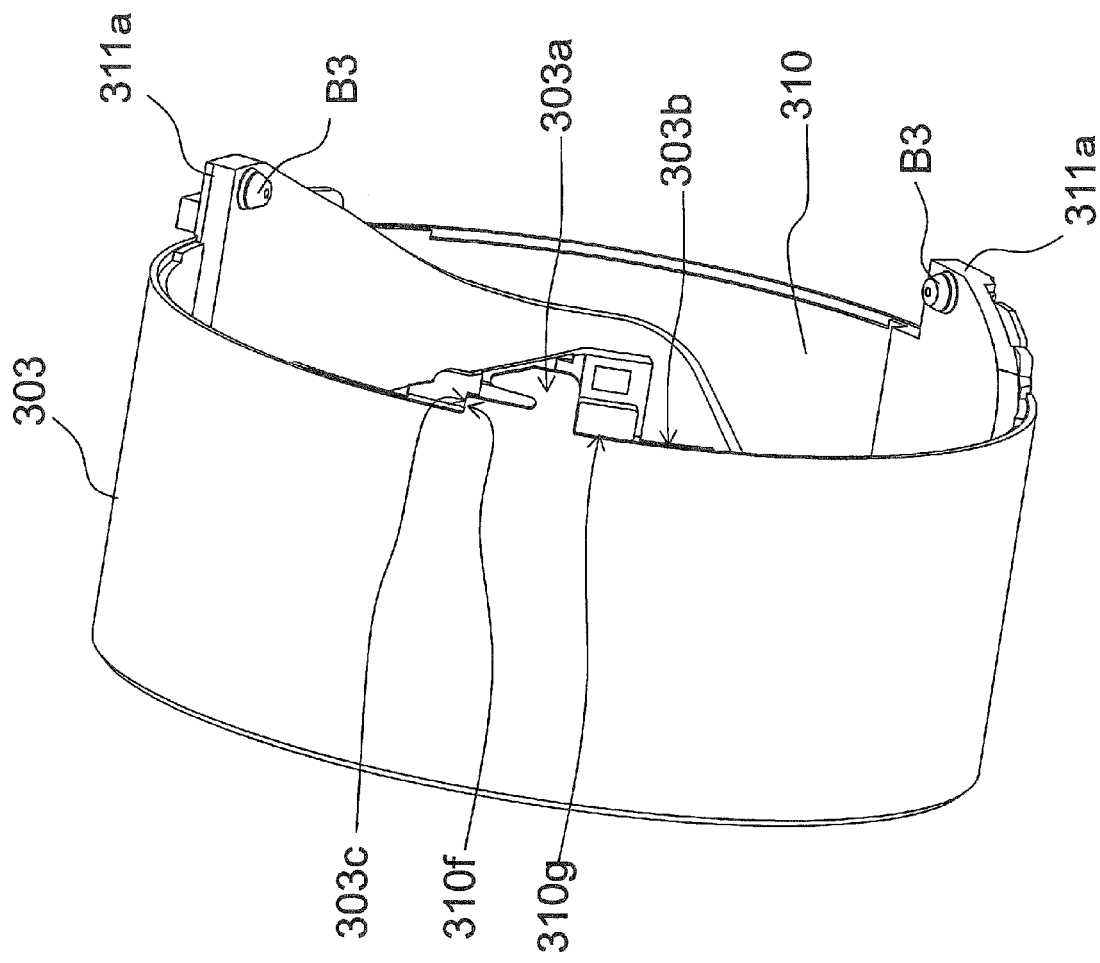
FIG. 24 is an oblique view of another state of a first lens group frame and a third cosmetic frame.

As shown in FIG. 24, the third cosmetic frame 303 may also have the peripheral direction positioning portion 303c. The peripheral direction positioning portion 303c comes into contact with a peripheral direction contact portion 310f of the first lens group frame 310. In this case, the third cosmetic frame 303 can be positioned not only in the optical axis direction, but also in the peripheral direction, by the first lens group frame 310.

8. Configuration of Second Lens Group Frame 320

Figure 25:
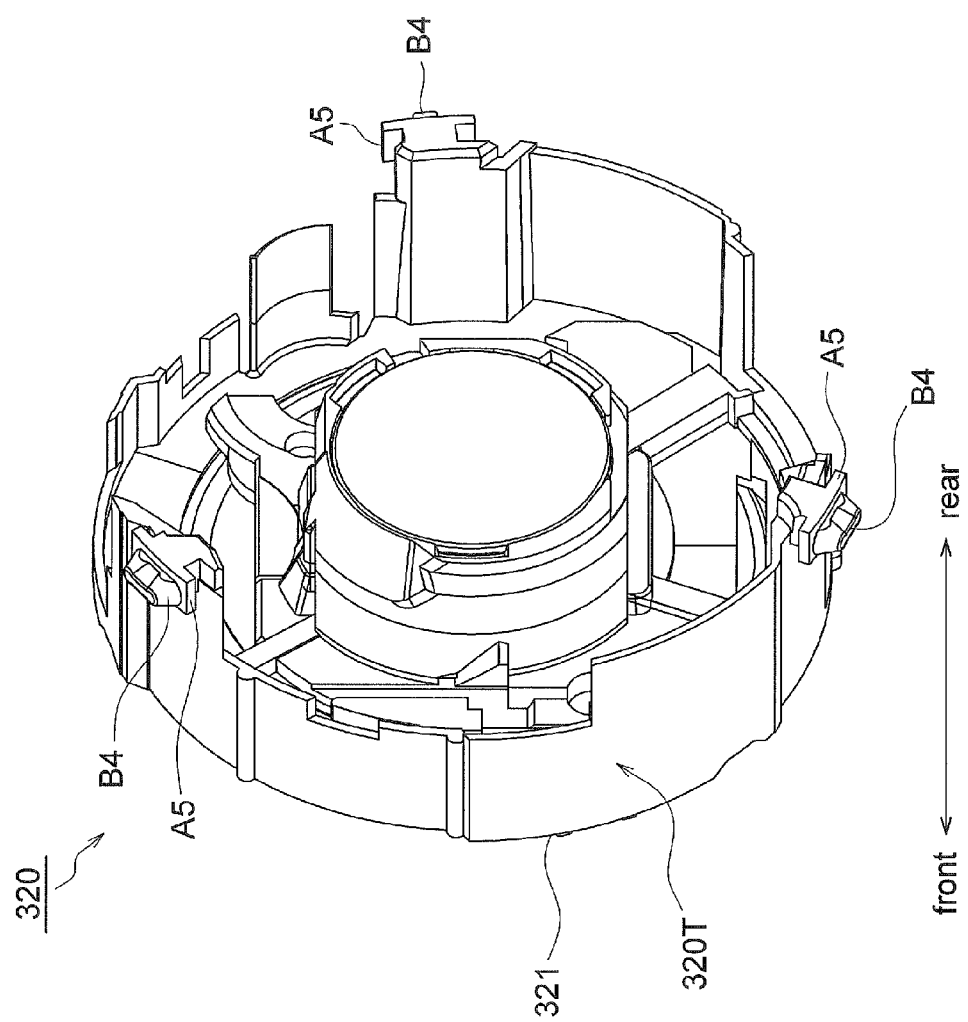
FIG. 25 is an oblique view of a second lens group frame.

FIG. 25 is an oblique view of the second lens group frame 320. The second lens group frame 320 has a second lens group frame main body 321, three rectilinear protrusions A5, and three cam protrusions B4.

The second lens group frame main body 321 is formed in a cup shape, and has an outer peripheral face 320T.

The three rectilinear protrusions A5 are formed on the rear end of the outer peripheral face 320T, and are disposed at a substantially constant pitch in the peripheral direction. The three rectilinear protrusions A5 are engaged with the three rectilinear grooves a5 of the third rectilinear frame 130.

The three cam protrusions B4 are formed on the three rectilinear protrusions A5. The three cam protrusions B4 are engaged with the three cam grooves b4 of the second rotary frame 220.

9. Configuration of Third Lens Group Frame 330

Figure 26:
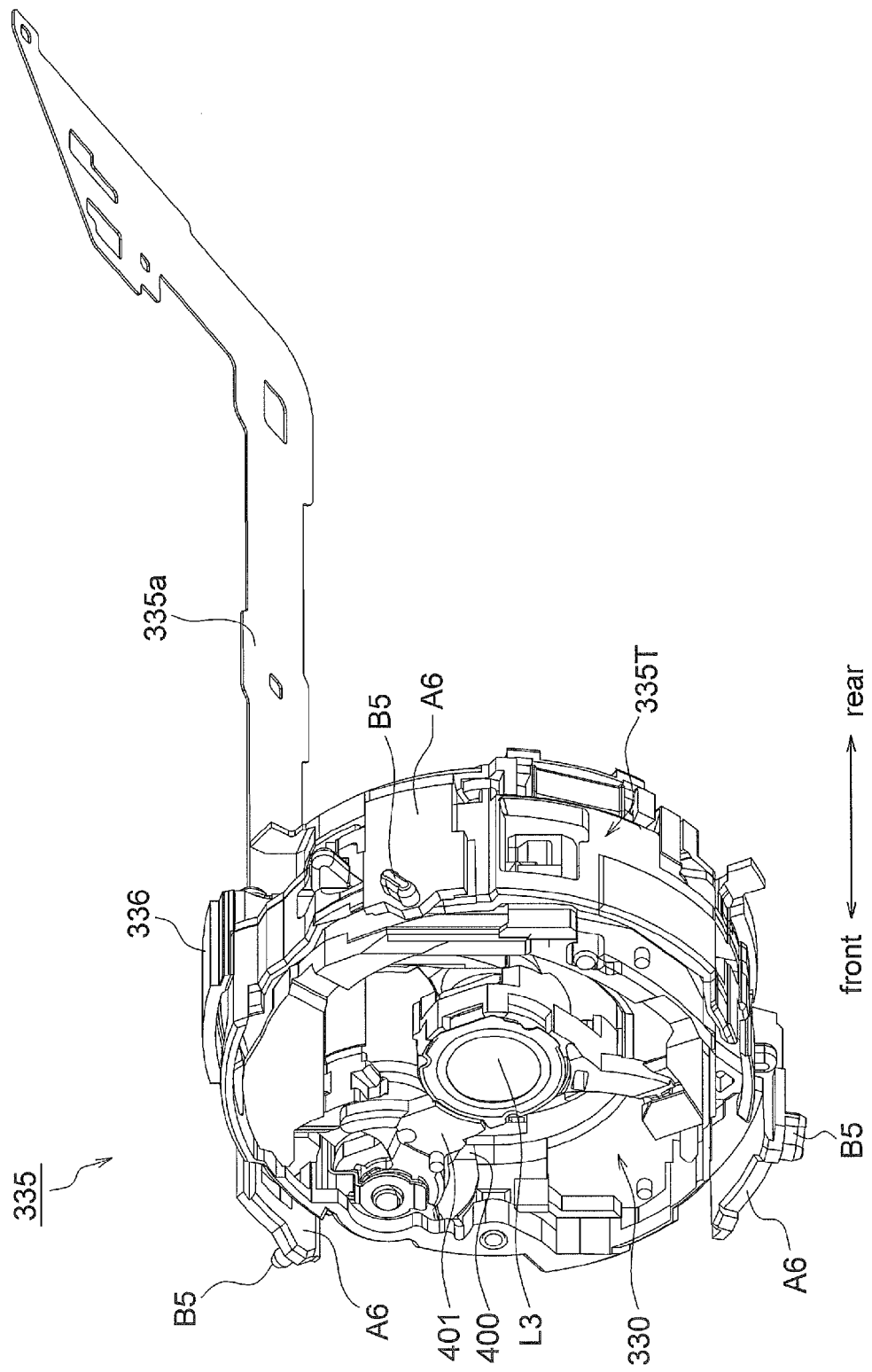
FIG. 26 is an oblique view of a shutter frame.

FIG. 26 shows the state when the third lens group frame 330 has been housed in the interior of the shutter frame 335. The configuration of the third lens group frame 330 will be described through reference to FIG. 26.

The third lens group frame 330 (an OIS (optical image stabilizer) unit) mainly has an OIS frame 400, a refracting lens frame 401, and the third lens group L3 for image blur correction.

The OIS frame 400 is mounted to the shutter frame 335. More specifically, the OIS frame 400 is able to move in a plane perpendicular to the optical axis. Even more specifically, a magnet (not shown) is fixed to the OIS frame 400, and a coil (not shown) is fixed to the shutter frame 335 at a position that is opposite the magnet. In this state, when power is supplied from a camera circuit (not shown) to the coil of the shutter frame, current flows to the coil and a magnetic field is generated. This magnetic field drives the magnet of the OIS frame 400, and the OIS frame 400 moves under this drive force within a plane perpendicular to the optical axis.

The refracting lens frame 401 is supported by the OIS frame 400 movably around a refraction axis that is substantially parallel to the optical axis. The refracting lens frame 401 can be switched between a correction position (first orientation) in which the third lens group L3 is able to correct image blur, and a retraction position (second orientation) in which the third lens group L3 is retracted from the optical axis. The refracting lens frame 401 supports the third lens group L3, which is made up of at least one lens.

10. Configuration of Shutter Frame 335

The configuration of the shutter frame 335 will now be described through reference to FIG. 26. The shutter frame 335 has a shutter frame main body 336, three rectilinear protrusions A6, and the three cam protrusions B5.

The shutter frame main body 336 is formed in a cylindrical shape, and has an outer peripheral face 335T.

The three rectilinear grooves a6 are formed on the outer peripheral face 335T, and are disposed at a substantially constant pitch in the peripheral direction. The three rectilinear protrusions A6 are engaged with the three rectilinear grooves a6 of the third rectilinear frame 130.

The three cam protrusions B5 are provided to the front end of the three rectilinear protrusions A6. The three cam protrusions B5 are engaged with the three cam grooves b5 of the second rotary frame 220.

Figure 27:
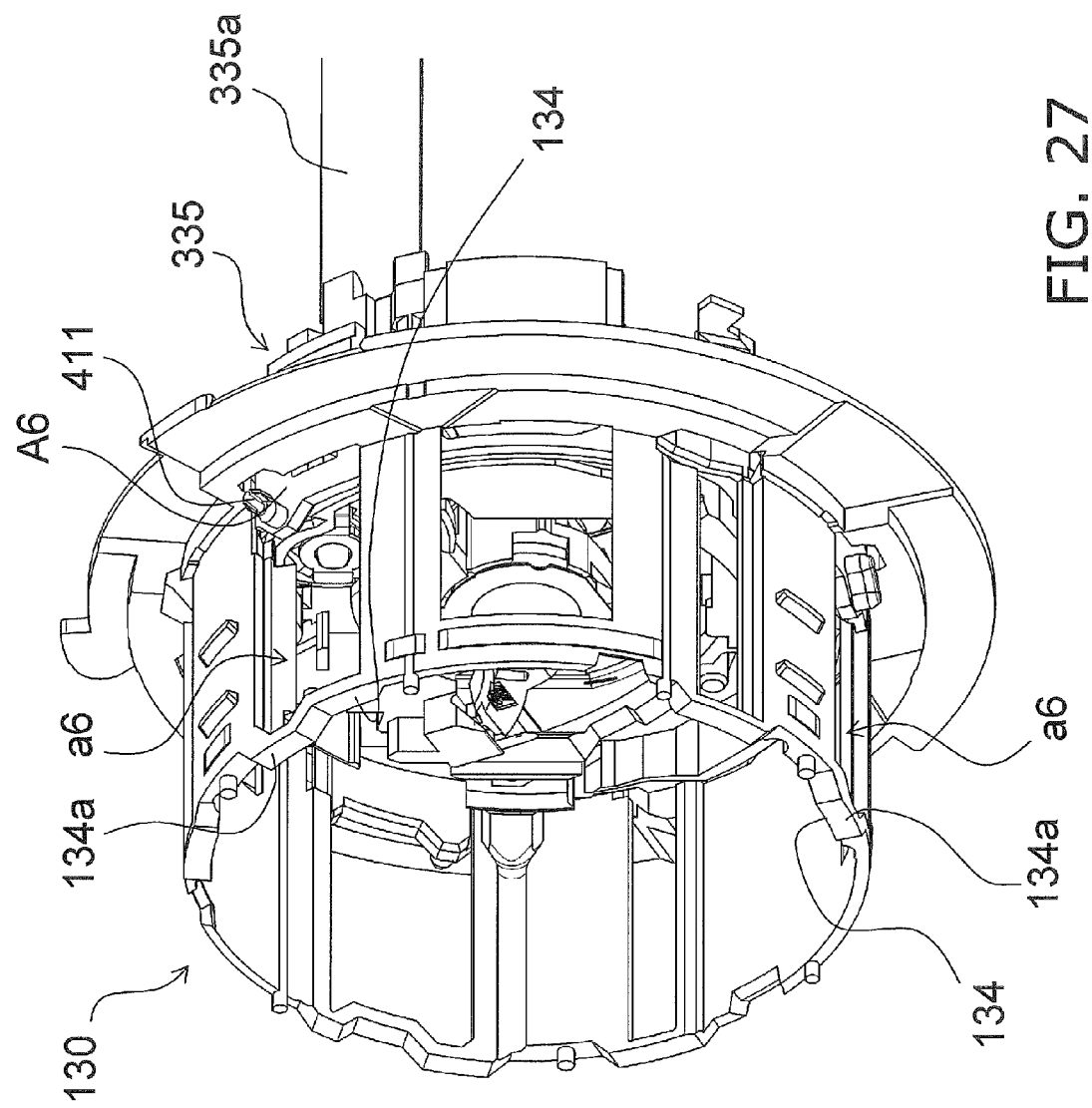
FIG. 27 is a diagram illustrating how the shutter frame moves on the inside of the third rectilinear frame.
Figure 28:
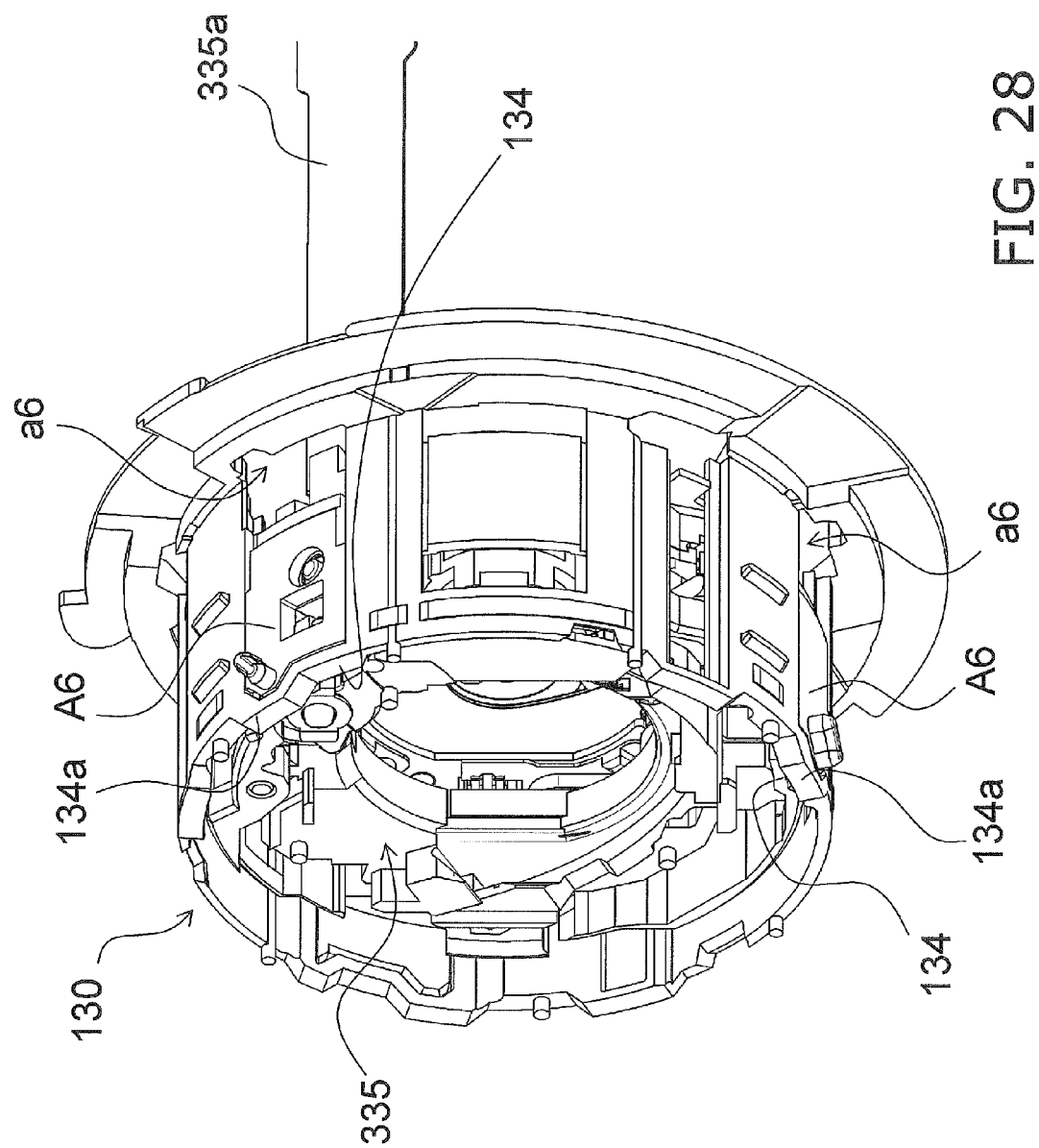
FIG. 28 is a diagram illustrating how the shutter frame moves on the inside of the third rectilinear frame.

FIGS. 27 and 28 are diagrams illustrating how the shutter frame 335 moves on the inside of the third rectilinear frame 130.

The three rectilinear protrusions A6 move back and forth in the three rectilinear grooves a6. As shown in FIG. 28, when the shutter frame 335 is housed on the inside of the third rectilinear frame 130, the front ends of the rectilinear protrusions A6 are disposed on the inside of the protrusions 134a of the retainers 134. This increases the amount of movement of the rectilinear protrusions A6, that is, the amount of movement of the third lens group L3.

11. Engagement of Frames

Figure 29:
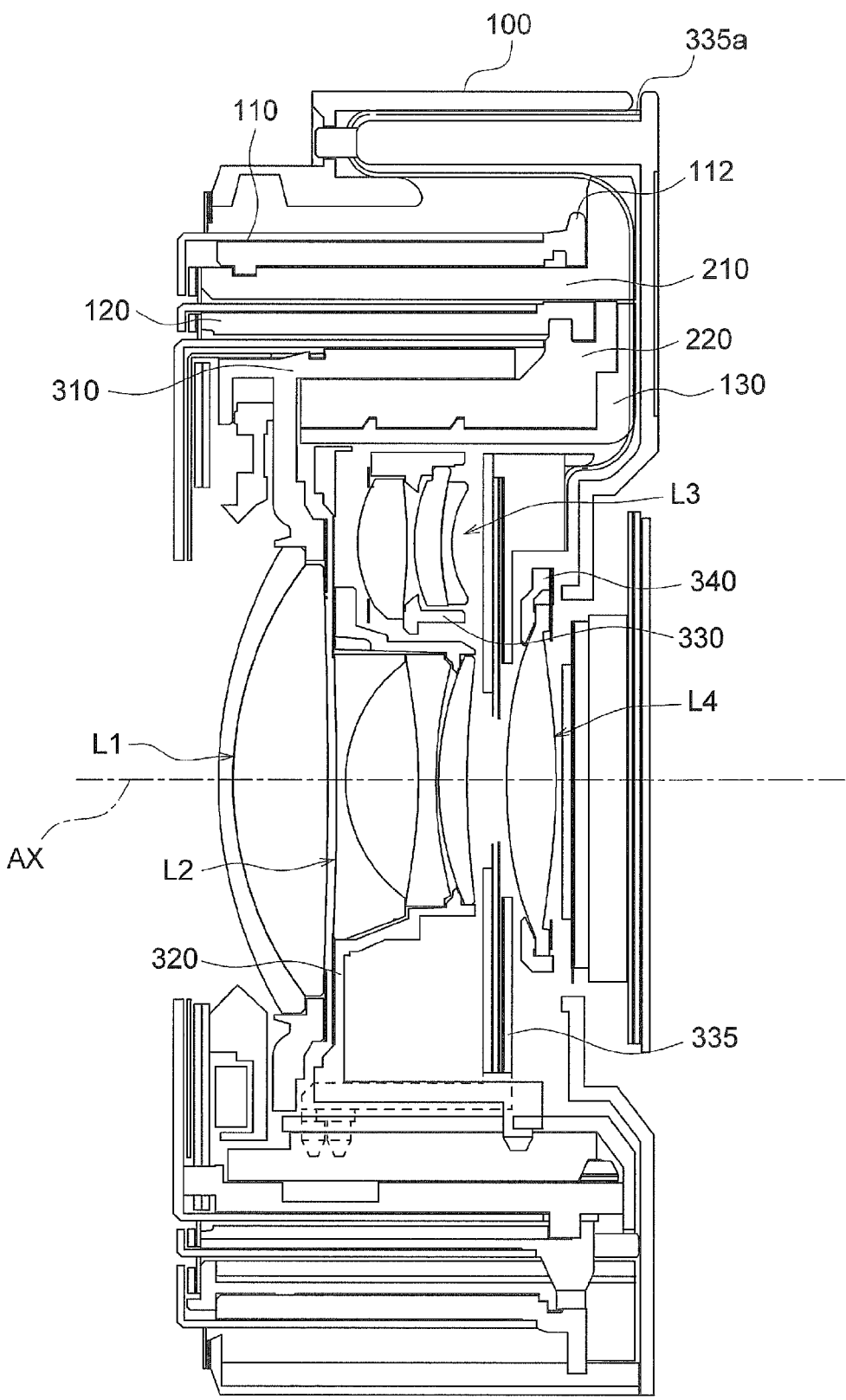
FIG. 29 is a simplified cross section of the lens barrel (retracted state)
Figure 30:
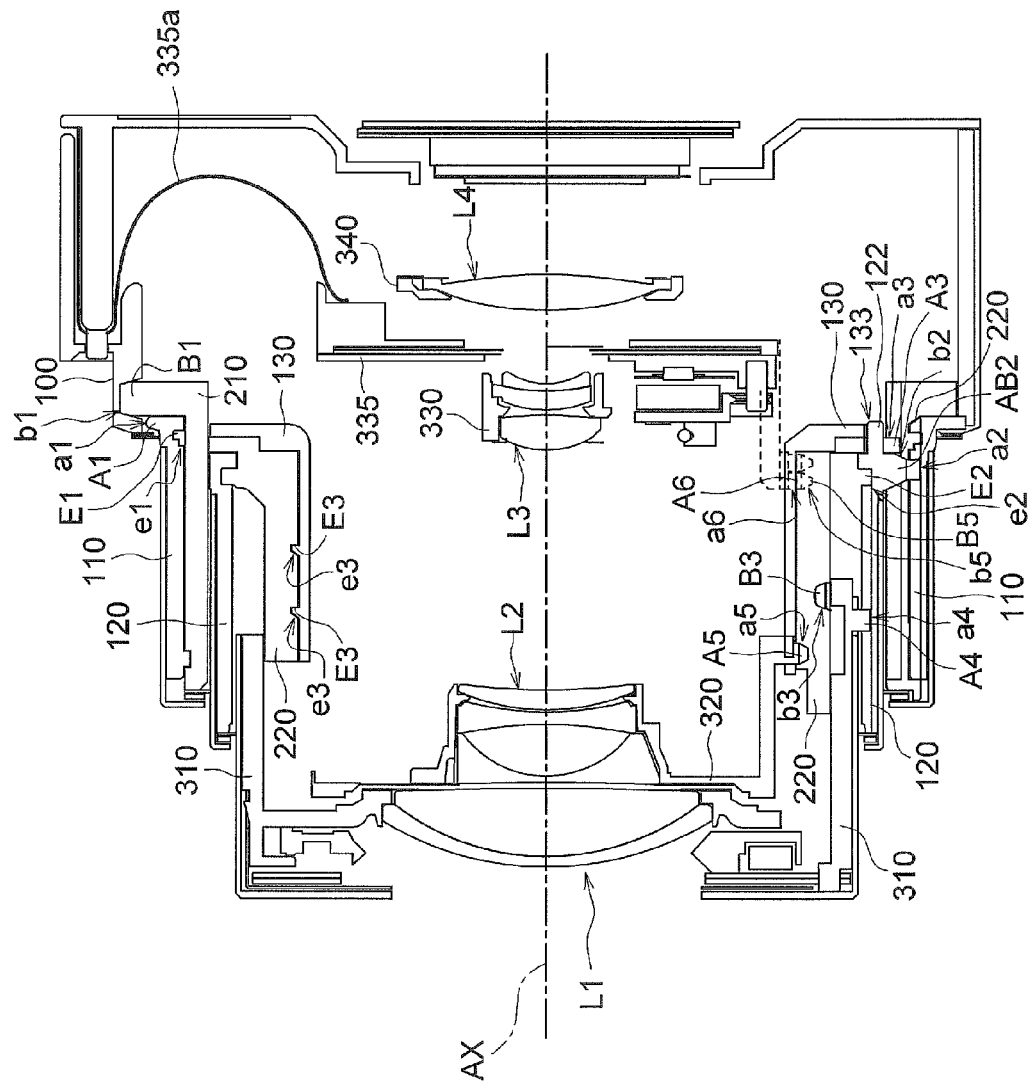
FIG. 30 is a simplified cross section of the lens barrel (wide angle state)
Figure 31:
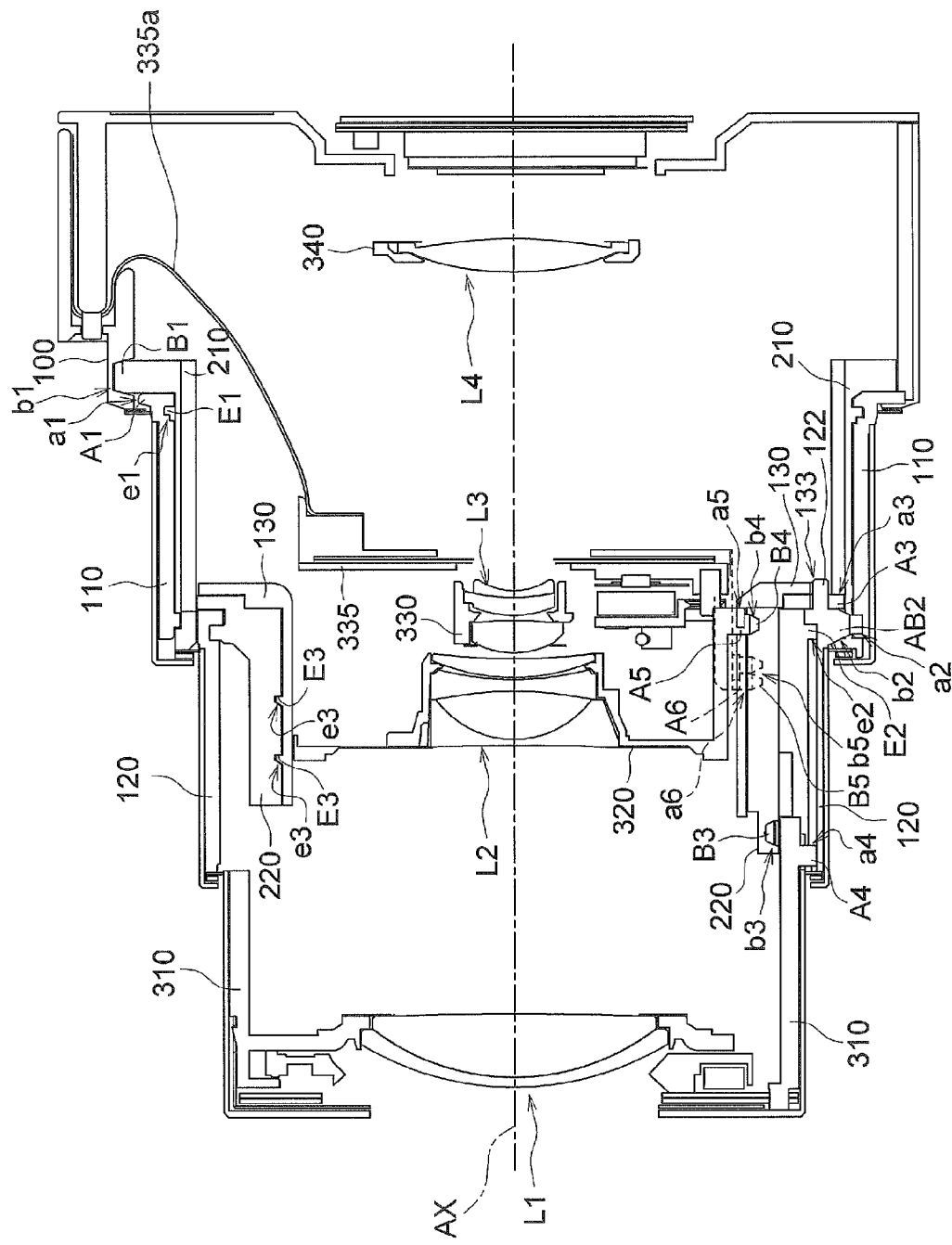
FIG. 31 is a simplified cross section of the lens barrel (telephoto state)

FIGS. 29 to 31 are cross sections of the lens barrel 20. However, FIGS. 29 to 31 are schematics that combine a plurality of cross sections passing through the optical axis AX. The lens barrel 20 is shown in its refracted state in FIG. 29, in its wide angle state in FIG. 30, and in its telephoto state in FIG. 31. In this embodiment, the "imaging enabled state" of the digital camera 1 means a state from the wide angle state to the telephoto state of the lens barrel 20.

The gear portion 212 of the first rotary frame 210 meshes with the zoom gear 242 (not shown). The cam followers B1 of the first rotary frame 210 are engaged with the cam grooves b1 of the stationary frame 100. Therefore, the first rotary frame 210 is able to move in the optical axis direction while rotating in the peripheral direction under the drive force of the zoom motor 241.

The rectilinear protrusions A1 of the first rectilinear frame 110 are engaged with the rectilinear grooves a1 of the stationary frame 100. The bayonet protrusions E1 of the first rotary frame 210 are engaged with the bayonet groove e1 of the first rectilinear frame 110. Therefore, the first rectilinear frame 110 is able to move rectilinearly in the optical axis direction along with the first rotary frame 210.

The rectilinear cam followers AB2 of the second rectilinear frame 120 are inserted into the cam grooves b2 of the first rotary frame 210, and are engaged with the rectilinear grooves a2 of the first rectilinear frame 110. Therefore, the second rectilinear frame 120 is able to move rectilinearly in the optical axis direction according to the rotation of the first rotary frame 210.

The rectilinear protrusions A3 of the second rotary frame 220 are engaged with the rectilinear grooves a3 of the first rotary frame 210. The bayonet protrusions E2 of the second rotary frame 220 are engaged with the bayonet groove e2 of the second rectilinear frame 120. Therefore, the second rotary frame 220 is able to move in the optical axis direction along with the second rectilinear frame 120 while rotating in the peripheral direction along with the first rotary frame 210.

The latching portions 122 of the second rectilinear frame 120 are latched to the latching recesses 133 of the third rectilinear frame 130. The bayonet protrusions E3 of the third rectilinear frame 130 are engaged with the bayonet grooves e3 of the second rotary frame 220. The spacing of at least two of the three rectilinear protrusions A3 of the second rotary frame 220 is approximately 120° or more, the spacing of the two latching portions 122 of the second rectilinear frame 120 is approximately 120° or more, and the relative rotational angle between these during zoom drive is approximately 120° or less. Accordingly, third rectilinear frame 130 is able to move rectilinearly in the optical axis direction along with the second rectilinear frame 120 without interfering with the rotation of the second rotary frame 220.

One of the two latching portions 122 is formed longer in the peripheral direction than the other one, and correspondingly, one of the latching recesses 133 is formed longer in the peripheral direction than the other one, but the third rectilinear frame 130 is preferably made longer in the peripheral direction to the extent that it does not interfere with the rotation of the second rotary frame 220.

The spacing of at least two of the rectilinear protrusions A3 of the second rotary frame 220 is approximately 150°, the spacing of the two latching portions 122 of the second rectilinear frame 120 is approximately 150°, and the relative rotational angle between these during zoom drive is approximately 150° or less. Therefore, the third rectilinear frame 130 does not interfere with the rotation of the second rotary frame 220. The same applies to the other angles.

The rectilinear protrusions A4 of the first lens group frame 310 are engaged with the rectilinear grooves a4 of the second rectilinear frame 120. Also, the cam protrusions B3 of the first lens group frame 310 are engaged with the cam grooves b3 of the second rotary frame 220. Therefore, the first lens group frame 310 is movable rectilinearly in the optical axis direction according to the rotation of the second rotary frame 220.

The rectilinear protrusions A5 of the second lens group frame 320 are engaged with the rectilinear grooves a5 of the third rectilinear frame 130. Also, the cam protrusions B4 of the second lens group frame 320 are engaged with the cam grooves b4 of the second rotary frame 220. Therefore, the second lens group frame 320 is movable rectilinearly in the optical axis direction according to the rotation of the second rotary frame 220.

The rectilinear protrusions A6 of the shutter frame 335 are engaged with the rectilinear grooves a6 of the third rectilinear frame 130. Also, the cam protrusions B5 of the shutter frame 335 are engaged with the cam grooves b5 of the second rotary frame 220. Therefore, the shutter frame 335 is movable rectilinearly in the optical axis direction according to the rotation of the second rotary frame 220.

The third lens group frame 330 is mounted to the shutter frame 335, and when the shutter frame 335 moves rectilinearly in the optical axis direction with respect to the third rectilinear frame 130, the retracting lens frame 401 of the third lens group frame 330 is rotated by a refraction mechanism (not shown). Consequently, in a transition from the refracted state to the imaging enable state, the refracting lens frame 401 moves from its refracted position to a correction enabled position. Also, in a transition from the imaging enable state to the refracted state, the retracting lens frame 401 moves from the correction enabled position to the refracted position. When the refracting lens frame 401 is disposed in the correction enabled position, the third lens group L3 is movable within a plane perpendicular to the optical axis. That is, image blur correction is possible in this state.

Thus, the rotation of the first rotary frame 210 and the second rotary frame 220 under the drive force of the zoom motor 241 results in rectilinear motion of the lens frames 310, 320, and 335 and the first to third rectilinear frames 110 to 130.

Figure 32:
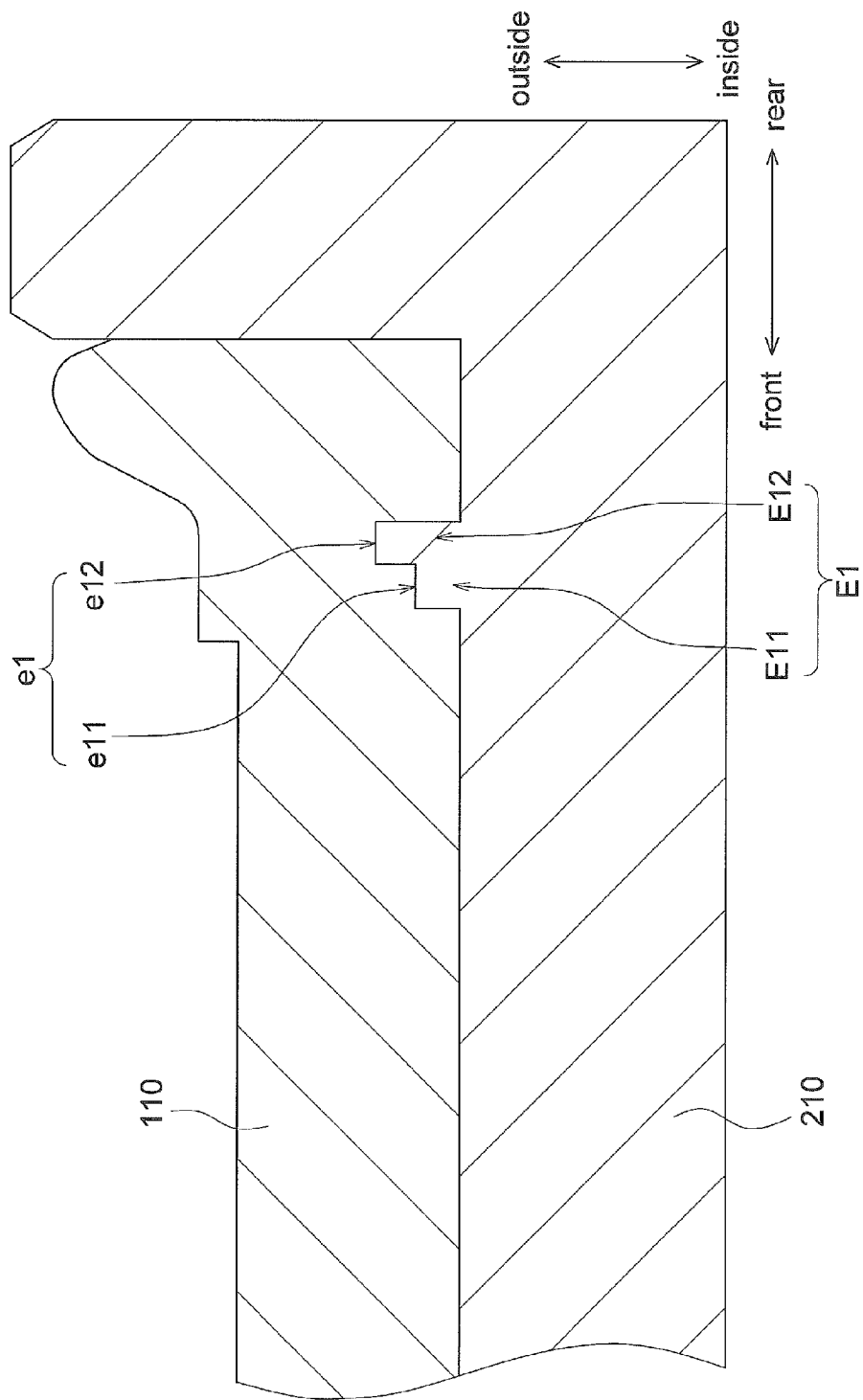
FIG. 32 is a detail view of FIG. 30.

FIG. 32 is a detail view of FIG. 30, and shows the area around the bayonet mechanism of the first rectilinear frame 110 and the first rotary frame 210.

As shown in FIG. 32, the first protrusions E11 of the bayonet protrusions E1 are engaged with the first groove e11 of the bayonet groove e1. Also, the second protrusions E12 of the bayonet protrusions E1 are engaged with the second groove e12 of the bayonet groove e1.

Since the bayonet protrusions E1, which are stepped convex portions, are thus fitted into the bayonet groove e1, which is a stepped concave portion, when an external force is exerted in the optical axis direction on the first rotary frame 210, for example, the bayonet protrusions E1 are less likely to come loose from the bayonet groove e1.

Figure 33:
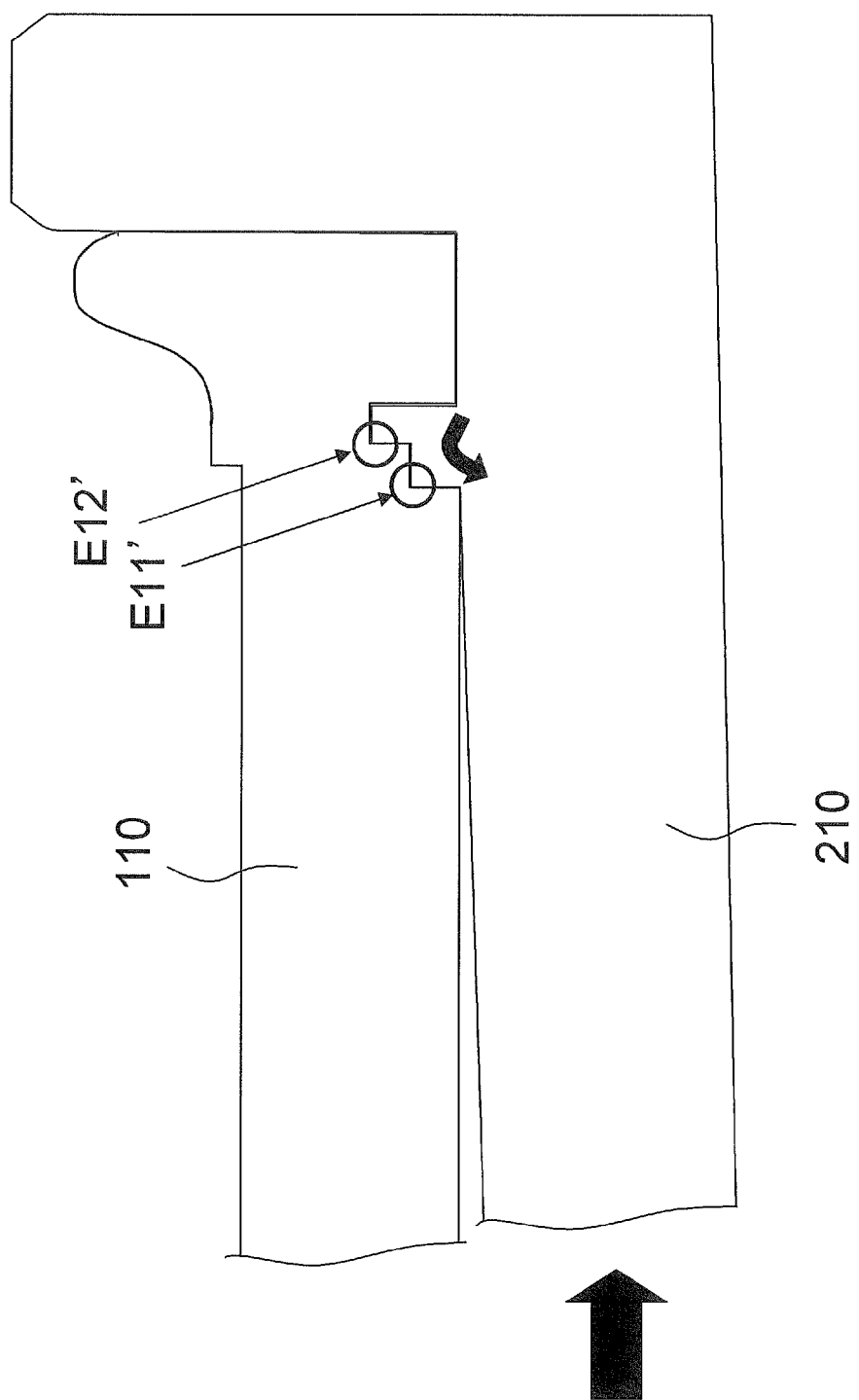
FIG. 33 is a diagram illustrating the engagement state of a bayonet mechanism.

More specifically, as shown in FIG. 33, when an external force is exerted in the optical axis direction on the first rotary frame 210, the first rotary frame 210 tries to deform so that it falls forward around its base (counter-clockwise in FIG. 33). Here, since the cross sectional shape of the left side face of the bayonet protrusions E1 is stepped, there are two corners E11' and E1' that snag. Accordingly, the bayonet groove e1 and the bayonet protrusions E1 snag on each other, making it less likely that the first rotary frame 210 comes loose from the first rectilinear frame 110.

Figure 34:
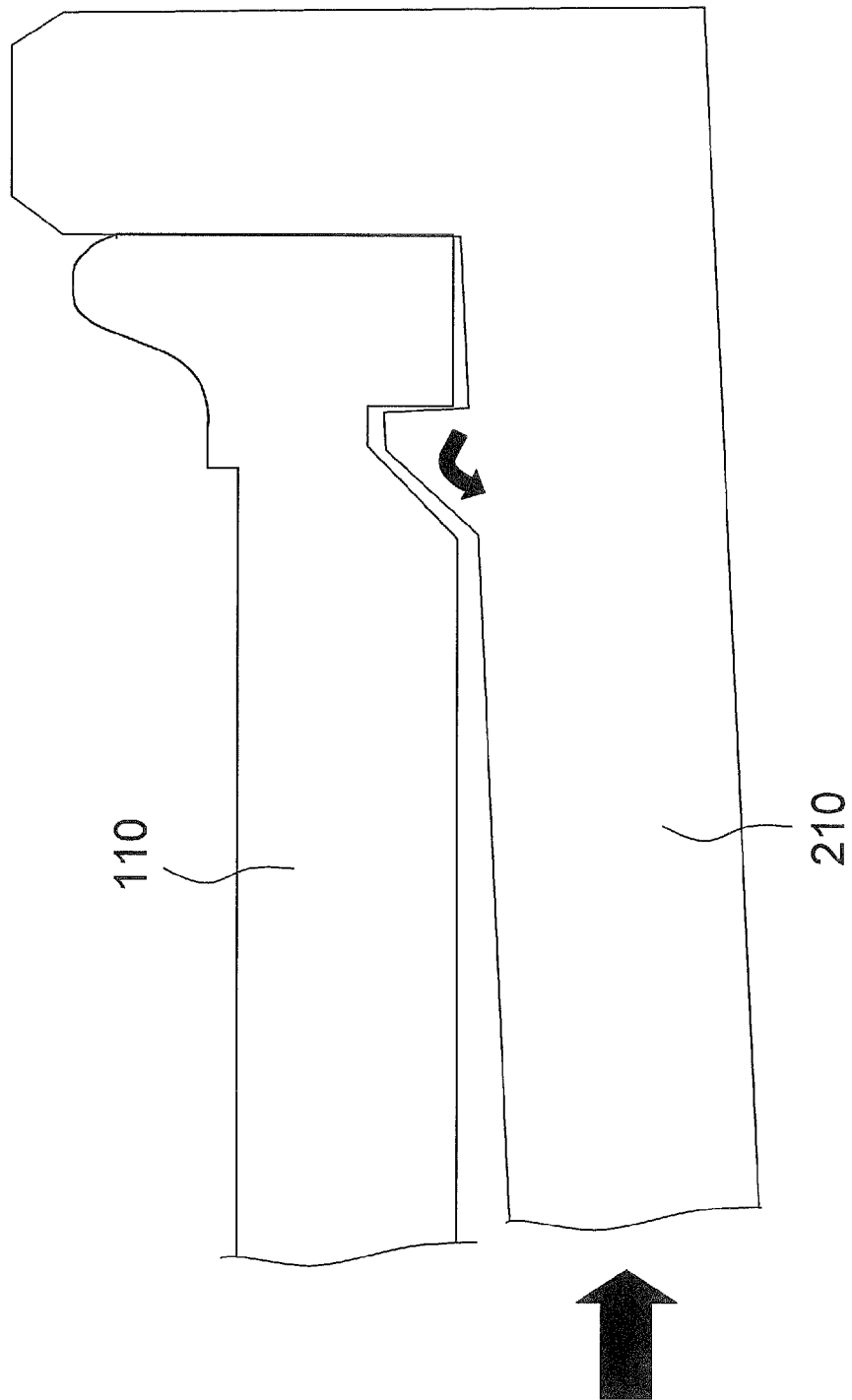
FIG. 34 is a diagram illustrating the engagement state of a bayonet mechanism.

One possibility for the shape of the bayonet protrusions is a tapered front cross sectional shape as shown in FIG. 34. However, such a bayonet protrusion has no corner to snag even when the first rotary frame 210 tries to deform so as to fall forward. Accordingly, the bayonet groove and the bayonet protrusions slip against each other, and there is the risk that the first rotary frame 210 comes out of the first rectilinear frame 110.

Method for Assembling the Lens Barrel 20

The method for assembling the lens barrel 20 will now be described.

First, the third rectilinear frame 130 is inserted from the rear of the second rotary frame 220. The third rectilinear frame 130 is then rotated in the peripheral direction into the telephoto state.

Next, the second lens group frame 320 is inserted from the rear of the third rectilinear frame 130.

Next, the retracting lens frame 401 is inserted from the front of the OIS frame 400, and the OIS frame 400 is rotatably attached to the retracting lens frame 401.

Next, the OIS frame 400 is inserted from the front of the shutter frame 335.

Next, the shutter frame 335 is inserted from the rear of the third rectilinear frame 130. The second lens group frame 320 is then rotated in the peripheral direction into the retracted state.

Next, the second rotary frame 220 is inserted from the rear of the first lens group frame 310.

Next, the second rectilinear frame 120 is installed from the front of the first lens group frame 310.

Next, the first rotary frame 210 is inserted from the rear of the first rectilinear frame 110. The second rectilinear frame 120 is then inserted from the rear of the first rotary frame 210.

Next, the first rectilinear frame 110 is inserted from the rear of the stationary frame 100.

Finally, the frames are rotated into the retracted state.

Action and Effect of Bayonet Mechanism

The lens barrel 20 comprises the first rectilinear frame 110 having the bayonet groove e1, and the first rotary frame 210 having the bayonet protrusions E1. The radial direction depth of the bayonet groove e1 varies in steps along the optical axis direction of the first rectilinear frame 110. The radial direction height of the bayonet protrusions E1 varies in steps according to the shape of the bayonet groove e1.

Since the bayonet protrusions E1, which are stepped convex portions, are thus fitted into the bayonet groove e1, which is a stepped concave portion, when an external force is exerted in the optical axis direction on the first rotary frame 210, for example, the bayonet protrusions E1 are less likely to come loose from the bayonet groove e1. Therefore, there is greater engagement strength of the bayonet mechanism that engages the first rectilinear frame 110 and the first rotary frame 210.

Also, the mechanical strength of the bayonet protrusions E1 can be increased while reducing the optical axis direction width σ of the rectilinear cam followers AB2 engaged with the rectilinear grooves a2 that intersect the bayonet groove e1.

Configuration of Barrier Mechanism 600

Figure 35:
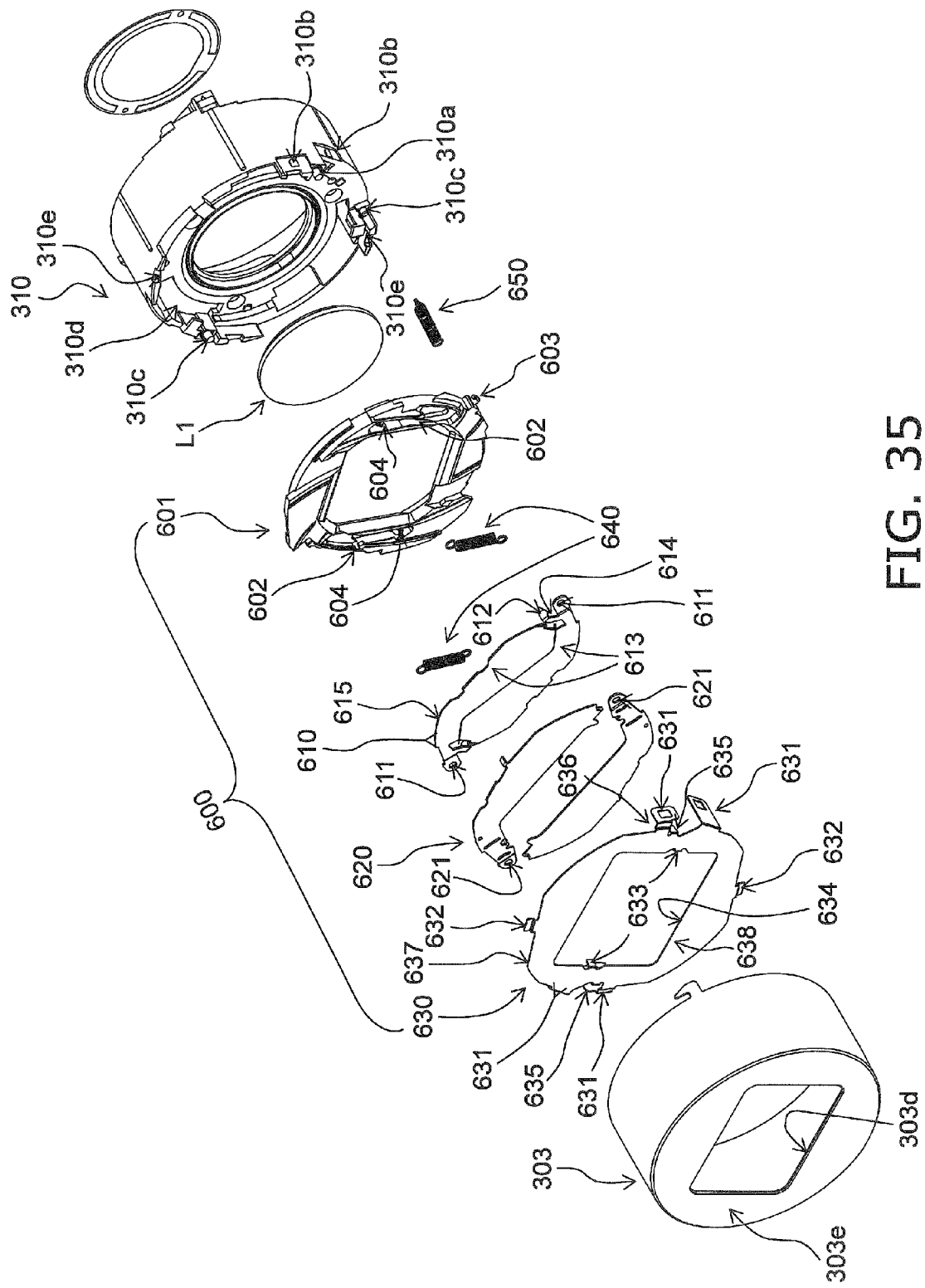
FIG. 35 is an exploded oblique view of a third movable lens barrel portion.
Figure 36B:
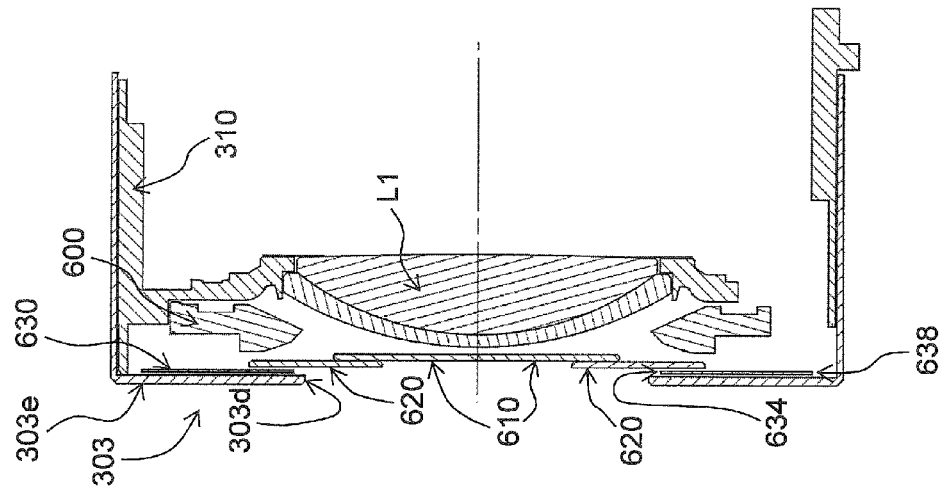
FIGS. 36A and 36B are, respectively, a front view and a cross section of a third movable lens barrel portion in its housed state.
Figure 36A:
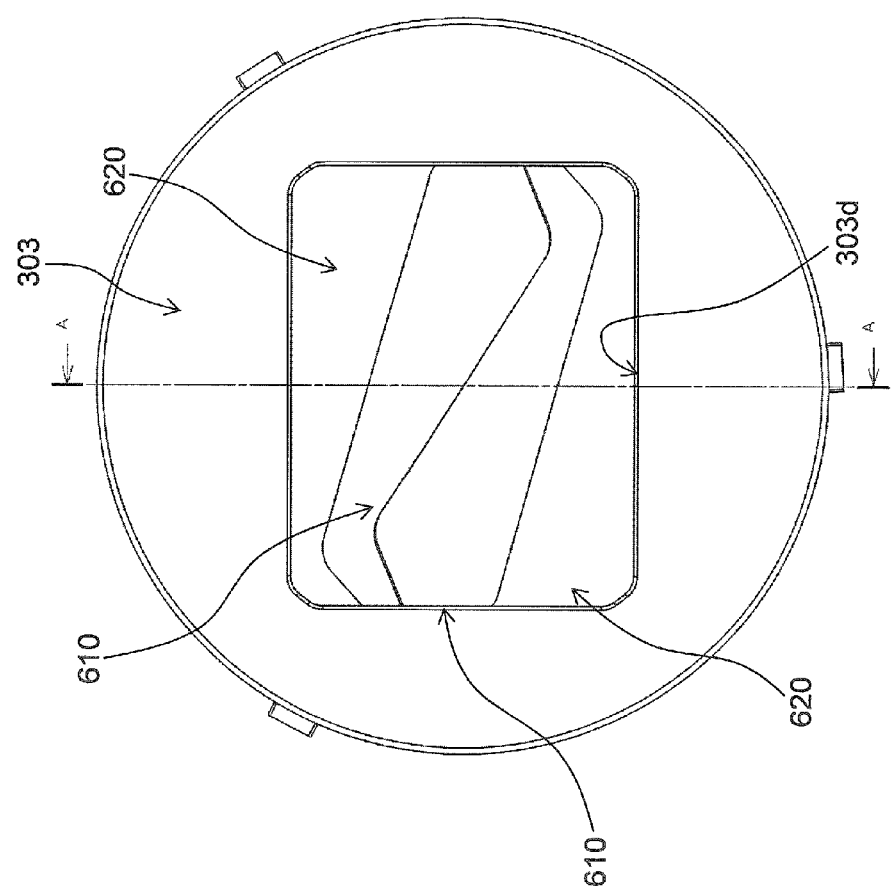

The barrier mechanism 600 will now be described. FIG. 35 is an exploded oblique view of the third movable lens barrel portion 23. FIGS. 36A and 36B are, respectively, a front view and a cross section of the third movable lens barrel portion 23 in its housed state. FIGS. 37A and 37B are, respectively, a front view and a cross section of the third movable lens barrel portion 23 in its imaging enabled state.

As shown in FIGS. 21 and 35, the barrier mechanism 600 is constituted by a cam ring 601, inner vanes 610 (an example of a vane portion), outer vanes 620 (an example of a vane portion), closing springs 640, an opening spring 650, and a barrier front cover 630. As shown in FIGS. 36 and 37, the barrier mechanism 600 is disposed between the first lens group frame 310 and the third cosmetic frame 303. The barrier mechanism 600 is attached to the front face of the first lens group frame 310, and the front face is covered by the third cosmetic frame 303.

First, the configuration of the first lens group frame 310 that supports the barrier mechanism 600 will be described.

As shown in FIG. 35, the first lens group frame 310 has a coupling hole 310d, two vane rotation shafts 310a, one vane fixing portion 310c, four front cover fixing portions 310b (an example of a cover fixing portion), and a front cover contact portion 310e (an example of a cover contact portion). The coupling hole 310d is provided so as to pass through in the optical axis direction around the first lens group L1 attachment part, and rotatably supports the barrier mechanism 600. The two vane rotation shafts 310a rotatably support the inner vanes 610 and the outer vanes 620. The vane fixing portion 310c fixes one end of the opening spring 650. The four front cover fixing portions 310b fix the vane fixing portion 310c by fastening it with a so-called hairpin. The front cover contact portion 310e comes into contact with the barrier front cover 630 and determines the height (that is, the optical axis direction position) of the barrier front cover 630 with respect to the first lens group frame 310.

Next, the configuration of the barrier mechanism 600 will be described in detail.

The cam ring 601 is a disk-shaped molded plastic member. As shown in FIGS. 21 and 35, the cam ring 601 has two drive transmission protrusions 602, one opening spring fixing portion 603, two closing spring fixing portions 604, and one coupling tab 605. The two drive transmission protrusions 602 drive the inner vanes 610. The opening spring fixing portion 603 fixes one end of the opening spring 650. The two closing spring fixing portions 604 fix one end of the closing springs 640. The coupling tab 605 is rotatably fitted into the coupling hole 310d. The coupling tab 605 transmits rotational force from a rotary transmission portion (not shown) of the second rotary frame 220 to the cam ring 601.

The cam ring 601 rotatably and integrally (in the optical axis direction) engages with the front face of the first lens group frame 310 by bayonet engagement. When the barrier is operated in the closing direction, rotational force is transmitted by the coupling tab 605 from the second rotary frame 220 to the cam ring 601.

The inner vanes 610 are flat sheet metal members. As shown in FIGS. 35 and 36, the inner vanes 610 are disposed at rotationally symmetrical positions around the optical axis. FIGS. 38A, 38B, and 38C are, respectively, a front view, a side view, and an oblique view of the inner vanes 610. As shown in FIG. 38, the inner vanes 610 each have a first hole 611, an inner vane protrusion 612, a vane portion 613, a constricted portion 614, and a vane rear face 615. The first holes 611 are fitted onto the vane rotation shafts 310a of the first lens group frame 310. The inner vane protrusions 612 receive drive force from the drive transmission protrusions 602 of the cam ring 601 in order to rotate the inner vanes 610. The inner vane protrusions 612 have a shape that is bent approximately 90° from the vane portions 613 used to cover the crimped portions 303a. The inner vane protrusions 612 have an opening direction transmission portion and a closing direction transmission portion with the outer vanes 620. The constricted portions 614 are configured near the above-mentioned bent part of the inner vanes 610. The hook part of the closing springs 640 (discussed below) are fitted into the constricted portions 614. The constricted portions 614 also serve to fix one end of the closing springs 640, and keep the hook part of the closing springs 640 from coming off easily. As a result, the spring force of the closing springs 640 pushes the inner vane protrusions 612 against the drive transmission protrusions 602 of the cam ring 601. The vane portions 613 cover the optical path. The vane rear faces 615 are the faces of the vanes on the rear side in the optical axis direction.

The first holes 611 of the inner vanes 610 are fitted onto the vane rotation shafts 310a of the first lens group frame 310, allowing the inner vanes 610 to rotate around the vane rotation shafts 310a. The drive transmission protrusions 602 of the cam ring 601 come into contact with the inner vane protrusions 612, and the hooks of the closing springs 640 are hooked on the constricted portions 614, and in this state the drive force from the cam ring 601 is transmitted (see FIG. 39).

The outer vanes 620 are flat sheet metal members. As shown in FIGS. 35 and 36, the outer vanes 620 are disposed at rotationally symmetrical positions around the optical axis. The outer vanes 620 have second holes 621 that fit onto the vane rotation shafts 310a of the first lens group frame 310, and opening direction transmission portions and closing direction transmission portions with the inner vanes 610.

The vane rotation shafts 310a of the first lens group frame 310 are fitted into the second holes 621 of the inner vanes 610, and drive force from the opening direction transmission portions and the closing direction transmission portions is transmitted to the outer vanes 620. First, the inner vanes 610 are fitted to the vane rotation shafts 310a, and the outer vanes 620 are fitted over this.

Figure 39:
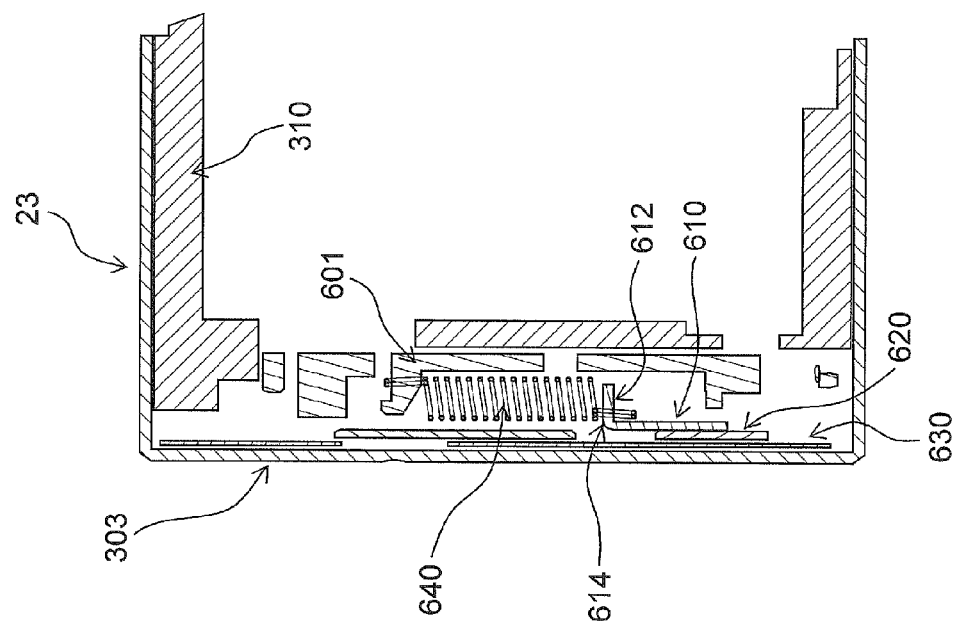
FIG. 39 is another cross section of a third movable lens barrel portion.

The closing springs 640 are tension coil springs, and each consist of a main body part that generates tensile force from twisting stress, and hooks at each end of this. FIG. 39 here is another cross section of the third movable lens barrel portion 23. As shown in FIG. 39, the hooks are configured at positions offset from the axis of the main body part, one end is hooked in the constricted portion 614 of the inner vane protrusion 612, and the other end is hooked to the closing spring fixing portion 604 of the cam ring 601. Here, the hooks of the closing spring 640 are substantially in contact with the vane rear face 615 of the vane portion 613.

The opening spring 650 is a tension coil spring, is hooked at one end to the opening spring fixing portion 603 of the cam ring 601, and is hooked at the other end to the vane fixing portion 310c of the first lens group frame 310. The force of the opening spring 650 allows the cam ring 601 to rotate in the opening direction.

The barrier front cover 630 is a flat sheet metal member. FIGS. 40A and 40B are, respectively, a front view and an A-A cross section of the barrier front cover 630. As shown in FIG. 40, the barrier front cover 630 has four hairpin tabs 631 (an example of a tab portion), two one-group frame contact portions 632 (an example of a frame contact portion), two inner vane closing stoppers 633 (an example of a stopper), a second opening 634 (an example of a second opening portion), two outer vane closing stoppers 635, a vane contact face 636, a front cover rear side face 637, and a second planar portion 638. The four hairpin tabs 631 are engaged with the front cover fixing portions 310b of the first lens group frame 310 by so-called hairpins. The two one-group frame contact portions 632 determine the height of the barrier front cover 630 with respect to the first lens group frame 310, that is, the optical axis direction position. The two inner vane closing stoppers 633 determine the position of the inner vanes 610 on the closing side. The second opening 634 ensures an optical path to the first lens group L1. The two outer vane closing stoppers 635 determine the position of the outer vanes 620 on the closing side. The vane contact face 636 keeps the inner vanes 610 and the outer vanes 620 from coming loose from the vane rotation shafts 310a of the first lens group frame 310. The front cover rear side face 637 is a face on the optical axis direction rear side. The second planar portion 638 constitutes the second opening 634.

As shown in FIGS. 36 and 37, the thickness of the second planar portion 638 constituting the second opening 634 of the barrier front cover 630 is less than the thickness of the inner vanes 610 or the outer vanes 620. Also, the thickness of the second planar portion 638 constituting the second opening 634 of the barrier front cover 630 is less than the thickness of the first planar portion 303e constituting the first opening 303d (an example of a first opening portion) of the third cosmetic frame 303.

As shown in FIG. 40, the inner vane closing stoppers 633 have inner vane contact portions 633a that come into contact with the inner vanes 610, and the inner vane contact portions 633a are inclined with respect to the optical axis. The inclination of the inner vane contact portions 633a to the optical axis is set so that when the inner vanes 610 come into contact with the inner vane contact portions 633a, a force is exerted in the direction of pressing against the front cover rear side face 637 of the barrier front cover 630. The outer vane closing stoppers 635 have outer vane contact portions 635a that come into contact with the outer vanes 620, and the outer vane contact portions 635a are inclined with respect to the optical axis for the same reason as the inner vane contact portions 633a.

The vane contact face 636 are disposed more to the rear side in the optical axis direction than the front cover rear side face 637, and are disposed more to the rear side in the optical axis direction than the optical axis direction height of the vane rotation shafts 310a of the first lens group frame 310, that is, the vane rotation shafts 310a and the vane contact face 636 overlap in the optical axis direction.

The barrier front cover 630 brings the one-group frame contact portions 632 into contact with the front cover contact portion 310e of the first lens group frame 310, hairpins the front cover fixing portions 310b of the first lens group frame 310 with the hairpin tabs 631, and fixes them to the first lens group frame 310. As shown in FIGS. 36 and 37, when the barrier front cover 630 has been attached to the first lens group frame 310, the vane contact face 636 comes into contact, with a small space between it and the face of the outer vanes 620 on the front side in the optical axis direction. In this state, since the inner vanes 610 are in contact with the outer vanes 620 in the optical axis direction, in a state in which the barrier front cover 630 has been attached to the first lens group frame 310, the outer vanes 620 and the inner vanes 610 do not come loose from the vane rotation shafts 310a.

Finally, we will describe the configuration of the third cosmetic frame 303 that covers the front face of the barrier mechanism 600.

The third cosmetic frame 303 is a cylindrical sheet metal member that covers the outer periphery of the first lens group frame 310. As shown in FIGS. 36 and 37, the third cosmetic frame 303 has the first opening 303d that is used to ensure an optical path to the first lens group L1, and the first planar portion 303e that constitutes the first opening 303d. The first opening 303d is smaller than the second opening 634 in the barrier front cover 630. Therefore, the size of the optical path to the first lens group L1 is determined by the first opening 303d. In this embodiment, the size of the optical path to the first lens group L1 is determined by the first opening 303d, but this is not the only option, and it may instead be determined by the barrier front cover 630, for example.

Next, the assembly of the barrier mechanism 600 will be described.

The assembly order of the barrier mechanism 600 is such that first the cam ring 601, second the inner vanes 610, third the closing springs 640, fourth the outer vanes 620, fifth the barrier front cover 630, and sixth the opening spring 650 is attached to the first lens group frame 310.

Next, the operation of the barrier mechanism 600 will be described.

In a state in which no drive force is being transmitted to the coupling tab 605 of the cam ring 601, the action of the opening spring 650 causes the cam ring 601 to rotate in the opening direction around the optical axis. When the cam ring 601 rotates in the opening direction, the drive transmission protrusions 602 push the inner vane protrusions 612 of the inner vanes 610. When the inner vane protrusions 612 of the inner vanes 610 are pushed, the inner vanes 610 rotate in the opening direction around the vane rotation shafts 310a of the first lens group frame 310. When the inner vanes 610 rotate in the opening direction, the opening direction transmission portion causes the outer vanes 620 to rotate in the opening direction around the vane rotation shafts 310a. Opening direction stoppers are provided to the outer vanes 620, and when the opening direction stoppers of the outer vanes 620 come into contact with the inner radial part of the third cosmetic frame 303, the outer vanes 620 come to a stop. When the outer vanes 620 stop, the inner vanes 610 also stop, and rotation of the cam ring 601 in the opening direction stops.

When the vanes transition from a state of being opening to a state of being closed, if rotational force from a rotation transmission portion (not shown) of the second rotary frame 220 is transmitted to the coupling tab 605 of the cam ring 601, the cam ring 601 rotates in the closing direction around the optical axis against the action of the opening spring 650. When the cam ring 601 rotates in the closing direction, the inner vanes 610 rotates in the closing direction along with the rotation of the cam ring 601 under the action of the closing springs 640. When the inner vanes 610 rotate in the closing direction, a closing direction transmission portion causes the outer vanes 620 to rotate in the closing direction around the vane rotation shafts 310a. The inner vane closing stoppers 633 and the outer vane closing stoppers 635 are provided to the barrier front cover 630. When the cam ring 601 rotates in the closing direction, the two inner vanes 610 come into contact, and the rotation of the cam ring 601 in the closing direction comes to a stop. At substantially the same timing as when the inner vanes 610 come into contact and stop, or slightly later than this, the inner vanes 610 and the outer vanes 620 come into contact with the inner vane closing stoppers 633 and the outer vane closing stoppers 635, respectively. Since the inner vane contact portions 633a here are inclined with respect to the optical axis, a force is exerted on the inner vanes 610 in the direction of pressing against the front cover rear side face 637 of the barrier front cover 630, and the inner vanes 610 and the inner vane closing stoppers 633 do not become disengaged. Similarly, since the outer vane contact portions 635a are inclined with respect to the optical axis, the outer vanes 620 and the outer vane closing stoppers 635 do not become disengaged.

The inner vane closing stoppers 633 and the outer vane closing stoppers 635 prevent the vane closing from going too far during normal drive, but also have the effect of reducing the likelihood of damage when an attempt is made to force closed vanes open.

Action and Effect of Barrier Mechanism (1) The hooks of the closing springs 640 are configured at positions offset from the axis of the main body part, one end is hooked in the constricted portion 614 near the bent part of the inner vane protrusion 612 of the inner vane 610, and the other end is hooked to the closing spring fixing portion 604 of the cam ring 601. Here, the hooks of the closing spring 640 are substantially in contact with the vane rear face 615 of the vane portion 613.

With this configuration, the constricted portions 614 of the inner vanes 610 are near the bent parts of the inner vane protrusions 612, that is, are near the vane portions 613 of the inner vanes 610, and the spring force of the closing springs 640 is exerted on the constricted portions 614, which means that the spring force of the closing springs 640 is exerted substantially near the vane portions 613 in the thickness direction of the inner vanes 610. Consequently, since the first holes 611 of the closing springs 640 are also substantially near the vane portions 613 in the thickness direction of the inner vanes 610, it is less likely that the spring force of the closing springs 640 causes the inner vanes 610 to tilt with respect to the vane rotation shafts 310a of the first lens group frame 310.

As a result, the drive load of the barrier mechanism 600 is lessened, and the motor driver can be more compact.

(2) The inner vanes 610, the outer vanes 620, and the barrier front cover 630 are flat sheet metal members. The third cosmetic frame 303 is a cylindrical sheet metal member, but the first planar portion 303e ahead of the first lens group L1 in the optical axis direction is flat in shape. The first opening 303d of the third cosmetic frame 303 is smaller than the second opening 634 of the barrier front cover 630. Also, the thickness of the second planar portion 638 constituting the second opening 634 of the barrier front cover 630 is less than the thickness of the inner vanes 610 or the outer vanes 620. Also, the thickness of the second planar portion 638 constituting the second opening 634 of the barrier front cover 630 is less than the thickness of the first planar portion 303e constituting the first opening 303d of the third cosmetic frame 303.

This makes it less likely that scratching or other such problems occur since the sheet thickness is greater, although the third cosmetic frame 303, the inner vanes 610, and the outer vanes 620 can be touched by the user's fingers. Also, the barrier front cover 630 is thinner, but since the second opening 634 is hidden by the first opening 303d of the third cosmetic frame 303, the user's fingers do not touch it, so it is less likely to be scratched or otherwise damaged.

As a result, the lens barrel 20 can be more compact in the optical axis direction.

(3) When the cam ring 601 rotates in the closing direction, the inner vanes 610 and the outer vanes 620 come into contact with the inner vane closing stoppers 633 and the outer vane closing stoppers 635 of the barrier front cover 630, respectively. The inner vane contact portions 633a here are inclined with respect to the optical axis. Similarly, the outer vane contact portions 635a are also inclined with respect to the optical axis.

As a result, a force is exerted on the inner vanes 610 in the direction of pressing against the front cover rear side face 637 of the barrier front cover 630, and the inner vanes 610 and the inner vane closing stoppers 633 are less likely to become disengaged. Similarly, the outer vane contact portions 635a are also less likely to become disengaged from the outer vanes 620 and the outer vane closing stoppers 635. The inner vane closing stoppers 633 and the outer vane closing stoppers 635 prevent the vane closing from going too far during normal drive, but also have the effect of reducing the likelihood of damage when an attempt is made to force closed vanes open. As a result, the size of the stoppers does not have to be overly large, so a more compact size can be achieved.

(4) The inner vanes 610, the outer vanes 620, and the barrier front cover 630 are flat sheet metal members. The third cosmetic frame 303 is a cylindrical sheet metal member, but the first planar portion 303e ahead of the first lens group L1 in the optical axis direction is flat in shape. The first opening 303d of the third cosmetic frame 303 is smaller than the second opening 634 of the barrier front cover 630. Also, the thickness of the second planar portion 638 constituting the second opening 634 of the barrier front cover 630 is less than the thickness of the inner vanes 610 or the outer vanes 620. Also, the thickness of the second planar portion 638 constituting the second opening 634 of the barrier front cover 630 is less than the thickness of the first planar portion 303e constituting the first opening 303d of the third cosmetic frame 303.

When the cam ring 601 rotates in the closing direction, the inner vanes 610 and the outer vanes 620 come into contact with the inner vane closing stoppers 633 and the outer vane closing stoppers 635 of the barrier front cover 630, respectively. The inner vane contact portions 633a here are inclined with respect to the optical axis. Similarly, the outer vane contact portions 635a are also inclined with respect to the optical axis.

This makes it less likely that scratching or other such problems occur since the sheet thickness is greater, although the third cosmetic frame 303, the inner vanes 610, and the outer vanes 620 can be touched by the user's fingers. Also, the barrier front cover 630 is thinner, but since the second opening 634 is hidden by the first opening 303d of the third cosmetic frame 303, the user's fingers do not touch it, so it is less likely to be scratched or otherwise damaged.

Also, a force is exerted on the inner vanes 610 in the direction of pressing against the front cover rear side face 637 of the barrier front cover 630, and the inner vanes 610 and the inner vane closing stoppers 633 are less likely to become disengaged. Similarly, the outer vane contact portions 635a are also less likely to become disengaged from the outer vanes 620 and the outer vane closing stoppers 635. The inner vane closing stoppers 633 and the outer vane closing stoppers 635 prevent the vane closing from going too far during normal drive, but also have the effect of reducing the likelihood of damage when an attempt is made to force closed vanes open. As a result, the lens barrel 20 can be more compact.

(5) The vane contact face 636 of the barrier front cover 630 is disposed more to the rear side in the optical axis direction than the front cover rear side face 637, and is disposed more to the rear side in the optical axis direction than the optical axis direction height of the vane rotation shafts 310a of the first lens group frame 310, that is, the vane rotation shafts 310a and the vane contact face 636 overlap in the optical axis direction. When the barrier front cover 630 has been attached to the first lens group frame 310, the vane contact face 636 comes into contact, with a small space between it and the face of the outer vanes 620 on the front side in the optical axis direction.

As a result, since the inner vanes 610 are in contact with the outer vanes 620 in the optical axis direction, and the outer vanes 620 are in contact with the barrier front cover 630, in a state in which the barrier front cover 630 has been attached to the first lens group frame 310, it is less likely that the outer vanes 620 and the inner vanes 610 come loose from the vane rotation shafts 310a. Thus, even if the lens barrel 20 is subjected to a large force when dropped, etc., it is less likely that the barrier mechanism 600 is damaged. As a result, the lens barrel 20 can be more compact in the optical axis direction.

(6) The inner vanes 610, the outer vanes 620, and the barrier front cover 630 are flat sheet metal members. The third cosmetic frame 303 is a cylindrical sheet metal member, but the first planar portion 303e ahead of the first lens group 1 in the optical axis direction is flat in shape. The first opening 303d of the third cosmetic frame 303 is smaller than the second opening 634 of the barrier front cover 630. Also, the thickness of the second planar portion 638 constituting the second opening 634 of the barrier front cover 630 is less than the thickness of the inner vanes 610 or the outer vanes 620. Also, the thickness of the second planar portion 638 constituting the second opening 634 of the barrier front cover 630 is less than the thickness of the first planar portion 303e constituting the first opening 303d of the third cosmetic frame 303. The vane contact face 636 of the barrier front cover 630 is disposed more to the rear side in the optical axis direction than the front cover rear side face 637, and is disposed more to the rear side in the optical axis direction than the optical axis direction height of the vane rotation shafts 310a of the first lens group frame 310, that is, the vane rotation shafts 310a and the vane contact face 636 overlap in the optical axis direction. When the barrier front cover 630 has been attached to the first lens group frame 310, the vane contact face 636 comes into contact, with a small space between it and the face of the outer vanes 620 on the front side in the optical axis direction.

This makes it less likely that scratching or other such problems occur since the sheet thickness is greater, although the third cosmetic frame 303, the inner vanes 610, and the outer vanes 620 can be touched by the user's fingers. Also, the barrier front cover 630 is thinner, but since the second opening 634 is hidden by the first opening 303d of the third cosmetic frame 303, the user's fingers do not touch it, so it is less likely to be scratched or otherwise damaged.

Also, since the inner vanes 610 come into contact with the outer vanes 620 in the optical axis direction, and the outer vanes 620 come into contact with the barrier front cover 630, in a state in which the barrier front cover 630 has been attached to the first lens group frame 310, it is less likely that the outer vanes 620 and the inner vanes 610 come loose from the vane rotation shafts 310a. Thus, it is less likely that the barrier mechanism 600 is broken even when the lens barrel 20 is subjected to a force when it is dropped, etc., and as a result, the lens barrel 20 can be more compact.

OTHER EMBODIMENTS (A) In the above embodiment, the lens barrel 20 had a three-stage telescoping design made up of the first rectilinear frame 110, the second rectilinear frame 120, and the first lens group frame 310, but this is not the only option. The lens barrel 20 may instead have a two-stage telescoping design made up of the first rectilinear frame 110 and the second rectilinear frame 120. In this case, the lens barrel 20 need not comprise the second rotary frame 220 or the third rectilinear frame 130. The lens barrel 20 may also have a four-stage or higher telescoping design.

(B) In the above embodiment, the cam grooves b were formed on one of two frames, and the cam protrusions B were formed on the other frame, but this is not the only option. The cam protrusions B may be formed on one of two frames, and the cam grooves b formed on the other frame.

Also, the cam grooves b and the cam protrusions B may be formed on each of two frames.

(C) In the above embodiment, the rectilinear grooves a were formed on one of two frames, and the rectilinear protrusions A were formed on the other frame, but this is not the only option. The rectilinear protrusions A may be formed on one of two frames, and the rectilinear grooves a formed on the other frame. Also, the rectilinear grooves a and the rectilinear protrusions A may be formed on each of two frames.

(D) In the above embodiment, the bayonet grooves e were formed on one of two frames, and the bayonet protrusions E were formed on the other frame, but this is not the only option. The bayonet protrusions E may be formed on one of two frames, and the bayonet grooves e formed on the other frame. Also, the bayonet grooves e and the bayonet protrusions E may be formed on each of two frames.

(E) In the above embodiment, the third lens group frame 330 was retracted toward the second lens group frame 320 in the retracted state, but this is not the only option. The third lens group frame 330 may be disposed to the rear of the second lens group frame 320 in the retracted state.

(F) In the above embodiment, the description focused on a bayonet mechanism of the first rectilinear frame 110 and the first rotary frame 210, but this is not the only option. A mechanism of the above-mentioned bayonet groove e1 and the bayonet protrusions E1 can be applied to two frames engaged via a bayonet mechanism.

(G) In the above embodiment, the bayonet groove e1 was formed in the inner peripheral face 110S of the first rectilinear frame 110, and the bayonet protrusions E1 were formed in the outer peripheral face 210T of the first rotary frame 210, but this is not the only option. The bayonet protrusions E1 may be formed in the inner peripheral face 110S of the first rectilinear frame 110, and the bayonet groove e1 may be formed in the outer peripheral face 210T of the first rotary frame 210.

(H) In the above embodiment, the bayonet groove e1 and the bayonet protrusions E1 were formed in a two-step shape, but this is not the only option. The bayonet groove e1 and the bayonet protrusions E1 may instead be formed in a shape with three or more steps.

Appendix

Some of the features of the lens barrel 20 disclosed herein are appended below.

(1)

A lens barrel comprises a cylindrical cam frame having a first rectilinear groove and a first cam groove on its inner peripheral face; a cylindrical first rectilinear frame that is disposed on the inside of the cam frame in the radial direction and that has on its outer peripheral face a first rectilinear protrusion that engages with the first rectilinear groove, and on its inner peripheral face a second rectilinear groove; a cylindrical rotary frame that is disposed on the inside of the first rectilinear frame in the radial direction and that has on its outer peripheral face a cam follower that is engaged with the first cam groove and on its inner peripheral face a second cam groove that passes through to the outer peripheral face; and a cylindrical second rectilinear frame that is disposed on the inside of the rotary frame in the radial direction and that has on its inner peripheral face a second rectilinear protrusion that is engaged with the second rectilinear groove via the second cam groove. The second rectilinear protrusion has a cam protrusion that is disposed on the outer peripheral face of the second rectilinear frame and is engaged with the second cam groove, and a rectilinear protrusion that is disposed on the cam protrusion and is engaged with the second rectilinear groove.

This lens barrel may also be such that the rotary frame has on its outer peripheral face a gear, and a drive gear that meshes with the gear and transmits rotational force to the rotary frame.

Also, this lens barrel may be such that the cam protrusion and the rectilinear protrusion each extend along the peripheral direction of the second rectilinear frame.

Also, this lens barrel may be such that the cam protrusion is formed so as to extend along the peripheral direction of the second rectilinear frame, the two ends of the cam protrusion in the peripheral direction are part of a conical face whose axis is the radial direction of the second rectilinear frame, and the rectilinear protrusion has a cuboid shape that extends along the peripheral direction of the second rectilinear frame.

Also, this lens barrel comprises a cylindrical first frame that has on its inner peripheral face a first groove that is parallel to the optical axis, a cylindrical second frame that is disposed on the inside of the first frame in the radial direction and that has on its inner peripheral face a first cam groove that passes through from the inner peripheral face to the outer peripheral face; and a cylindrical third frame that is disposed on the inside of the second frame in the radial direction and that has on its outer peripheral face a first protrusion that is engaged with the first groove via the first cam groove. The first protrusion may have a cam protrusion that is disposed on the outer peripheral face of the third frame and is engaged with the first cam groove, and a distal end protrusion that is disposed on the cam protrusion and is engaged with the first groove, the cam protrusion and the distal end protrusion may each be formed so as to extend along the peripheral direction of the third frame, the first cam groove may be formed in a direction that intersects the peripheral direction, and the second frame may have a contact band that is formed in a direction that intersects the peripheral direction and that protrudes into the first cam groove.

(2)

A lens barrel comprises a cylindrical fixed frame, a master flange that blocks off the rear opening of the fixed frame, a cylindrical rotary frame that is disposed ahead of the master flange and on the inside of the fixed frame and that is able to rotate with respect to the fixed frame, and flexible wiring that is provided from the inside of the rotary frame toward the fixed frame or the master flange. The rotary frame has a cut-out formed along the peripheral direction at the rear end face, and the cut-out is opposite the flexible wiring when the rotary frame is closest to the master flange.

With this lens barrel, the rotary frame may have a cam follower on its outer peripheral face, and the cut-out may be disposed at a position that does not overlap the cam follower when viewed in the cylinder axial direction.

With this lens barrel, the rotary frame may have a gear on its outer peripheral face, and the cut-out may be disposed at a position that does not overlap the gear when viewed in the cylinder axial direction.

(3) A lens barrel comprises a cylindrical fixed frame, a master flange that blocks off the rear opening of the fixed frame, a cylindrical rotary frame that is disposed ahead of the master flange and on the inside of the fixed frame and that is able to rotate with respect to the fixed frame, and a lens group frame that supports a lens group and is disposed between the master flange and the rotary frame. The rotary frame has a cut-out formed along the peripheral direction at the rear end face, and the cut-out is opposite the lens group frame when the rotary frame is closest to the master flange.

With this lens barrel, the rotary frame may have a cam follower on its outer peripheral face, and the cut-out may be disposed at a position that does not overlap the cam follower when viewed in the cylinder axial direction.

With this lens barrel, the rotary frame may have a gear on its outer peripheral face, and the cut-out may be disposed at a position that does not overlap the gear when viewed in the cylinder axial direction.

(4) A lens barrel comprises a cylindrical fixed frame having a cam groove formed on its inner peripheral face, a rotary gear that is rotatably supported by the fixed frame and protrudes to the inside of the fixed frame, a master flange that blocks off the rear opening of the fixed frame, a cylindrical rotary frame that is disposed ahead of the master flange and on the inside of the fixed frame and that is able to rotate with respect to the fixed frame, and flexible wiring that is provided from the inside of the rotary frame toward the fixed frame or the master flange. The rotary frame has a gear portion that is formed along the peripheral direction at the rear end of the outer peripheral face and that meshes with the rotary gear, and a cam protrusion that is disposed at the rear end of the outer peripheral face and is engaged with the cam groove. When the rotary frame is closest to the master flange, the rotational position of the gear portion and the cam protrusion around the axis of the rotary frame is different from the rotational position of the flexible wiring around the axis.

(5) A lens barrel comprises a cylindrical fixed frame, a master flange that blocks off the rear opening of the fixed frame, a movable frame that is disposed ahead of the master flange and on the inside of the fixed frame and that is able to move with respect to the fixed frame, a cylindrical rotary frame that is disposed ahead of the master flange and on the inside of the movable frame and that is able to rotate with respect to the fixed frame, and flexible wiring that is provided from the inside of the rotary frame toward the fixed frame or the master flange. The movable frame has a protrusion formed at part of the rear end on the outer peripheral side, when the movable frame is closest to the master flange, the protrusion comes into contact with the flexible wiring and biases the flexible wiring outward in the radial direction.

(6) A lens barrel comprises a cylindrical movable frame that supports a lens for taking in light, and a cover frame that covers the outer periphery of the movable frame. The cover frame has a latched portion that protrudes rearward from the rear end face, the movable frame has a concave portion formed on the outer peripheral face, and the latched portion is latched in a state of being positioned in the concave portion.

(7) A lens barrel comprises a cylindrical movable frame having a cam groove on its inner peripheral face, and a cylindrical rotary frame that is disposed on the inside of the movable frame and has a cam protrusion formed on the outer peripheral face and engaged with the cam groove. The movable frame has a sloped face that is located ahead of the cam protrusion when the movable frame has moved the farthest ahead with respect to the rotary frame, and the outside of the sloped face in the radial direction is located further ahead than the inside of the sloped face in the radial direction.

(8) A lens barrel comprises a cylindrical first frame having a bayonet groove formed along the peripheral direction, and a cylindrical second frame having a bayonet protrusion formed along the peripheral direction and engaged with the bayonet groove, and the height of the bayonet protrusion in the peripheral direction decreases moving toward the end point.

With this lens barrel, the bayonet groove may have at least one peripheral direction wall, and a cut-out formed in the peripheral direction wall in order to bring the bayonet protrusion into the bayonet groove, and the shape of the cut-out when viewed in the cylinder axial direction may correspond to the shape of the bayonet protrusion.

(9) A lens barrel comprises a cylindrical first frame that has three protrusions formed on its outer peripheral face, and a cylindrical second frame that has three through-grooves that pass through from the inner peripheral face to the outer peripheral face and into which the three protrusions are inserted. Only two of the three through-grooves open on the rear end face of the second frame.

(10) A lens barrel comprises a cylindrical first frame that has a protrusion formed on its outer peripheral face and that supports a lens group; a cylindrical second frame that is disposed on the outside of the first frame and has a through-groove that passes from the inner peripheral face to the outer peripheral face and into which the protrusion is inserted; and a cover frame that is disposed on the outside of the second frame and covers the front end face of the second frame. The through-groove is formed parallel to the axis of the first frame, the second frame has a rod-shaped portion disposed ahead of the through-groove, the rod-shaped member has a protrusion portion that protrudes forward, and the front end of the protrusion is disposed on the inside of the protrusion portion when the first frame is housed on the inside of the second frame.

With this lens barrel, the front end face of the second frame has an uneven shape corresponding to the inner face shape of the cover frame.

GENERAL INTERPRETATION OF TERMS

In understanding the scope of the present disclosure, the term "comprising" and its derivatives, as used herein, are intended to be open ended terms that specify the presence of the stated features, elements, portions, groups, integers, and/or steps, but do not exclude the presence of other unstated features, elements, portions, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel. Accordingly, these terms, as utilized to describe the present technology should be interpreted relative to the lens barrel.

The term "configured" as used herein to describe a portion, section, or part of a device implies the existence of other unclaimed or unmentioned portions, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various portions can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

The technology disclosed herein provides a lens barrel that can be made more compact, and therefore can be applied, for example, to cameras, portable telephones with a camera function, portable terminals with a camera function, and so forth.

What is claimed is:

1. A lens barrel comprising:
a first planar portion that is substantially perpendicular to an optical axis and includes a first opening portion,
a barrier front cover including a second opening portion,
at least two vane portions that move between a state of being closed and a state of being opened, cover the first opening portion and the second opening portion at the state of being closed,
a driving portion that drives the vane portion,
a lens group frame that supports rotatably the vane portions and including at least one lens,
a regulating portion provided on the barrier front cover, the regulating portion restricts a movement of the vane portions when the vane portions move toward the state of being closed from the state of being opened,
the vane portions move to the state of being closed at a position of the regulating portion if the vane portions reach to the regulating portion, and the vane portions move to the state of being closed by an engagement of the vane portions if the vane portions do not reach to the regulating portion;
the first planar portion is disposed closer to a subject than the barrier front cover,
the first opening portion is formed smaller than the second opening portion,
the regulating portion is disposed on the outer side than the first opening portion in a direction away from the optical axis.

2. The lens barrel according to claim 1, wherein
a thickness of a first flat portion on the barrier front cover that is a metal member is formed thinner than a thickness of a second flat portion on the vane portion, the first and second flat portions formed on a plane substantially perpendicular to the optical axis.

3. The lens barrel according to claim 1, wherein
a thickness of a first flat portion on the barrier front cover that is a metal member is formed thinner than a thickness of the first planar portion, the first flat portion formed on a plane substantially perpendicular to the optical axis.

4. The lens barrel according to claim 1, wherein
the regulating portion is disposed around the second opening portion.

5. The lens barrel according to claim 1, wherein
the barrier front cover further includes a tab portion, the tab portion provided on a peripheral portion of the barrier front cover,
the lens group frame further includes a fixing portion, the fixing portion being opposite to the tab portion, and
the barrier front cover is supported by the lens group frame when the tab portion engages with the fixing portion.

6. The lens barrel according to claim 1, wherein
the first planar portion is formed on a plane substantially perpendicular to an optical axis of a cosmetic frame, the cosmetic frame formed in a substantially circular shape, and
the cosmetic frame covers the barrier front cover, the vane portion, and at least a portion of the lens group frame.

7. The lens barrel according to claim 1, wherein
the barrier front cover further includes a frame contact portion, the frame contact portion protrudes from a peripheral portion of the barrier front cover,
the lens group frame includes a cover contact portion, the cover contact portion being recessed in an optical axis direction, and
the frame contact portion abuts on the cover contact portion.

8. The lens barrel according to claim 1, wherein
the barrier front cover is disposed between the first planar portion and the vane portion in a direction of the optical axis.

9. The lens barrel according to claim 1, wherein
the driving portion is disposed in an opposite side of the barrier front cover relative to the vane portion in a direction of the optical axis.

10. The lens barrel according to claim 1, wherein
the regulating portion is a plate, and a thickness of the regulating portion is substantially the same as a thickness of the barrier front cover.

11. The lens barrel according to claim 1, wherein
the vane portions have a first vane portion and a second vane portion;
the regulating portion has a first regulating portion that regulates a movement of the first vane portion in a closing direction and a second regulating portion that regulates a movement of the second vane portion;
the first and the second vane portions come closer each other when the state of being opened is changed to the state of being closed;
the first and the second vane portion come to contact each other between a third position in which the first vane portion comes to contact with the first regulating portion and a fourth position in which the second vane portion comes to contact with the second regulating portion.

* * * * *